United States Patent
Bagley et al.

(10) Patent No.: US 12,062,058 B2
(45) Date of Patent: *Aug. 13, 2024

(54) SYSTEMS AND METHODS FOR DISCOVERING AND QUANTIFYING PRINCIPAL FACTORS OR DOMINANT PATHS IN INTERCONNECTED JOURNEY DATA

(71) Applicant: Ignite Enterprise Software Solutions, Inc., Austin, TX (US)

(72) Inventors: William Robert Bagley, Greenwood Village, CO (US); Kyle Rattet, Greenwood Village, CO (US); Joshua Templeton, Greenwood Village, CO (US); David Holiday, Austin, TX (US); Michael Herman, Greenwood Village, CO (US); Christopher Andrew Clarke, Greenwood Village, CO (US); Pedro Quinones, Greenwood Village, CO (US); Andrew McGouirk, Greenwood Village, CO (US); Jason Hodges, Austin, TX (US); Jon B. Wisda, Greenwood Village, CO (US); Philip Cunnell, Greenwood Village, CO (US); Adam Rubin, Austin, TX (US); Stefanie Tuder, Greenwood Village, CO (US)

(73) Assignee: Ignite Enterprise Software Solutions, LLC, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/045,817

(22) Filed: Oct. 11, 2022

(65) Prior Publication Data
US 2023/0143079 A1 May 11, 2023

Related U.S. Application Data

(63) Continuation of application No. 16/296,885, filed on Mar. 8, 2019, now Pat. No. 11,501,321.
(Continued)

(51) Int. Cl.
*G06Q 30/0201* (2023.01)
*G06F 3/0482* (2013.01)
(Continued)

(52) U.S. Cl.
CPC ....... *G06Q 30/0201* (2013.01); *G06F 3/0482* (2013.01); *G06F 17/18* (2013.01); *G06Q 10/06315* (2013.01)

(58) Field of Classification Search
None
See application file for complete search history.

(56) References Cited

PUBLICATIONS

Z. Liu, Y. Wang, M. Dontcheva, M. Hoffman, S. Walker and A. Wilson, "Patterns and Sequences: Interactive Exploration of Clickstreams to Understand Common Visitor Paths," in IEEE Transactions on Visualization and Computer Graphics, vol. 23, No. 1, pp. 321-330, Jan. 2017. (Year: 2017).*
(Continued)

*Primary Examiner* — Stephanie Z Delich

(57) ABSTRACT

Analytical methods and systems applied to sequential event data are disclosed. An exemplary system and method analyzes datasets containing events in a plurality of journeys. The methods and systems described analyze and quantify the relative importance of events and sequences leading to outcomes where the data is complex and interconnected. In some embodiments, a graphical user interface illustrates the quantification of these datasets. In some embodiments, the graphical user interface maps the journey paths to show the relative importance of each journey path. In some embodiments, the maps of journey paths are interactive, allowing
(Continued)

selection of paths of interest for detailed analysis. In some embodiments, the methods and systems calculate paths similar to a journey path of interest. An exemplary method and system also provides detailed recommendations for changing events within a sequence to either increase or decrease the likelihood of achieving a selected outcome.

21 Claims, 33 Drawing Sheets

Related U.S. Application Data

(60) Provisional application No. 62/640,728, filed on Mar. 9, 2018.

(51) Int. Cl.
    *G06F 17/18*     (2006.01)
    *G06Q 10/0631*     (2023.01)

(56) References Cited

PUBLICATIONS

Notice of Allowance mailed Jul. 11, 2022, filed in U.S. Appl. No. 16/296,885, pp. 1-4.
Response to Non-Final Office Action dated May 23, 2022, filed in U.S. Appl. No. 16/296,885, pp. 1-14.
Non-Final Office Action mailed Nov. 23, 2021, filed in U.S. Appl. No. 16/296,885, pp. 1-29.
Request for Continued Examination dated Sep. 7, 2021, filed in U.S. Appl. No. 16/296,885, pp. 1-19.
Petition Decision dated Aug. 5, 2021, filed in U.S. Appl. No. 16/296,885, pp. 1-2.
Final Office Action mailed Jun. 7, 2021, filed in U.S. Appl. No. 16/296,885, pp. 1-27.
Response to Non-Final Office Action dated Mar. 16, 2021, filed in U.S. Appl. No. 16/296,885, pp. 1-20.
Examiner Interview Summary Record dated Feb. 26, 2021, filed in U.S. Appl. No. 16/296,885, pp. 1-3.
Non-Final Office Action mailed on Dec. 18, 2020, filed in U.S. Appl. No. 16/296,885, pp. 1-23.

* cited by examiner

SYSTEMS AND METHODS FOR DISCOVERING AND QUANTIFYING PRINCIPAL FACTORS OR DOMINANT PATHS IN INTERCONNECTED JOURNEY DATA

CROSS-REFERENCE TO RELATED APPLICATIONS

This Application claims priority to U.S. Provisional Patent Application No. 62/640,728, filed 9 Mar. 2018, which is hereby incorporated by reference herein in its entirety as if fully set forth below.

FIELD OF THE DISCLOSURE

Embodiments of the present disclosure generally relate to analytical methods and systems applied to certain input data, and, more particularly, to analytical methods and systems applied to input data consisting of event sequences to understand and explain crucial factors leading to a given event or outcome present within the data.

BACKGROUND

Understanding convoluted journey data is more important now than ever. As the business processes and systems designed to simplify or facilitate interactions with or by customers become more varied and numerous, so too does the data resulting from their use. Increasingly, businesses are turning to the nearly immeasurable amount of sequential event data from various sources (or "channels") to glean insights into their customers' behaviors and to optimize complex processes or mitigate costly interactions. Journey data in a customer-based environment can contain events that represent actions or behaviors present in any number of disparate sources or channels, spanning time frames of minutes to months and containing sequences of events ranging in length from one to tens of thousands. Each of these journeys of events eventually reach an outcome, and the path to that outcome is of keen interest to businesses wishing to optimize the processes that make up the journeys.

Some existing solutions for parsing and analyzing these voluminous journey datasets rely on heuristics and are therefore inherently model-driven. These solutions rely on manually constructed assumptions or mathematically relatable basis functions or definitions. Such limitations are similar to those encountered in typical machine-learning methods. The assumptions for those models attempt to quantify the likelihood of a particular outcome based on averages, observed volume, or similarities between expected paths and mathematical approximations of customers. It goes without saying that approximations of customers do not adequately reveal the real customer experience.

SUMMARY

Aspects of the present disclosure provide methods and systems that rely on rigorous quantification of the base probabilities of indirect journey paths leading to an outcome. As will be appreciated, such systems and methods thereby alleviate the need for any behavior-based approximations. Additionally, the disclosed systems and methods for quantifying those paths provide the data analysis in a user-friendly, digestible graphical interface. Briefly described, embodiments of the present disclosure relate generally to analytical methods and systems applied to certain input data, and, more particularly, to analytical methods and systems applied to input data consisting of event sequences (e.g., journey data) to understand and explain crucial factors leading to a given event or outcome present within the data.

Embodiments of the systems and methods can be applied within a Journey Sequence Analysis and Recommendation Framework ("JSARF"), which can analyze and quantify the relative importance of events and sequences leading to outcomes where the data is complex and consists of a plurality of interconnected events. In this instance, and throughout this present disclosure, the term "journey data" refers to any dataset, in any of a multitude of possible formats, which expresses the relationships between constituent events in a sequentially occurring format. Examples of these sequential, interconnected event-datasets are legion, but exemplary illustrations include: healthcare data (test results, patient interview transcriptions, prescriptions, disease stage(s), and costs of treatment) and customer interactions data (mobile, call-center, in-store, website clicks, and social media posts or meta information). By analyzing this data, embodiments of the present systems and methods can provide insights into both the customer and the combined effects of the events in a journey. The present technology enables these insights despite situations where one or more of the representative supporting data sources are prohibitively large, involve many steps across a plurality of sources, cover a long period of time, or are excessively complex. Significantly, embodiments of the present technology also provide insight into the duration between two events. For example, a duration between two events in the order of a few seconds provides a vastly different characterization of the journey than if the duration between the events was in the order of hours, days, or even weeks. The present technology provides, therefore, not only insight into the sequence of the events but also the underlying experience behind the sequence.

In some embodiments, the present systems and methods encompass quantifying the base probabilities of the indirect pathways (e.g., journeys) customers take when reaching a particular outcome in customer-based environments. Various embodiments of the present systems and methods also can encompass applying additional metrics and measures to the journeys so as to quantify the journeys and recommend, to the administrator of the environment, intelligent augmentation or mitigation actions. In other words, some embodiments of the present technologies process journey datasets and apply additional metrics and measures to produce suggestions. Exemplary embodiments of these suggestions include recommendations to add, remove, or replace events along established journey paths to either increase or decrease the likelihood of a customer reaching an outcome.

According to some embodiments of the disclosed technology, a method of representing and recommending journey paths is provided. The method may comprise receiving data representative of a plurality of journey paths, each journey path representative of a journey having one or more journey events, including at least a starting event and an outcome, and data for each respective journey path comprising sequential-event information. The method may comprise receiving a selection of a desired outcome for analysis. The method may comprise analyzing the sequential-event information to determine a probability and number of times a journey event is reached. The method may comprise identifying, from the plurality of journey paths, a subset of journey paths having the desired outcome. The method may comprise generating a visualization map comprising each journey path in the subset of journey paths, wherein the visualization map displays, for each journey path in the subset of journey paths, the respective journey path's starting event, outcome, and any intermediate event between the starting event and the outcome. The method may comprise outputting the visualization map for display in a graphical-user-interface.

In any of the embodiments described herein, the method may further comprise receiving a selection of an intermediate event to include in an analysis.

In any of the embodiments described herein, the method may further comprise aggregating each journey path in the subset of journey paths having an identical starting event, identical outcome, and identical one or more intermediate events into a single representative sub-path.

In any of the embodiments described herein, each journey path in the subset of journey paths in the visualization map may be displayed as a journey line connecting a starting event to an outcome, and each journey line may also indicate any intermediate event in addition to the starting event and the outcome.

In any of the embodiments described herein, each sub-path in the visualization map may be displayed as a journey line connecting a starting event to an outcome event, and each journey line may also indicate any intermediate event in addition to the starting event and the outcome.

In any of the embodiments described herein, each journey line may be weighted to indicate the volume of journey paths represented by the sub-path.

In any of the embodiments described herein, the weighting of each journey line may be displayed by presenting a high-volume journey line as a wide line and presenting a low-volume journey line as a thin line.

In any of the embodiments described herein, each journey line may comprise a color, and the weighting of each journey line may be displayed by presenting a high-volume journey line in an opaquer color and presenting a low-volume journey line in a less opaque color.

In any of the embodiments described herein, the method may further comprise receiving input for filtering each journey path in the subset of journey paths to include in the analysis only those journey paths having at least one of a selected statistical lift, a selected volume of journey paths, a selected increase or decrease on the impact measure, and a selected incoming volume.

In any of the embodiments described herein, the graphical-user-interface may be configured to receive a selection of a journey line in the visualization map for analysis. The method may further comprise receiving a selection of a journey line from the visualization map. The method may further comprise calculating a plurality of similar paths to the selected journey line, wherein the plurality of similar paths may be calculated by a statistical metric. The method may further comprise aggregating the plurality of similar paths for analysis. The method may further comprise outputting the plurality of similar paths for display in a graphical-user-interface.

In any of the embodiments described herein, the method may further comprise receiving input for filtering the plurality of similar paths to only those similar paths with at least one of a higher or lower probability of reaching the desired outcome than the selected journey line. The method may further comprise displaying a path recommendation card.

In any of the embodiments described herein, the path recommendation card may comprise one recommended path having a higher or lower probability of reaching the desired outcome than the selected journey line. The path recommendation card may comprise a corresponding effect analysis. The corresponding effect analysis may include at least one of the change in statistical lift between the recommended path and the selected journey line, the impact change between the recommended path and the selected journey line, the volume change between the recommended path and the selected journey line, or the incoming sub-path volume change between the recommended path and the selected journey line.

In any of the embodiments described herein, the statistical metric calculating the plurality of similar paths may be at least one of the Levenshtein distance metric or the cosine similarity calculation.

According to some embodiments of the disclosed technology, a method of representing journey paths is provided. The method may comprise receiving data representative of a plurality of journey paths, each journey path representative of a journey having one or more journey events, and data for each respective journey path comprising sequential-event information. The method may comprise receiving a selection of one or more events of interest from among the one or more journey events. The method may comprise aggregating, into respective representative sub-paths, journey paths from the plurality of journey paths that contain (i) the selected one or more events of interest and (ii) identical sequential-event information. The method may comprise identifying a plurality of respective representative journey paths. The method may comprise determining, for each respective representative sub-path of the plurality of respective representative sub-paths, a probability and number of times each respective representative sub-path reaches the one or more events of interest. The method may comprise generating a visualization map comprising the plurality of respective representative sub-paths. In some embodiments, the visualization map may display at least two events defining each respective representative sub-path. The method may further comprise receiving input for filtering the plurality of respective representative sub-paths to include in the visualization map only those respective representative sub-paths having at least one of a selected statistical lift, a selected volume of journey paths, a selected increase or decrease on the impact measure, or a selected incoming volume. The method may comprise outputting the visualization map for display in a graphical-user-interface.

In any of the embodiments described herein, the method may further comprise receiving a selection of a particular representative sub-path within the visualization map. The method may further comprise calculating a plurality of similar paths to the particular representative sub-path by using a statistical metric. The method may further comprise aggregating the plurality of similar paths for analysis. The method may further comprise outputting the plurality of similar paths for display for display in a graphical-user-interface. The method may further comprise receiving input for filtering the plurality of similar paths to only those similar paths with at least one of (i) a higher probability of reaching the selected one or more events of interest than the particular representative sub-path, or (ii) a lower probability of reaching the selected one or more events of interest than the particular representative sub-path. The method may further comprise displaying a path recommendation in the graphical-user-interface.

In any of the embodiments described herein, the path recommendation may comprise one recommended path having a higher or lower probability of reaching the selected one or more events of interest than the particular representative sub-path. The path recommendation may comprise a corresponding effects analysis. A corresponding effects analysis may include at least one of the change in statistical lift between the recommended path and the particular representative sub-path, the impact change between the recommended path and the particular representative sub-path, the volume change between the recommended path and the particular representative sub-path, or the incoming sub-path volume change between the recommended path and the particular representative sub-path.

In any of the embodiments described herein, the at least two events defining each respective representative sub-path displayed in the visualization map may include every journey event reached in the respective representative sub-path.

In any of the embodiments described herein, the at least two events defining each respective representative sub-path may comprise only journey events determined to be relevant for visualization. The method may further comprise determining which journey events within each respective representative sub-path are relevant to include in the visualization map.

In any of the embodiments described herein, the selected one or more events of interest may comprise at least one of a journey outcome event or a journey starting event.

In any of the embodiments described herein, each respective representative sub-path of the plurality of respective representative sub-paths displayed in the visualization map may be weighted to show the number of journey paths aggregated to include in the respective representative sub-path.

In any of the embodiments described herein, the method may further comprise sorting the one or more journey events in the plurality of journey paths by importance within the plurality of journey paths.

These and other aspects of the present disclosure are described in the Detailed Description below and the accompanying figures. Other aspects and features of embodiments of the present disclosure will become apparent to those of ordinary skill in the art upon reviewing the following description of specific, example embodiments of the present disclosure in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the disclosure discussed herein. In similar fashion, while example embodiments may be discussed below as device, system, or method embodiments, it is to be understood that such example embodiments can be implemented in various devices, systems, and methods of the present disclosure.

BRIEF DESCRIPTION OF THE FIGURES

The patent or application file contains at least one drawing executed in color. Copies of this patent or patent application publication with color drawing(s) will be provided by the Office upon request and payment of the necessary fee.

The accompanying drawings illustrate one or more embodiments and/or aspects of the disclosed systems and methods and, together with the written description, serve to explain the principles of the disclosure. Wherever possible, the same reference names are used throughout the drawings to refer to the same or like elements of an embodiment.

DETAILED DESCRIPTION

Figure 1:
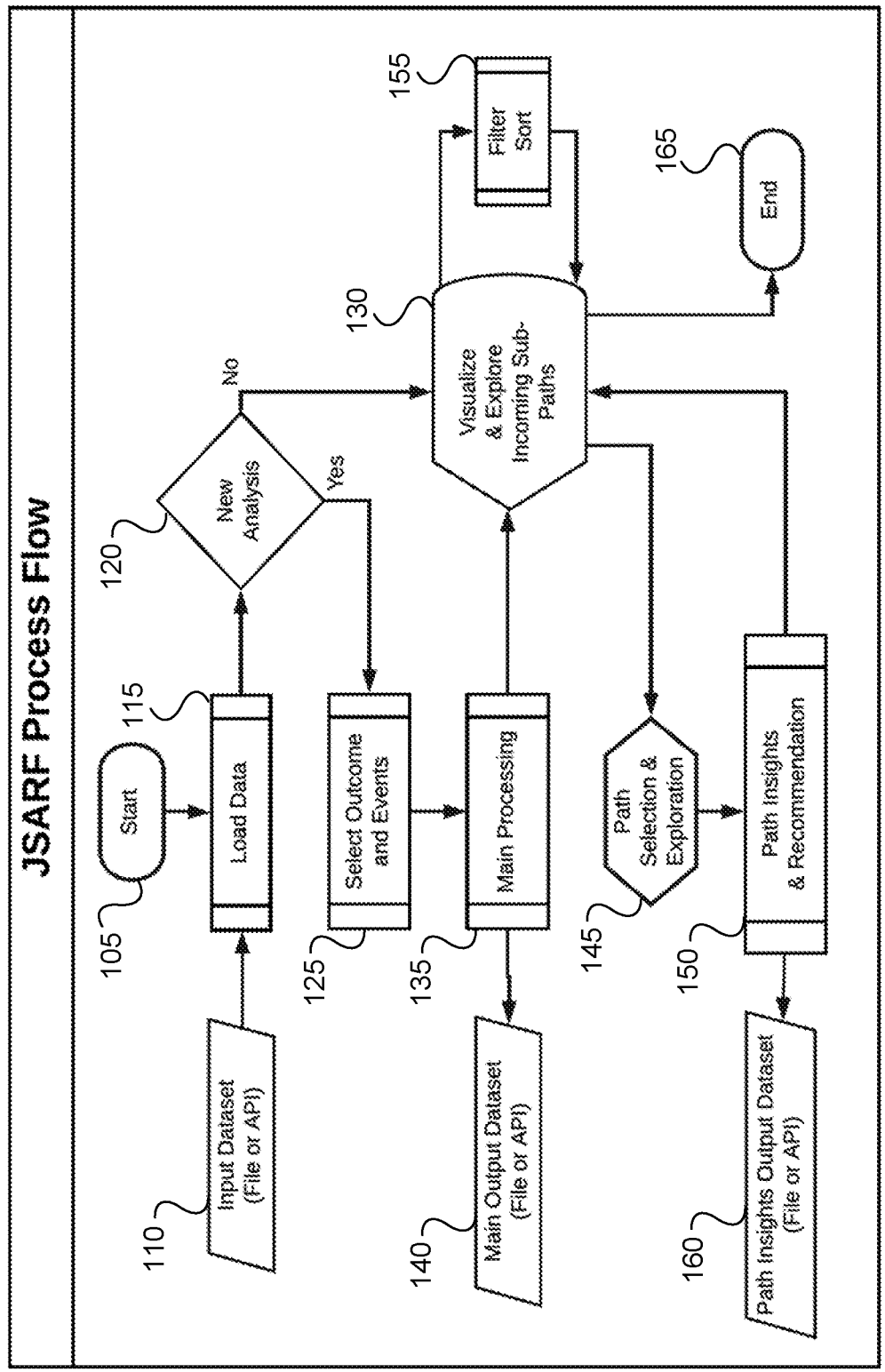
FIG. 1 is a view of a simplified iterative, exploratory process flow for a JSARF, in accordance with some embodiments of the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an" and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It also is to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

To facilitate an understanding of the principles and features of the disclosure, various illustrative embodiments are explained below. In particular, the presently disclosed subject matter is described in the context of analytical methods and systems applied to input data consisting of event sequences (e.g., journey data) to understand and explain crucial factors leading to a given event or outcome present within the data. The present disclosure, however, is not so limited, and can be applicable in other contexts. For example and not limitation, some embodiments of the present disclosure may improve other statistical and analytical systems, including but not limited to any customer data monitoring. These embodiments are contemplated within the scope of the present disclosure. Accordingly, when the present disclosure is described in the context of analyzing journey path data, it will be understood that other embodiments can take the place of those referred to. Additionally, the present disclosure describes journey events and sequences of journey events that may be attributed to the events of customers or other persons accessing an organization's customer service or other related resources. Accordingly, when the present disclosure is described in the context of a customer, customer event, customer journey, or the like, it will be understood that other persons can take the place of those referred to.

Embodiments of the presently disclosed subject matter can include a method to load or ingest large journey datasets and prioritize events and/or sequences within said journey dataset using a plurality of statistically and otherwise defined metrics and measures. Additionally, some embodiments of the presently described systems and methods allow the user to specify which events to include in the subsequent analysis—providing a more relevant solution set, free of unwanted noise (i.e., events not germane to the subject of current analyst interest). Conversely, events that the user knows cannot be altered or removed may be included regardless of relevance. A subsequent analysis may first calculate, for indirect combinations of events (any of which can be an incoming sub-path) present in the dataset, the probability that a particular incoming sub-path resulted in the user-specified outcome of interest. The systems can then return this completed calculation set to the user in an intuitive, interactive analysis environment (the JSARF). The JSARF can further apply business logic to the returned calculation set via various filters. Additionally, according to some embodiments of the present disclosure, the present systems and methods may provide to the user a list of similar paths to a selected sub-path of interest—regardless of the order in which the interactive analysis/filtering stage has prioritized it. As will be appreciated, this presentation of alternate paths facilitates a deeper understanding of actionable changes possible in the selected sub-path by drawing upon the basis of the permuted paths. Furthermore, some embodiments of the present systems and methods can provide suggestions for events that have been shown in the dataset to either increase or decrease the likelihood of encountering a selected outcome event (for incoming sub-paths) or event trigger (for outgoing sub-paths).

Aspects of the disclosed technology can provide large-scale (i.e., big data) quantitative methods relying on rigorous determination of underlying cross-channel paths and their relationships or couplings. In some aspects, the disclosed technology can leverage journey science, which includes the application of more scientific methods to the practice of understanding, predicting, and explaining the complex customer journey. For example, aspects of the disclosed technology recognize that the scientific method and practical experience both dictate that extensible, flexible, and scalable methodologies—coupled with higher fidelity mathematical descriptions of the interactions—generate higher quality, more relevant answers. Also, extensible, flexible, and scalable methodologies are significant for capturing the essence of the driving factors behind the undesired non-digital populations.

Aspects of the disclosed technology can further include methods for ingesting large amounts of data from a plurality of sources and formats, performing transformations on sub-paths found within the datasets, and combining the collected and transformed data to facilitate analysis. Exemplary transformation methods are described herein and include, but are not limited to, using the Levenshtein distance or cosine similarity calculations to identify similar journeys. This analysis can be conducted using, for example, distributed or parallel computational methods or approaches instantiated on a cluster or plurality of processing and storage units.

In some embodiments, a JSARF analysis can include calculating advanced statistical measures associated with the multi-channel journey datasets. For example and not limitation, a primary analysis on the dataset can include the predictive probability of the incoming event, explanatory probabilities of the outcome event, volume ratios, event correlations, statistical lift, and/or a proprietary statistical impact measure. The proprietary statistical impact measure is discussed in detail within the present disclosure, but, summarily, and as will be understood by one of skill in the art, is a measure similar in form but superior to a two-proportion Z-score. Existing solutions rely on attempts to perform aggregate metric calculations based on the totals or averages of the coupled events. But the disclosed subject matter provides a more robust solution by performing accurate, large-scale probabilistic calculations. These calculations, which can leverage techniques from the combinatorics branch of mathematics, quantify the indirect combinations arising from a sequence of events representing all the possible ways in which the prior events are observed to result in a current event. The resulting intermediate datasets generated by performing these combinatorics-style calculations can facilitate further calculation of advanced and custom statistical measures that represent a significant departure from the standard, simple, descriptive statistics used currently to describe event sequences. As will be appreciated, these advanced measures are designed to offer novel and valuable insights into the various journeys. For example, in some embodiments, the disclosed systems and methods can aggregate these combinatorics calculations by a sequence of events that precede a given subsequent event, thus providing appearance counts of when that sequence appears prior to the given subsequent event and when it does not.

The systems and methods of the present disclosure can then make these various measures available to an analytical graphical user interface (GUI). In some embodiments, a GUI can provide visualization of the resulting datasets and allow novel analytical interactions with the data. By making the various measures and calculations available to the user through the interface, the systems and methods described herein can sort, prioritize, highlight, and emphasize various results based on the user's input. When applied across the entire dataset in this way, these statistical measures can form a distribution, which conveys additional richness and context to the user. Therefore, the disclosed systems and methods offer both more specific information and a broader perspective than traditional approaches. As will be appreciated, aspects of the present disclosure can include additional features not found in conventional approaches, including features which automatically recommend alterations to a selected sub-path which result in a corresponding change to that path's basic and advanced metrics and measures. Such features are explained in greater detail when describing the accompanying figures in detail.

Additional examples of system enhancements over the existing methods include the ability to sort, filter, and aggregate according to other attributes, including ratios, metrics, measures, and attributes previously defined. In one embodiment, for instance, the "customer type" classification can be used as an aggregation attribute, allowing for a categorical or longitudinal view of the completion rates and/or customer satisfaction among all subsets of customers.

In various embodiments, a GUI can also feature innovative graphics, which combine output elements generated by the computational stage and allow for intuitive understanding of the relative importance of the events and indirect sequences generated. Using the unique set of useful ratios, metrics, and measures generated by the computational stage, combined with innovative graphical elements, the GUI can also allow the user to navigate to a list of specific events that comprise a journey and understand an event's importance within the set. As will be appreciated, such functionality can be a powerful feature designed to explain and rank commonalities among the constituent events—thereby offering to ascertain or discover common driving forces not visible or explainable with current methods. The systems and methods described herein, coupled with an interactive GUI including journey path mapping and filters for various metrics, are improvements over prior journey-analysis systems.

Using the flexible aggregation methods disclosed herein, a GUI can present a ratio of attributes associated with one of many individual data sequences that begin with a specific event and end within a designated channel versus all journeys for the same end goal or event. As will be appreciated, such functionality can provide insights associated with paths present in the journey set.

Referring now to the figures, wherein like reference numerals represent like parts throughout the views, exemplary embodiments will be described in detail. FIG. 1 is a view of a simplified process flow, according to some embodiments of the present disclosure. In one embodiment, the user starts the journey 105 by first loading a dataset 110 at an operation 115. According to some embodiments, an input dataset 110 contains summarized, sequential events information. An input dataset 110 may be in any number of formats having sequentially-listed data, but as an illustration and not limitation, a dataset 110 may be an Excel (.xls) or comma separated values (.csv) file. An input dataset 110 may be furnished to the present systems and methods through an application protocol interface ("API") or manually uploaded from a local data source (e.g., a local filesystem or database instance) or a remote data source (e.g., a data lake, database, or similar source). If the dataset has not been previously processed by the JSARF, the new analysis operation 120 can initiate the select outcome and events operation 125. Otherwise, the system can immediately render the previously-processed output to continue the iterative processes of exploration or analysis, as shown in FIG. 1, by proceeding to the visualize & explore incoming sub-paths operation 130.

In some embodiments, a user may select an outcome event as well as additional events for JSARF analysis at operation 125. In such embodiments, the system may initiate the main processing stage 135 and generate a main output dataset 140. In some embodiments, a main output dataset 140 may include a subset of journey paths representing all paths having the parameters chosen at operation 125. In some embodiments, the main output dataset 140 may include combined sub-paths, wherein identical journey paths matching the chosen parameters are combined into one representative sub-path. Subsequent to completion of the main processing stage 135, the system can immediately present the results to the user to explore or analyze in the interactive visualize & explore incoming sub-paths operation 130.

In some embodiments and as shown in FIG. 1, after the results are made available to the user in the interactive visualize & explore stage 130, the system can allow the user to launch a secondary computation to further understand and analyze paths similar to one selected by the user from the primary output. This iterative process can start with the visualize & explore stage 130 (containing all sub-paths from the primary output), continue to a path selection and exploration interface 145, proceed to the path insights & recommendation process 150, and return to the interactive visualize & explore stage 130 for filtering, modifying, and/or repeating at a filter/sort operation 155. In some embodiments, the output of the path insights & recommendation process 150 is the path insights output dataset 160, as shown in FIG. 1. Finally, the process may be terminated at an end operation 165.

Figure 2:
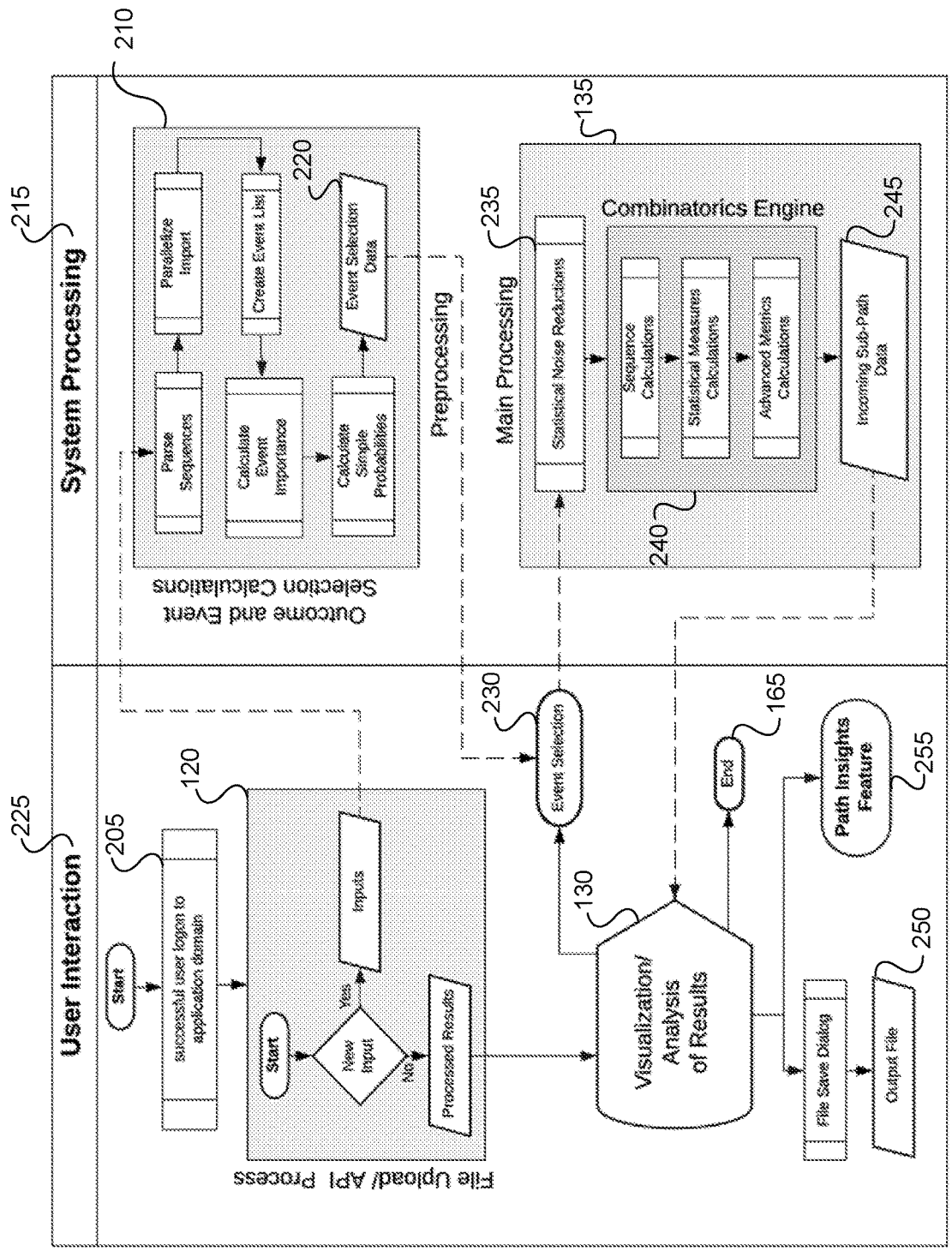
FIG. 2 is a process flow illustrating exemplary interactions in which an embodiment of the disclosed systems and methods is realized, in accordance with some embodiments of the present disclosure.

FIG. 2 illustrates an exemplary interaction view in which an embodiment of the disclosed JSARF is realized. In particular, FIG. 2 depicts the interplay between user interactions and system processing modules for the primary workflow utilized by a JSARF, according to some embodiments of the present disclosure. Although FIG. 1 summarizes an exemplary primary workflow, FIG. 2 depicts greater detail of a user's interaction with the system and the software architectural aspects of the present systems and methods related thereto. As shown in FIG. 2, in some embodiments the user begins by first logging in to the application domain, at operation 205, and then specifies the input dataset. The input dataset may be either a new dataset or an existing project, wherein new datasets can be further processed, yet existing projects can proceed to visualization, as described in the new analysis operation 120 of FIG. 1. For new datasets, the process can continue with the outcome and event selection calculations at panel 210, which is the first handoff to the System Processing lane 215 of the JSARF, according to some embodiments. The event selection calculations panel 210 can produce event selection data 220, and the event selection data 220 can then be returned to the User Interaction lane 225 as an event selection stage 230.

This exemplary iterative process indicates how the disclosed system can analyze initial data so a user can select outcomes and events of interest, as shown at the select outcome and events operation 125 of FIG. 1. Once the system receives the data at the calculations panel 210 (either manual upload from a local or remote filesystem or an alternate remote source), the system can parse the input and, in some embodiments of the present disclosure, the parsing can be parallelized to take advantage of the disclosed system's big-data-compatible implementation. Further, the system can perform preliminary computations, as is described in greater detail herein, on the parsed input dataset and make the results available to the user at an event selection stage 230 in the User Interaction lane 225. At the event selection stage 230, a user can review the results of the preliminary processing and make more informed decisions on the events and possible outcomes associated with the input dataset. Once the user completes this event selection stage 230 in the interactive visualization framework, the disclosed system can make this information available to the main processing stage 135 of the System Processing lane 215. A system according to the present disclosure can then apply statistical noise reductions 235 to the dataset to further enhance the significance of the results as well as expedite the computations performed by this process. The processed dataset can then be expressed in terms of indirect incoming sub-paths first by using combinatorics methods and second by using a plurality of advanced metrics and measures, each at the combinatorics engine 240. These final incoming sub-path data products 245 can then be made available to a visualization/analysis component (i.e., the visualize & explore incoming sub-paths operation 130 of FIG. 1) in the User Interaction lane 225. From this interactive view at the visualize & explore operation 130, the user may terminate the process 165, save the primary output dataset 250, or initiate further analysis available through the Path Insights Feature 255, which is discussed in detail in FIG. 3 and throughout this disclosure.

Figure 3:
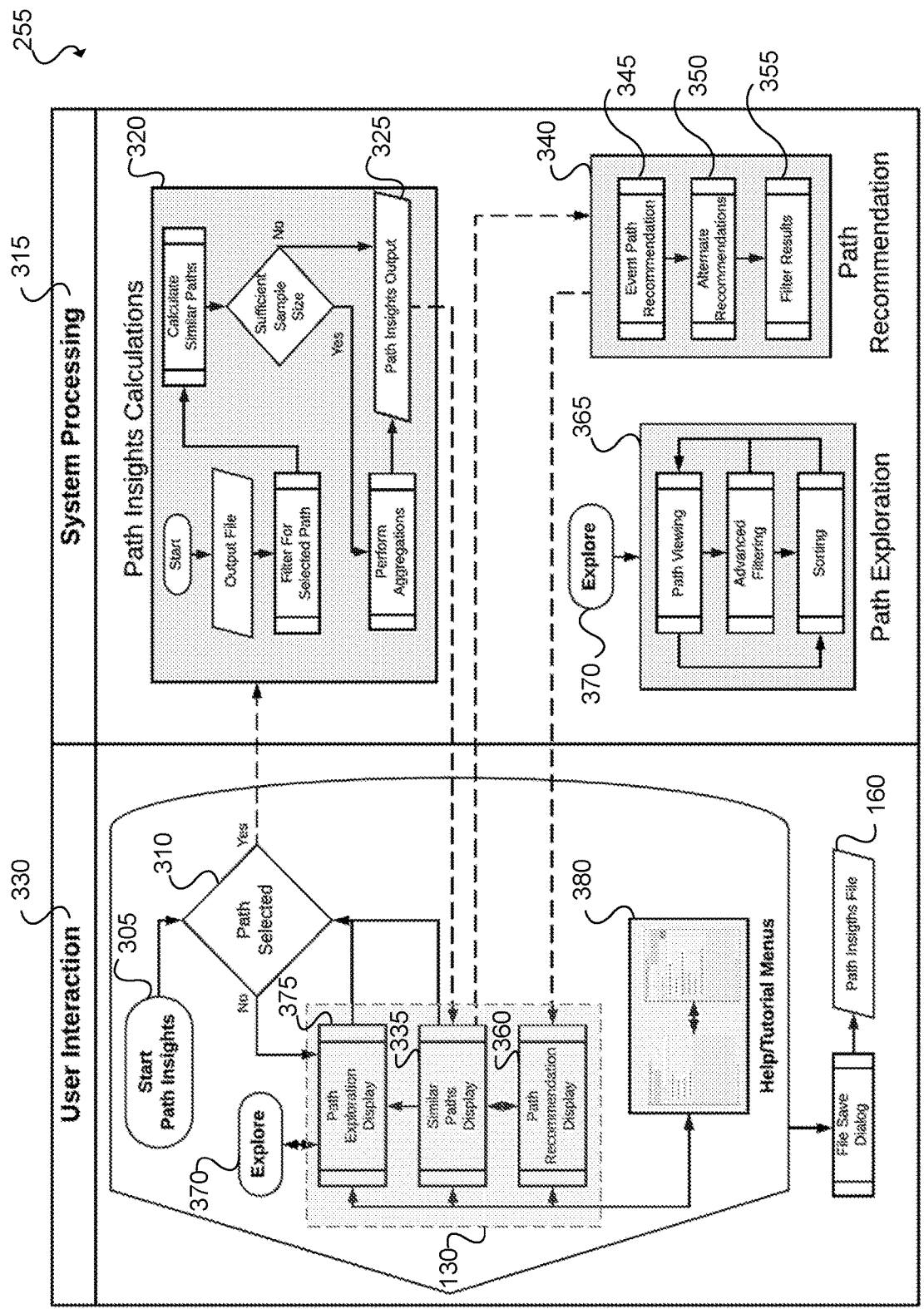
FIG. 3 is a process flow demonstrating secondary processes for JSARF analysis, in accordance with some embodiments of the present disclosure.

FIG. 3 is a representation of an example high-level architecture of the present disclosure and illustrates data flows between various components present in the disclosed system. In particular, FIG. 3 depicts secondary processes surrounding auxiliary and additional analysis systems and methods, according to some embodiments of the present disclosure. With the initiation of the secondary analysis feature of the presently disclosed technology, the user can select a path present in the primary output of the collection of processes shown in FIG. 2. A user may start the Path Insights Feature 255 (also summarily shown in FIG. 1 as path insights & recommendation process 150) by selecting a start "Path Insights" operation 305 in the visualization interface. A Path Insights Feature 255 may be performed on a sub-path selected from the primary outputs of FIG. 2; conversely, a Path Insights Feature 255 may be performed on all sub-paths returned in the primary outputs of FIG. 2. This path selection is shown in the figure as a path selection operation 310. If a sub-path from the primary output is selected in a path selection operation 310, the System Processing lane 315 engages with the dataset to filter the primary output for the selected sub-path, determines which paths present in the dataset are similar to the selected sub-path, and optionally performs aggregations based on the nature of the similarity at the path insights calculations 320. The path insights calculations 320 can return a path insights output 325. The system can then make insights output 325 data available to the interactive visualization engine (i.e., the visualize & explore incoming sub-paths operation 130 of FIG. 1) in the User Interaction lane 330. The visualize & explore incoming sub-paths operation 130 may comprise a similar-paths display 335, indicating all paths that are similar to the selected sub-paths based on metrics discussed in greater detail in the present disclosure.

In some embodiments, the similar-paths display 335 can facilitate the path recommendation calculations 340 within the System Processing lane 315. The path recommendation calculations 340 may comprise an event path recommendation process 345, an alternate recommendations process 350, and/or an additional filter-results process 355. The output of the processing in the path recommendation calculations 340 can be made available to a user at the path recommendation display 360 in the User Interaction lane 330. A visual representation of a Path Insights Feature 255, according to some embodiments of the present disclosure, is shown in greater detail in FIGS. 24-26.

As shown in FIG. 3, additional iterative analysis is possible from this recommendation stage, including Path Exploration 365. In some embodiments, a user may select an explore operation 370, provided in a path exploration display 375, wherein the explore operation 370 dataset is analyzed in the Path Exploration 365 process within the System Processing lane 315. The output of this component is made available to the interactive visualization component (i.e., the visualize & explore incoming sub-paths operation 130) in the User Interaction lane 330. Additionally, from the user interface, users may access the Help/Tutorial menus 380 and save output datasets 160 at any point after their creation.

Figure 4:
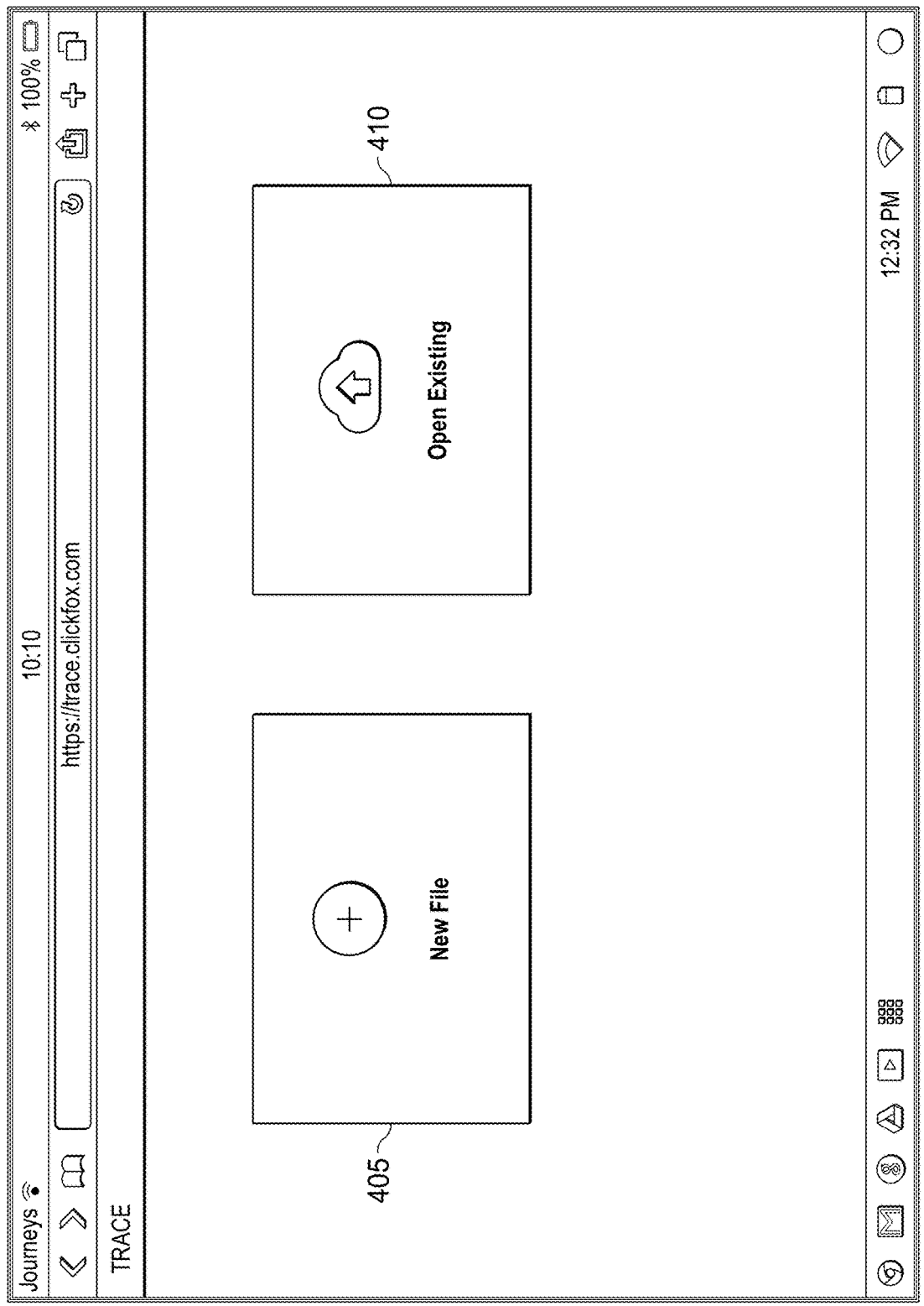
FIG. 4 is a detailed view of an example input-data source-selection application page, in accordance with some embodiments of the present disclosure.

FIG. 4 is a representative depiction of an input-selection page, showing the various options presented to a user for requesting that the system analyze a new input file 405 or open an existing file 410 for analysis, according to some embodiments. The interface shown in FIG. 4 is an exemplary embodiment of the load dataset operation 115 in FIG. 1. From this launch page, according to some embodiments of the present disclosure, input files containing formatted journey data, or previously computed outputs of the present technology, may be loaded through an additional filesystem browser window.

Figure 5:
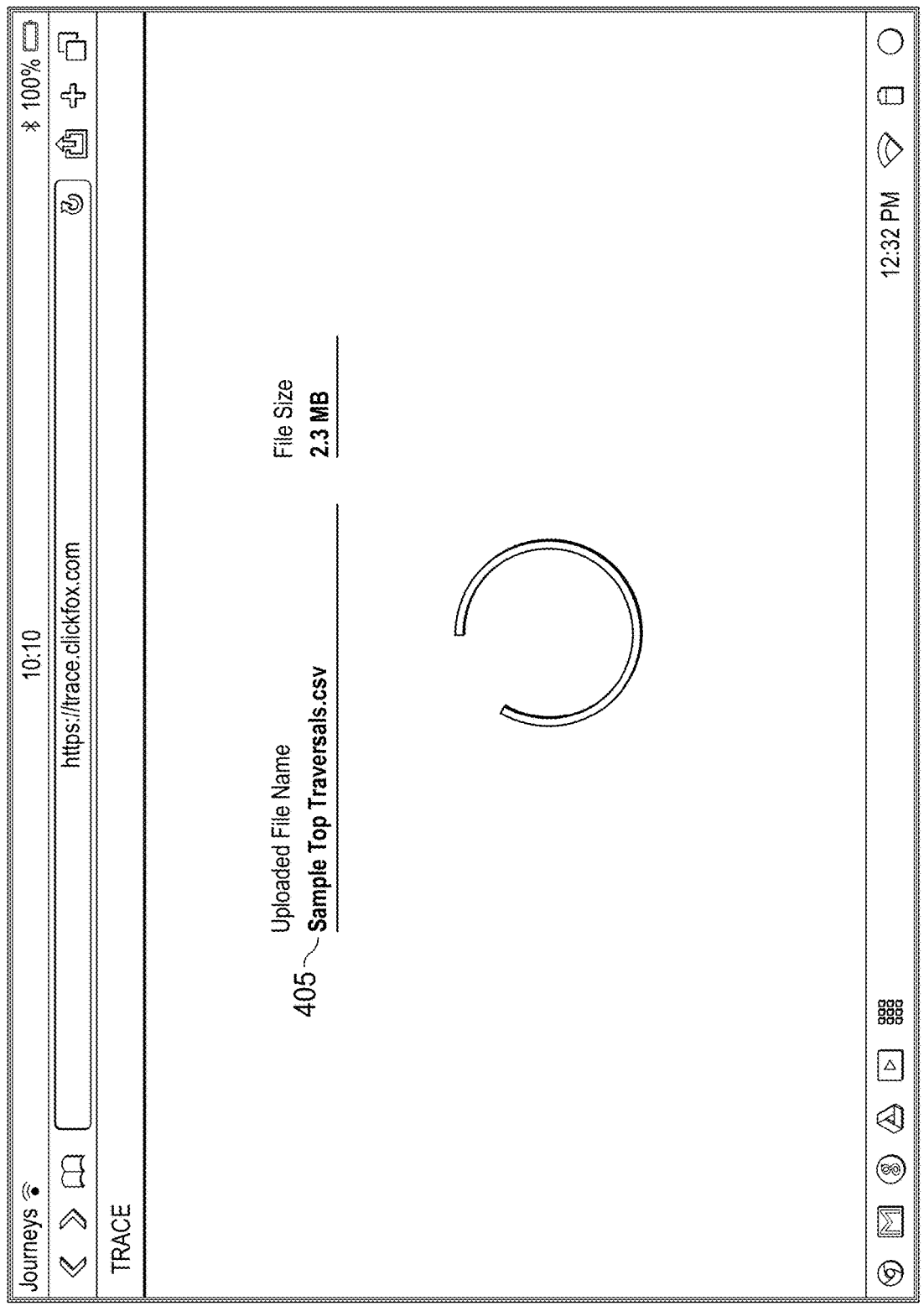
FIG. 5 is an example interface that depicts the transfer or upload process for a given comma separated values dataset, in accordance with some embodiments of the present disclosure.

FIG. 5 is an example interface present in some embodiments of the present disclosure, depicting the transfer or upload process for a given comma-separated values dataset (e.g., "Sample Top Traversals.csv") of approximately 2.3 MB in size. The interface shown in FIG. 5 is an exemplary embodiment of the load dataset operation 115 in FIG. 1. As noted above, the presently disclosed technology can accept data that is either manually transferred from a local data source, such as a standard filesystem or local database, or transferred from a remote file store via an API call or database connection.

Figure 6:
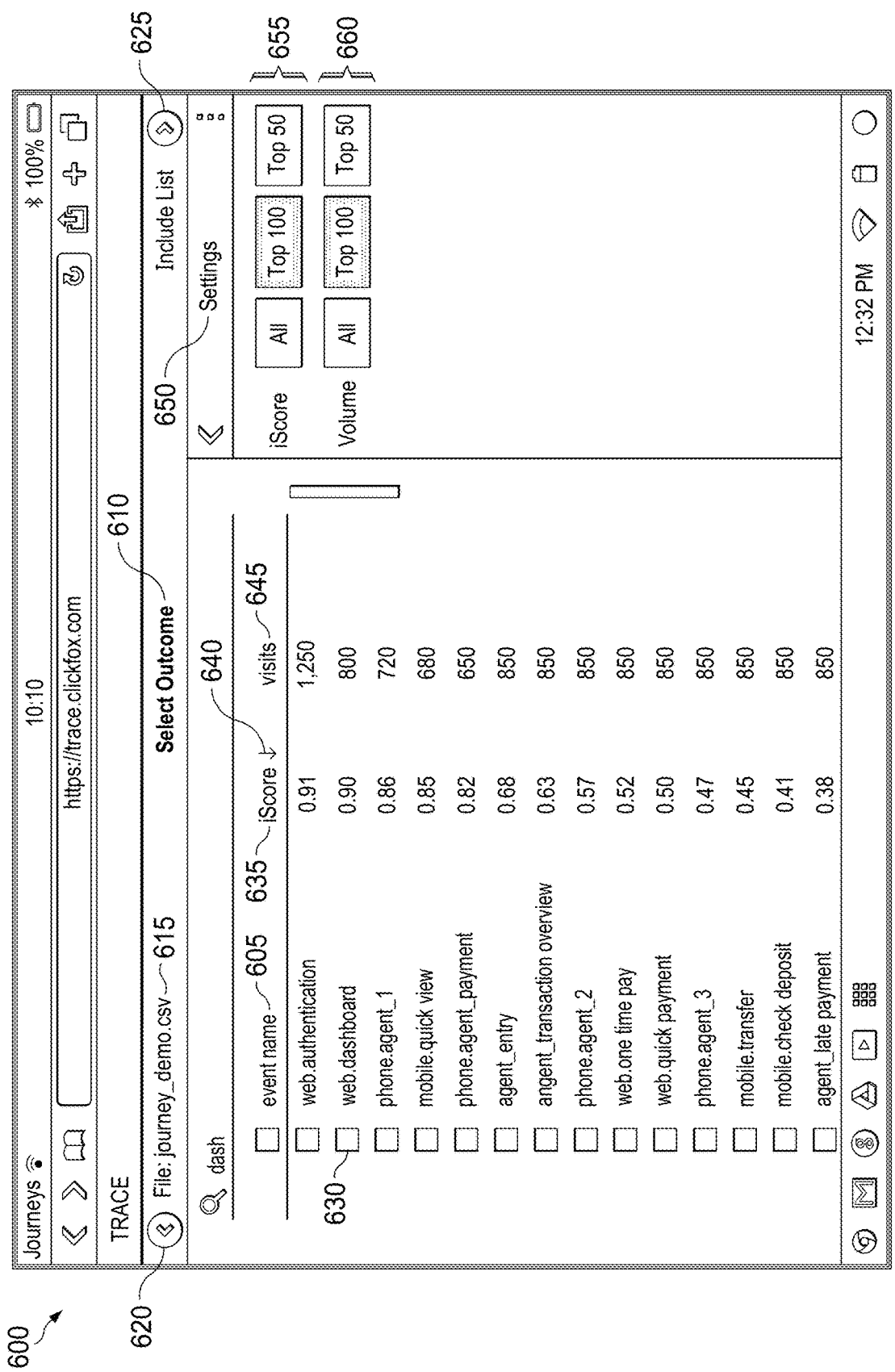
FIG. 6 is an example interface allowing a user to select a journey outcome of interest, in accordance with some embodiments of the present disclosure.

FIG. 6 is an example Select Outcome interface 600 (also summarily depicted as select outcome and events operation 125 in FIG. 1), according to some embodiments of the present disclosure. The exemplary Select Outcome interface 600 provides useful information pertaining to a file or data source and provides a visual selection mechanism to aid the user in specifying outcomes and events to process, using the presently described systems and methods. After a file is uploaded to the system, the system processing layer can undertake a pre-processing step to calculate attributes and metrics for each given event in the initial input dataset. These initial metrics and measures are shown alongside the event name column 605 in the exemplary Select Outcome interface 600. In some embodiments, the interface may include the Select Outcome title 610 and current filename 615. A Back to File Selection button 620 may allow a user to restart the upload process if, for instance, the user discovers that the file contents visible are not the correct content to be analyzed.

In some embodiments, once a user selects an outcome of interest, the interface may provide a proceed-to-next-analysis button 625 that, when selected, provides a separate selection panel that allows a user to select intermediate events to include in an analysis. In the exemplary interface shown in FIG. 6, however, a user cannot select the proceed-to-next-analysis button 625 because no outcome event has been selected for processing.

As shown in FIG. 6, in some embodiments, an interface may include columns that present information about the events in the dataset. For example, as shown in FIG. 6, the first column is the event name column 605 for the events present in the uploaded file. A check box 630 may be included in the interface, where the user can select a given event for inclusion in the subsequent analysis. The second column (i.e., 635) in can provide a metric (e.g., an "iScore value") for the corresponding event. The entirety of the events is sortable by this metric, and the sort order icon 640 can indicate that the events are sorted by a descending metric value. According to certain embodiments, an "iScore value" is a metric that measures the importance of the individual terms present in the dataset, thereby cutting down the number of events within the dataset and providing the most relevant events for selection. In some embodiments, the importance of the individual terms present in the dataset may be based on a general importance, or how important the terms are within the entire dataset. In some embodiments, the importance of the individual terms may be context-specific, where the importance may be based upon context provided by the outcome event and/or context provided by the end user in any other manner.

In some embodiments, the interface may provide additional metrics or information. FIG. 6 includes a visits column 645, adjacent to the iScore column 635. A visits column 645 can indicate how prevalent a given event is in the dataset (i.e., volume of events), and the prevalence in the dataset in turn provides an independent indication of that event's importance. In some embodiments, a user may sort the entirety of the events in the dataset by the number of visits for each particular event. In addition to the iScore value column 635 and the visits column 645, any other metric column may be provided in a JSARF outcome-selection interface. As will be appreciated, other statistics or information may be of value to a user wishing to select an outcome of interest, and such embodiments of the disclosed technology are contemplated herein.

As shown in FIG. 6, a Select Outcome interface 600 can also include a settings panel 650, which may provide options including iScore selection buttons 655 and volume selection buttons 660. These and similar buttons may allow for a rapid population of the events for analysis by taking the corresponding events for "All" events, the "Top 100" events, or the "Top 50" events, in both or either of the iScore or volume columns. An interface may also include any other range of events that may be beneficial, as will be appreciated.

Figure 7:
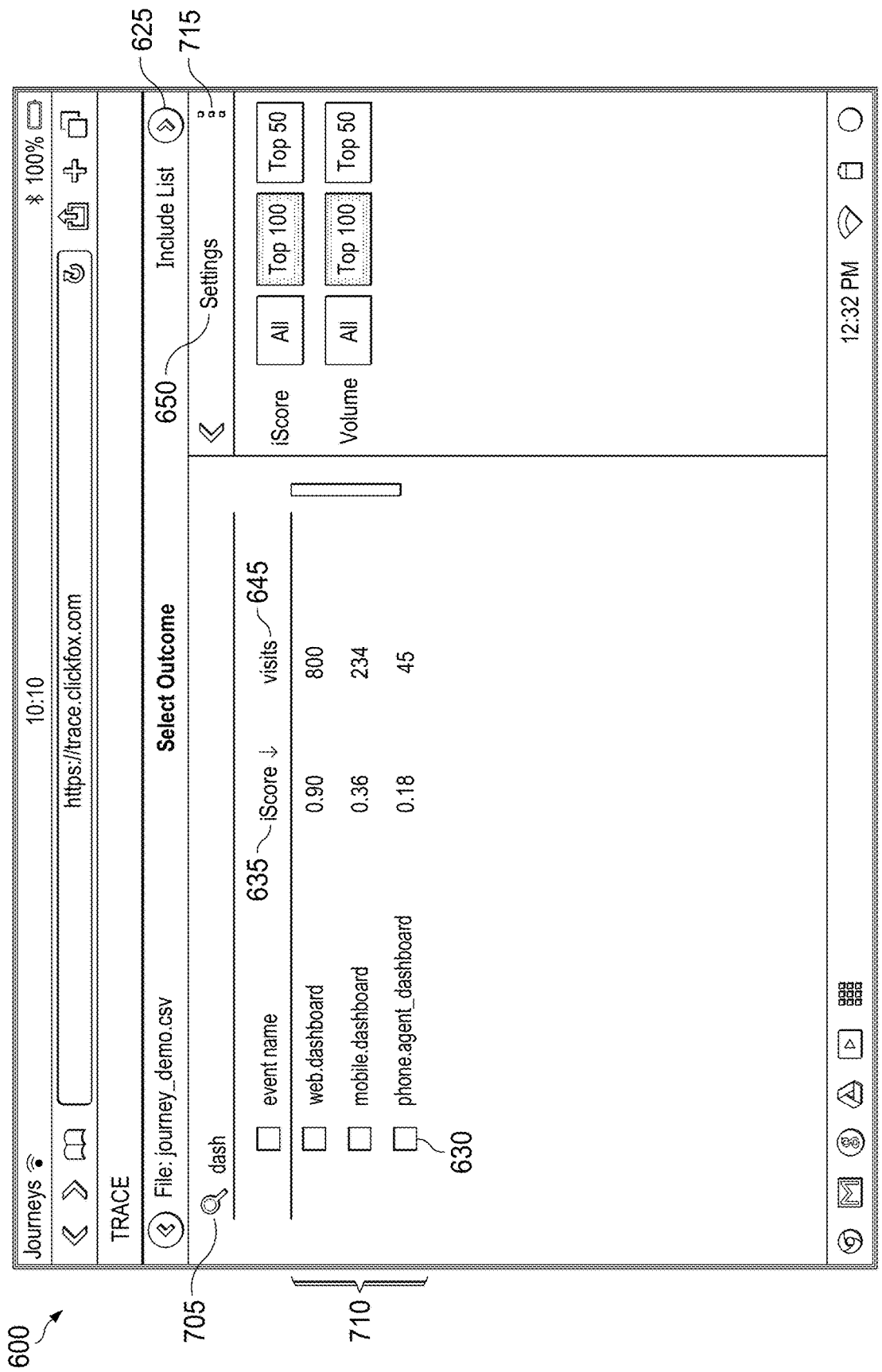
FIG. 7 is an example of an event search feature, in accordance with some embodiments of the present disclosure.

FIG. 7 is an example event search feature 705 present in an exemplary Select Outcome interface 600, according to some embodiments of the present disclosure. An exemplary interface may show events with terms matching a full or partial word (e.g., "dash" in FIG. 7) entered into a search bar. By typing partial (or full) event names into the search feature 705, a user can view an automatically populated list of the events with letters matching the search names. The partial list of events 710 may be displayed on the Select Outcome interface 600, including the events' corresponding iScore value (column 635), visits value (column 645), or any other statistical metric useful for a user, as will be appreciated.

In some embodiments of the present disclosure, once an event is selected from the Select Outcome interface 600, the user may continue selecting additional events to include in the analysis. For example and not limitation, FIG. 7 shows a "proceed to next analysis" button 625 that will prompt another screen for selecting additional, intermediate events to include in the analysis. In FIG. 7, the "proceed to next analysis" button 625 cannot be selected because no check box 630 is checked for an outcome of interest. In other embodiments, a user can select additional intermediate events, along with the outcome of interest, on one screen interface and not in a separate include-list interface. An exemplary include list interface is described in detail in FIG. 8.

Also shown in the exemplary interface of FIG. 7 is a settings panel 650. The exemplary panel indicates that the "Top 100" events buttons have been selected, and in the case of a finite list length, new selections will displace previous selections in a first-in, first-out order. In some embodiments, an interface may include an off-screen menu 715 icon, which may present to the user additional options that may be available for every interface screen. The off-screen menu is discussed in greater detail with respect to FIG. 30.

Figure 8:
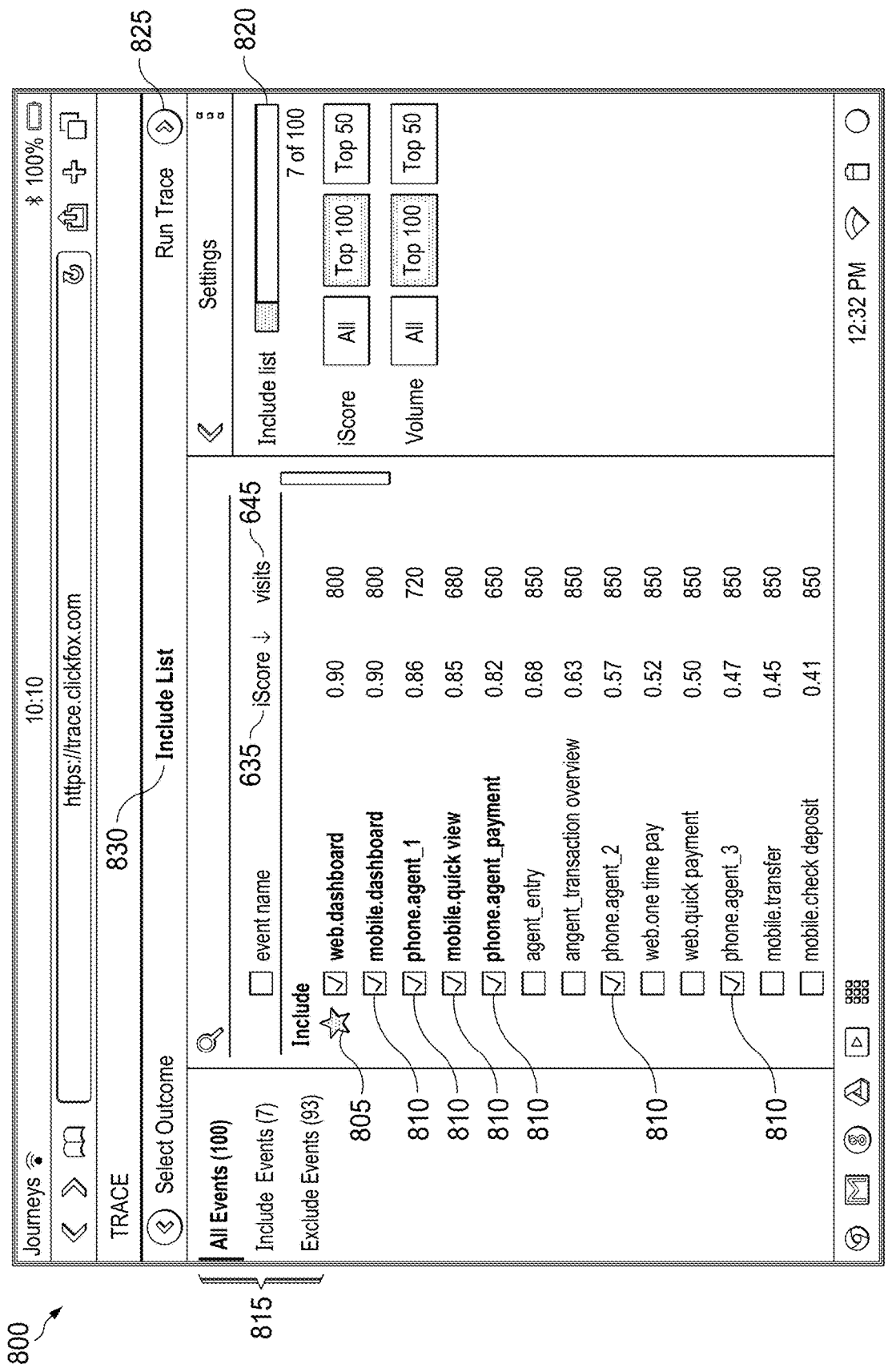
FIG. 8 is an example interface allowing a user to select additional journey events to include in a JSARF analysis, in accordance with some embodiments of the present disclosure.

FIG. 8 is a view of an exemplary Include List interface 800, showing a selected outcome 805 (e.g., "web.dashboard"), six additional selected intermediate events 810, and each event's iScore value (column 635) and visits value (column 645), according to some embodiments of the present disclosure. In some embodiments, an interface may provide a summary of the selected intermediate events 810, which may include the total number of events available (if applicable). The interface may provide the summary in an events summary panel 815. In some embodiments, an interface may highlight a selected outcome 805 with a mark, color, or other indicator demonstrating the event is the outcome event of interest, shown as a star in FIG. 8. In some embodiments, an interface may provide a system for selecting the intermediate events 810. For example, an interface may show selected intermediate events 810 with blue checks next to the event names or any other indicator that is appreciated in the art. In some embodiments, an interface may provide an include-list remaining space progress bar 820, where the number of events selected out of the total possible is shown. In some embodiments, when a user selects a selected outcome 805 and intermediate events 810, the system can provide a run analysis button 825—which may initiate a first stage of analysis as will be discussed.

In some embodiments, after receiving a user's input specification (e.g., the outcome 805 selection and the intermediate event 810 selection), the presently-described system may perform any of the calculations described herein—returning for each given unique incoming sub-path (i.e., the indirect combination of events leading to the outcome) a set of custom metrics and measures. As will be appreciated, the ratio of the number of times a sequence or single event appears prior to a selected event as compared to the number of times in which that same sequence or single event appears without the subsequent selected event forms the basis of a basic probability. These probabilities naturally fall into two categories depending on whether the instance is defined as forward looking or backward looking. In general, a forward-looking (i.e., predictive) probability is the probability of seeing another specific event given that the current one has occurred. Conversely, a backward-looking (i.e., explanatory) probability is the probability that the preceding event or sequence was observed given the current event has occurred. In the presently disclosed technologies, the probabilities can be constructed by collecting similar prior sequences or events (for predictive) or posterior sequences or events (for explanatory). Additionally, the disclosed systems and methods can use these calculated probabilities in the context of sub-proportions of the larger statistical sample and base proportions of the statistical sample to achieve additional metrics. One such example is statistical lift, which is a measure that conveys the likelihood of a sequence of preceding event(s) occurring relative to a base population or random sampling of the set. These probability-based measures or metrics are independent of the number of occurrences of a given sequence in a dataset, and thus these measures can be a useful addition to aid in decision-making across a broad range of possible datasets.

Embodiments of the disclosed systems and methods can further define and use another advanced measure that combines the number of times an event or sequence occurs with the statistical lift. This advanced statistical measure and metric relies materially on the proper data architecture present in the processes that precede the JSARF, as is further discussed in U.S. Pat. Pub. No. 2004/0205586, the substance of which is hereby incorporated by reference. In some embodiments, the systems described herein can output, to the interactive visualization interface, these computations according to the logic described with respect to FIG. 9 and as shown in detail in FIG. 10.

Figure 9:
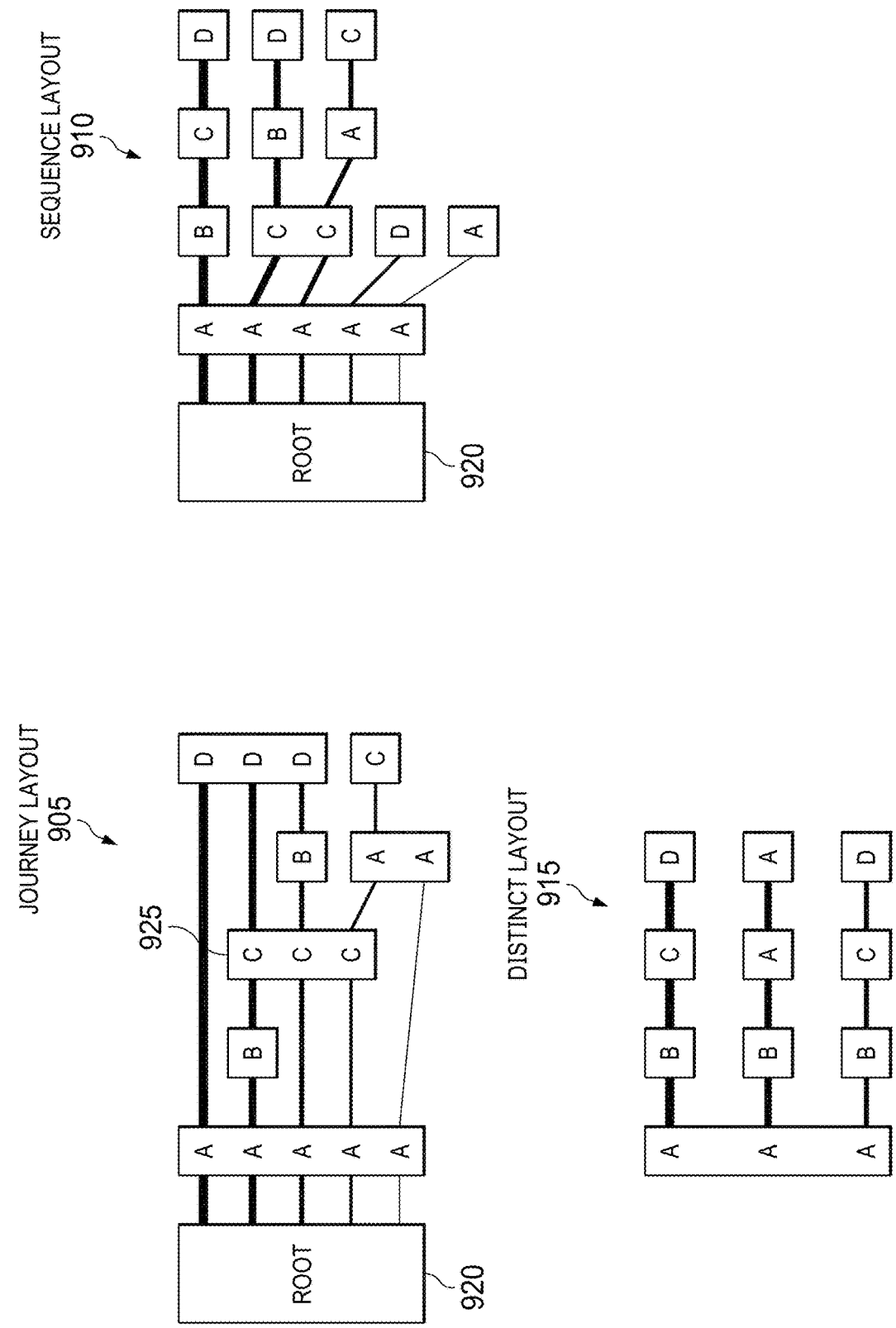
FIG. 9 is an example of various layouts, using differing logic, that may be applied by a JSARF, in accordance with some embodiments of the present disclosure.

FIG. 9 is an image of various event layouts that may be used by the disclosed technology, according to some embodiments. The Journey Layout 905, Sequence Layout 910, and Distinct Layout 915 layouts shown differ in how they represent the events that make up the sequences rendered by the JSARF. As will be appreciated, all algorithms used by the systems and methods can place sequences of events in a sorted order from the beginning to the end of the sequence. The logic governing the Journey Layout 905 and Sequence Layout 910 uses a fictitious ROOT 920 layer and assigned shared nodes (for example, shared event "C" node 925). In example embodiments, for each sequence and event in the Journey Layout 905, the "current position" is always the position of the most recently shared node starting with ROOT 920 and reset to ROOT 920 after each sequence. If no matching node exists ahead of the "current" position, then the system can create a new node (base case). Event nodes are shared whenever a matching node exists ahead of the current position. The layout is unidirectional, so in the cases of repeated events, the system may render these separately as the next node(s). For each sequence and event for the Distinct Layout 915, if no matching node exists on the current step number, then the system can create a new node (base case). Unlike the Distinct Layout 915, the event nodes in Journey Layout 905 are shared whenever a matching node exists on the same step. For each sequence and event for the Sequence Layout 910, if no matching node exists as a child of the current node (starting with the ROOT 920 layer), then a new node can be created. Event nodes can be shared whenever a matching child node exists.

Figure 10:
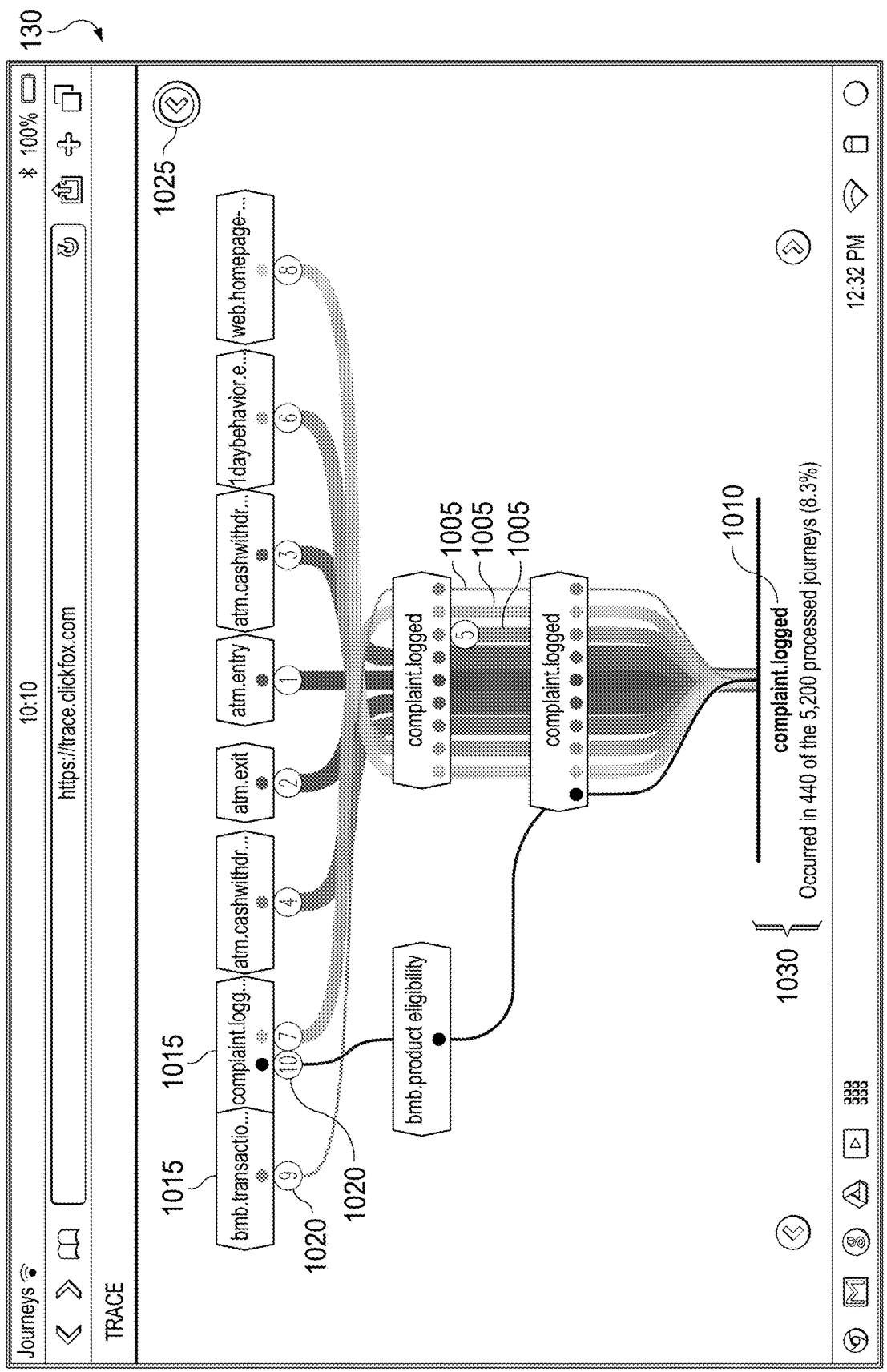
FIG. 10 is an example display of incoming sub-paths, which lead (either directly or indirectly) to a given outcome of interest, in accordance with some embodiments of the present disclosure.

FIG. 10 is an example display of incoming sub-paths 1005, which lead (either directly or indirectly) to a given outcome of interest 1010 (e.g., "complaint.logged"), according to some embodiments of the present disclosure. FIG. 10 is an exemplary graphical representation of the visualize & explore incoming sub-paths operation 130 in FIG. 1. In some embodiments and as shown, the graphical representation of the incoming sub-paths 1005 may be a visualization map of combined sub-paths, wherein the system combines identical journey paths matching selected parameters (i.e., selected events) into one representative sub-path 1005. In some embodiments and as shown, an interface may present a sub-path 1005 or any other journey path as a journey line, connecting all events within the journey. In the example embodiment shown in FIG. 10, event names 1015 within each sub-path 1005 are truncated for easy viewing, and the sub-path ranks 1020— labeled 1-10 below the event name 1015—are provided to distinguish each sub-path. In some embodiments, the graphical interface may weigh and present the sub-paths 1005 according to one of the several metrics and measures described herein to emphasize differences between the paths. For example and not limitation, the incoming sub-paths 1005 may be weighted according to a sub-path's volume, lift value, impact measure, or any other metric appreciated in the art. The interface may present sub-paths 1005 with a higher metric as a thicker line. For illustration, the sub-path "atm.entry" with label "1" is the thickest line in FIG. 10 because it is the sub-path with the highest volume; conversely, the sub-path "complaint.logg . . . " with label "10" is the thinnest line because it is the sub-path with the lowest volume. In some embodiments, the interface may present the weighted sub-paths 1005 with increasing or decreasing opacity, thereby showing which sub-path has a higher metric. In some embodiments, the interface may use other color-coding methods, and a color-coding legend may or may not be provided in the interface.

Figure 11:
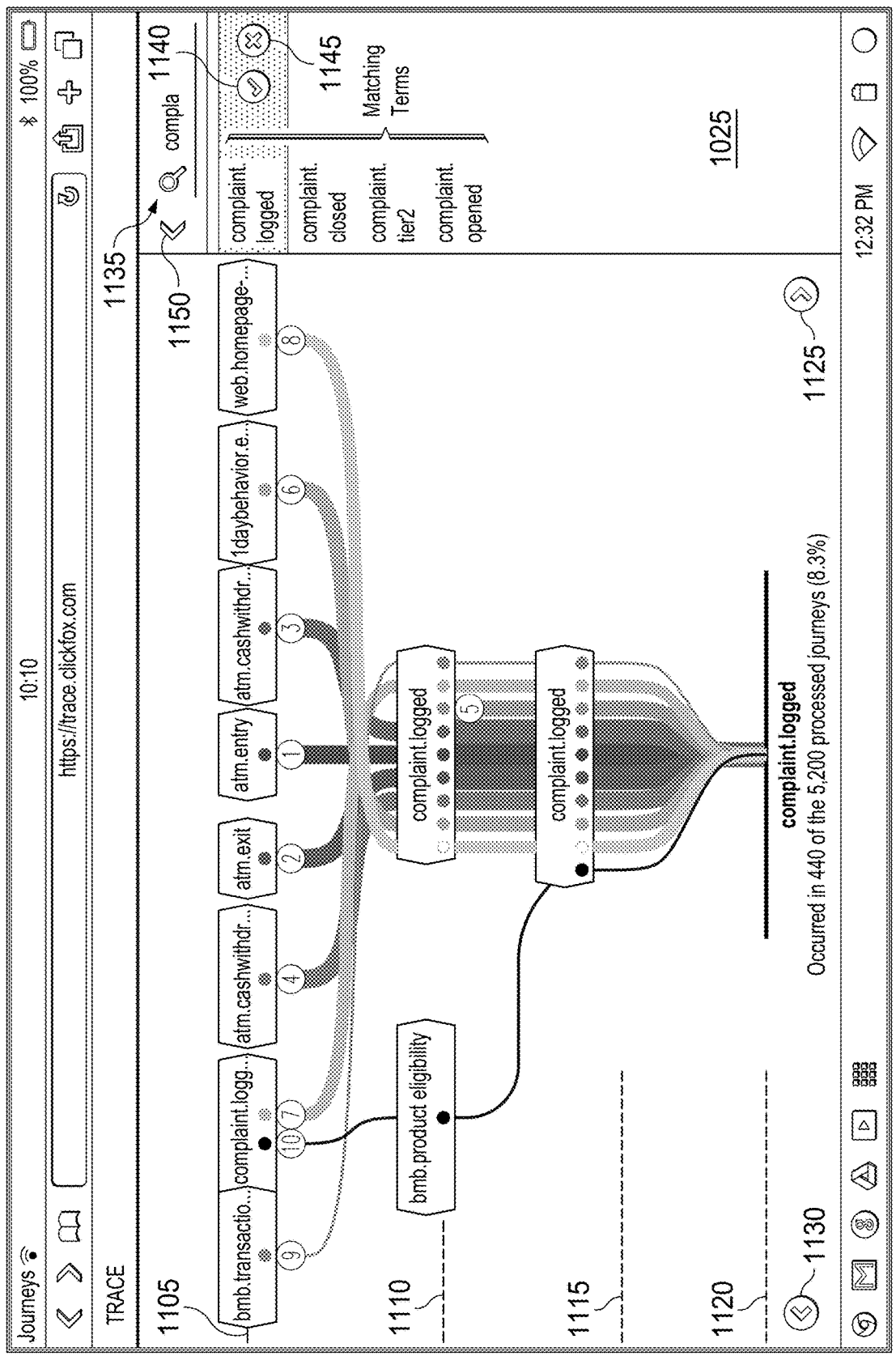
FIG. 11 is an example incoming sub-path view having both a visualization map panel and an exemplary event search option menu, in accordance with some embodiments of the present disclosure.

The layout algorithms used by the present systems and methods to display the paths may allow for configurability to either permit or prohibit overlapping sub-paths 1005 (i.e., overlapping journey lines). In addition to this, the present technology may provide additional user-specified arrangements based on attributes, metrics, or measures that can be used by the system to facilitate comparison or otherwise emphasize similarities or differences between the incoming sub-paths 1005. For example and not limitation, in some embodiments, a graphical interface may arrange the paths in alternating descending order, starting with the first in the center of the visual field. Such an embodiment may present the most "Dominant Paths" (i.e., sub-paths with the highest metric such as volume) in the central part of the visual field, while the least important paths may be relegated to the periphery. Where applicable, the systems herein may enforce such arrangement rules at the point of common conjunction, as seen in FIGS. 10 and 11. In some embodiments, a system may provide an analytical filter menu 1025. An exemplary analytical filter menu 1025 is discussed further in FIG. 11. In some embodiments, the JSARF interface may provide additional quantifications of the outcome of interest 1010 in the dataset. For example, in FIG. 10, an outcome occurrence statistics bar 1030 indicates that the outcome event "complaint.logged" appeared in 440 of the 5,200 journeys present in the input dataset, accounting for approximately 8% of the total paths, in accordance with some embodiments.

In some embodiments, an incoming sub-paths view may include all events within a journey path for the individual incoming sub-paths 1005. For example, the central sub-path in FIG. 10 (noted by the path ranks 1020 numeral "1") includes three distinct event identifiers prior to reaching the outcome of interest 1010. In some embodiments of the present systems, these three distinct event identifiers represent each event within that sub-path, i.e., the incoming sub-path 1005 line is inclusive of all events and the line displays all events within the incoming sub-path 1005. In some embodiments, the incoming sub-path 1005 lines are not inclusive of all events within the journey path. For example and not limitation, in some embodiments the JSARF parses each sub-path, analyses the events, and produces incoming sub-path lines 1005 showing only events the JSARF determines to be of particular relevance. As an illustration of an embodiment wherein the JSARF only displays events of particular relevance, the incoming sub-paths 1005 of FIG. 10 may include one or more events between the two consecutive "complaint.logged" intermediate events, yet the JSARF only displays the two consecutive "complaint.logged" events as relevant events.

FIG. 11 shows the same incoming sub-path view as FIG. 10 on the left panel and an event search option menu on the right panel, according to some embodiments of the present disclosure. As will be appreciated, in some embodiments, the layout methodology employed can align the events of equal sequence-separation for easy comprehension. For example and not limitation, FIG. 11 depicts a "Paths of Three Events" level 1105, "Paths of Two Events" level 1110, and "Paths of One Event" level 1115. These length labels are shown incoming to an outcome level 1120, and Paths of Three Events level 1105 represents the maximum sub-path event-length in this embodiment. In the present example, the outcome event (e.g., "complaint.logged") is preceded by the same event for all incoming sub-paths, but for one incoming sub-path shown (path 10 which is second from the left), the second-to-last incoming event is not another "complaint.logged," but is instead "bmb.product eligibility."

In some embodiments, the interface may indicate which paths are the longest (i.e., most events to outcome) in the returned set. For example, FIG. 11 indicates the longest incoming sub-paths are of length three (as measured from the outcome of interest), in accordance with some embodiments. One path in this current view of results (path 5) is only of length two. This map view is not exhaustive of the results from the primary processing stage, as the exemplary figure only depicts the top ten ranked sub-paths reaching the selected outcome; an interface may display any number of sub-paths. Some embodiments may provide navigation arrows to move to a subsequent, or previous, group of sub-paths to map and analyze (for example, via the exemplary "show next 10 paths" button 1125 and "show previous 10 paths" button 1130 in the figure).

In some embodiments, subsequent to a user selecting an analytical filter menu 1025 button (as shown in FIG. 10), the interface may provide a search panel 1135. In some embodiments, a user may type a partial word (e.g., "compla," as shown) into the search panel 1135, and the system may return event names matching the partial word. The system may allow a user to exclude 1140 or include 1145 the returned event in the rendered visualization map. In some embodiments, the interface may provide an additional set of filters, for example by selecting a filter menu toggle 1150.

Figure 12:
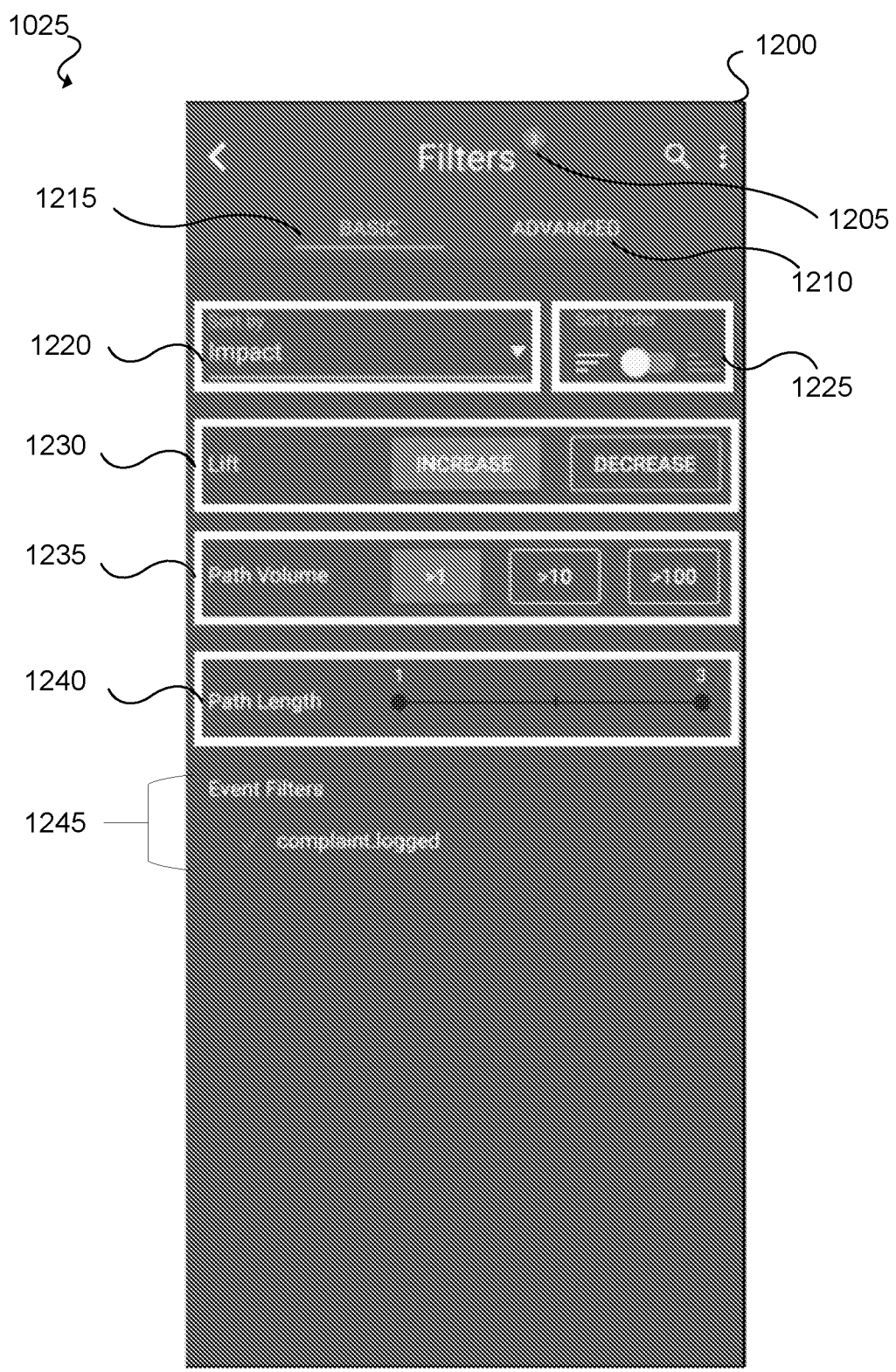
FIG. 12 is an example panel showing exemplary positioning and significance of various filtering and sorting options that may be available in a JSARF, in accordance with some embodiments of the present disclosure.

FIG. 12 is an example Basic Filters Panel 1200 showing exemplary positioning and significance of various filtering and sorting options that may be available in the systems, according to some embodiments of the present disclosure. A Basic Filters Panel 1200 is one realization of a first-pass statistical analysis of the selected sub-paths in a dataset. A Basic Filters Panel 1200 may provide a user with useful tools to further limit or increase the number of paths shown in an interface. In some embodiments and as shown in the figure, the Basic Filters Panel 1200 may be accessed via the filter menu toggle 1150 (also shown in FIG. 11). In some embodiments, the interface may indicate the number of filters currently applied to the dataset via a basic filter counter 1205. The colored font color and underlining below the term "basic" indicates the user is in the current "Basic Filters" mode, whereas the un-highlighted text of the Advance Filter indicator 1210 is shown by contrast. In some embodiments, an interface may include a selection menu indicator 1220. In some embodiments, the selection menu indicator 1220 may alter how the systems described herein display the graphical representations of sub-paths. For instance, a selection menu indicator 1220 may be set to sort the sub-paths in a graphical interface by volume, lift value, impact measure, or any other metric appreciated in the art. In FIG. 12, the selection menu indicator 1220 is set to sort by impact measure, and a sort order slider 1225 indicates the impact measures are to be sorted in descending order, in accordance with some embodiments.

In addition to sorting incoming sub-paths, a Basic Filters Panel 1200 may provide focus on paths of interest for the analysis. In some embodiments, the interface includes metrics and measures to focus analysis to particular sub-paths. For example and as shown in the figure, the system may provide statistical lift selector buttons 1230 that limit the analysis to only those sub-paths which are more likely to result in the outcome of interest ("INCREASE") or those which are less likely to result in the outcome of interest ("DECREASE"). These lift-selector settings may help the user understand the reinforcing or weakening nature of the events contained within the sub-paths in each set. A system may also include a path volume filter 1235. This filter, according to some embodiments of the disclosed technology, may limit the paths returned to only those found above a certain volume in the dataset. For example, the filter 1235 may allow a user to select sub-paths with ">1" (used to reset to viewing all), ">10" (for small volume sub-paths), and ">100" occurrences in the dataset. As will be appreciated, these options give the user additional command over which paths are featured in the current analysis.

In some embodiments, an interface may provide a path length selection slider 1240. In some embodiments, and as shown, the path length selection slider 1240 may be a two-selection slider that allows for the specification of both ends of a range of values (e.g., number of events in the sub-path). As an example, a user may be interested in viewing only those incoming sub-paths that lie in the range between 2 and 3 events (inclusively). The user in this instance may move the lower end to the "2" position and the upper end to the "3" position. Alternatively, the user may only be interested in paths of exactly 3 events in length. In this case, the user may move both ends of the slider to the "3" position. The systems described herein allow any number of steps to be included in the analysis and visualization. In some embodiments, an interface may provide an event filter 1245. This filter can receive text input to filter for events in incoming sub-paths that contain the events specified. For example, FIG. 12 shows a scenario where a user has specified that sub-paths shown will contain the event "complaint.logged."

Figure 13:
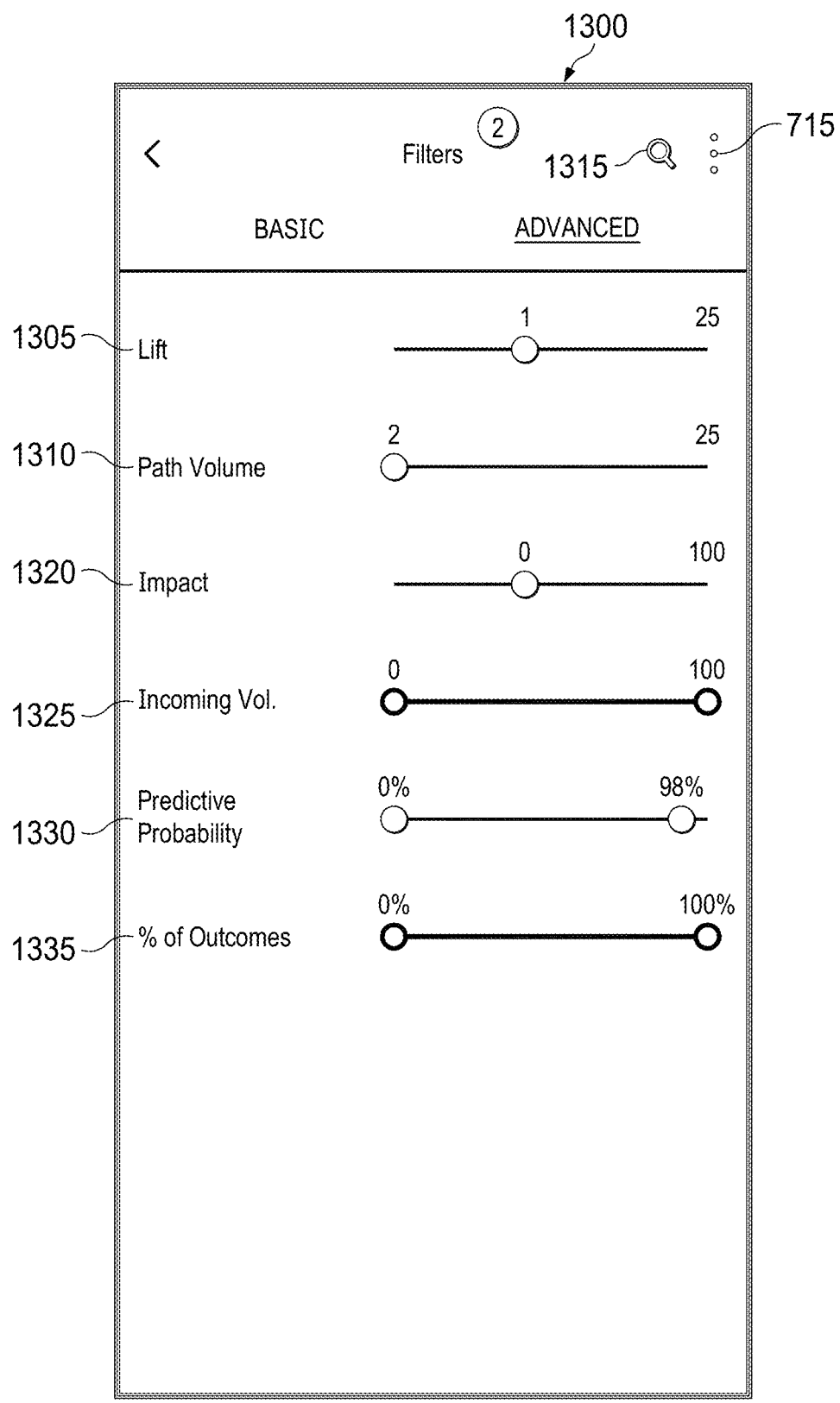
FIG. 13 is an example panel showing exemplary positioning and significance of additional advanced and secondary metrics and measures, as well as their corresponding selecting sliders, in accordance with some embodiments of the present disclosure.

FIG. 13 is an example Advanced Filters panel 1300 showing the positioning and significance of additional advanced and secondary metrics and measures, as well as their corresponding selecting sliders, according to some embodiments of the present disclosure. In some embodiments, advanced filters may be applied to narrow the full set of results down to a subset of interest, according to some embodiments of the present disclosure. This again is one realization of a first-pass statistical analysis of the selected sub-paths in a dataset. This panel may contain options similar to the Basic Filters Panel 1200 but with more advanced selection criteria. For instance, this interface may also provide the ability to filter based on lift (via a lift slider 1305) and volume (via a path volume slider 1310), but in this exemplary filter interface, the user may select a finer range of values for each of these, with the double-ended slider mechanisms described in FIG. 12. In some embodiments, the interface may provide an off-screen menu 715 icon, which may lead to the same menu as other off-screen menus, such as the off-screen menu described in the discussion for FIG. 7 and shown in FIG. 30. In some embodiments, the interface may include a search icon 1315.

The filters in this Advanced Filters panel 1300, and in various embodiments of the present disclosure, may automatically exclude data which is already de-selected by the action of previous filtering, such as those filters added in Basic Filters panel 1200. For instance, if a user previously selected statistical lift values from 1 to the end of the range in Basic Filters panel 1200, selecting impact values (via impact slider 1320) less than zero is not an option—as this corresponds to the same range of inputs specified by the lift filter. In some embodiments, the systems may perform filtering based on "impact" (i.e., via the exemplary impact slider 1320). "Impact" is an advanced statistical measure that combines aspects of the statistical lift and volume; the measure is discussed in greater detail in FIG. 14. The systems may also allow filtering based on incoming volume (i.e., via the exemplary incoming volume slider 1325). Filtering by "incoming volume" refers to filtering based on the number of occurrences in the population, regardless of whether it resulted in the specified outcome.

In some embodiments, the systems may perform filtering based on predictive probability (i.e., via predictive probability slider 1330). In some embodiments, and as shown, the predictive probability may range from 0-100%. As will be understood by one of skill in the art, the predictive probability refers to the percentage of paths that are followed by an outcome of interest. For instance, if the indirect sequence of events "A," "B," "C," and "D" always contained the outcome event "E," then the predictive probability for the incoming sub-path of ("A," "B," "C," and "D") to outcome "E" would be 100%. In some embodiments, the systems may perform filtering based on percent of outcomes (i.e., via exemplary percent-of-outcomes slider 1335). This filter may control the number of incoming sub-paths that result in the outcome of interest and may range from 0-100%. As will be appreciated, although the illustration provides six filter options, any other filter option, including but not limited to any other statistical measure or metric, may be included in an Advanced Filters panel 1300.

Figure 14:
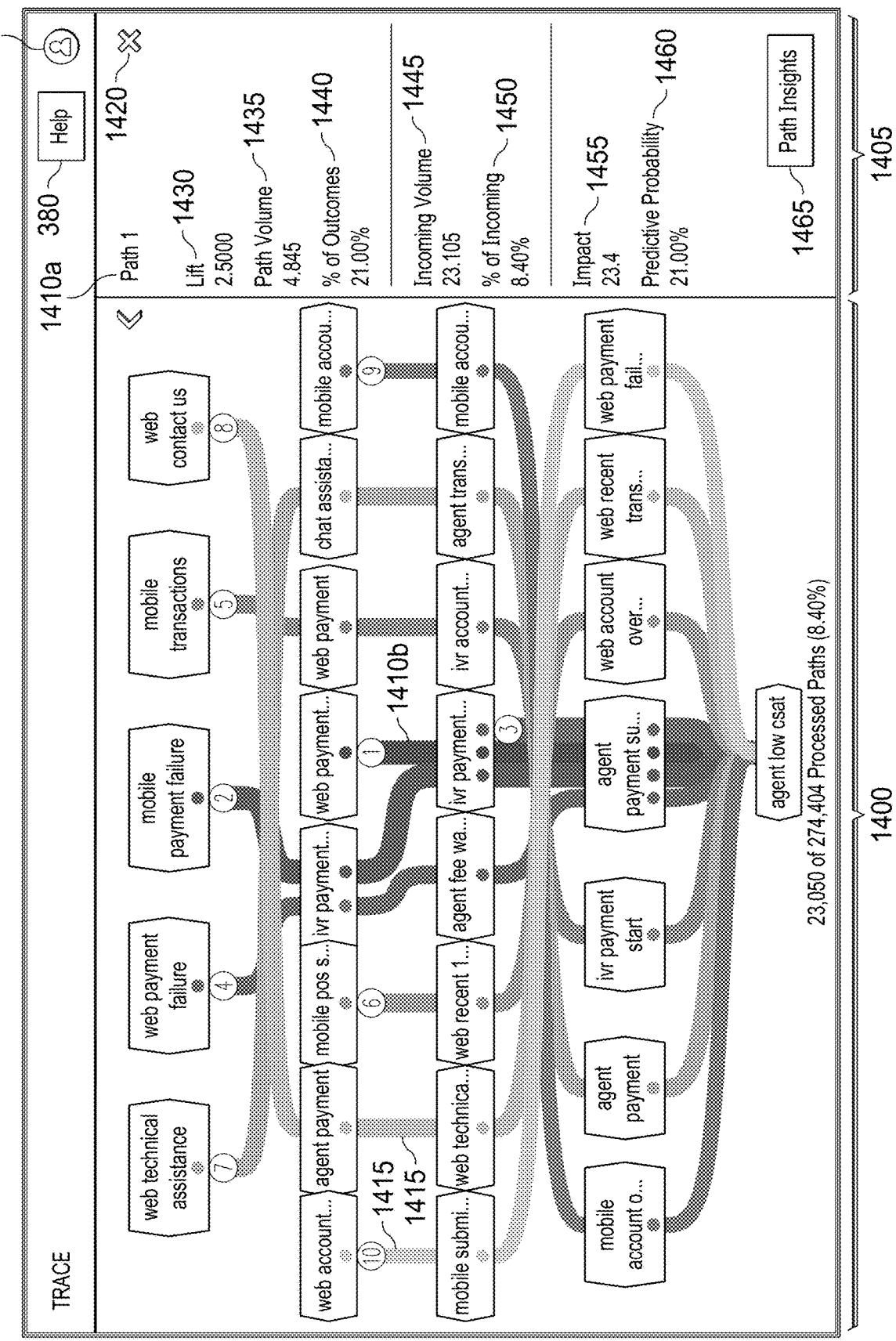
FIG. 14 is an example view of an exemplary dataset depicting sub-paths in alternating colors, and providing a selected-path statistics panel, in accordance with some embodiments of the present disclosure.

FIG. 14 is an example incoming sub-path view 1400 of a dataset using alternate sub-path colors, according some embodiments of the present disclosure. In some embodiments, and as shown in the figure, the systems may also provide a path stats panel 1405. The path stats panel 1405 may indicate which path from the visualization map is selected for review. For example, in the figure and in some embodiments, the panel may indicate a selected sub-path 1410a (e.g., Path 1) has been chosen for analysis from the plurality of incoming sub-paths 1415 (which includes all ten incoming sub-paths) in the view 1400. The path stats panel 1405 also may display advanced metrics and measures for the corresponding selected sub-path 1410a. In some embodiments and as shown, alternate colors may be employed to emphasize the more dominant paths of the plurality of sub-paths 1415. An example incoming sub-path view may provide many of the features discussed in FIG. 1, particularly the path selection and exploration interface 145.

In some embodiments, a path stats panel 1405 may indicate which path has been selected for analysis (i.e., "Path 1" in the figure). The user-selected sub-path 1410a may correspond to the same sub-path shown in the incoming sub-path view 1400, which is indicated in the figure as selected sub-path 1410b. In the present illustration, the selected sub-path 1410b comprises three distinct events, "web payment . . . ," "ivr payment . . . ," "agent payment su . . . ," and one outcome event, "agent low csat." In some embodiments, the interface may include a close path stats icon 1420, which may remove the menu from the interface view. Some embodiments of the present view may include a user account access icon 1425, which may provide additional settings, such as those shown in FIG. 31. In some embodiments, the interface may provide access to Help/Tutorial menus 380, which are described in FIG. 3 and discussed in detail in FIGS. 27 and 28.

In some embodiments, the systems may process and display the metrics and measures for a selected sub-path 1410a. These metrics and measures may include any of those described herein or are appreciated in the art. In some embodiments, and as shown, the interface may indicate the lift measure 1430 for the selected sub-path 1410a. As discussed previously, the lift is a statistical measure that conveys the likelihood of a sequence of preceding (or subsequent) event(s) occurring relative to the base population or random sampling of the set. The system may process and display the selected sub-path's volume measure 1435, as described herein. The system may process and display a percentage of outcomes measure 1440, which refers to what percent of these incoming sub-paths resulted in the outcome. The system may process and display an incoming volume measure 1445, which refers to the number of times the selected incoming sub-path appears in the dataset, regardless of whether it resulted in the selected outcome. The system may process and display a percentage of incoming population measure 1450, which refers to the percentage of all incoming sub-paths leading to the outcome that are identical to the selected sub-path 1410a or 1410b. The system may process and display an impact measure 1455, which refers to the advanced statistical calculation described herein which combines aspects of the statistical lift and the volume of the incoming sub-path. This measure can have positive values for paths which are more likely to result in the outcome, can have negative values for paths which are less likely to result in the outcome, and accounts for path volume. For example, two paths may have equal likelihoods of resulting in a given outcome, but the path with the highest volume will have a higher impact score. The system may process and display a predictive probability measure 1460 for the selected sub-path, which is described herein. In some embodiments, the system and interface may include a "Path Insights" button 1465. According to some embodiments of the present disclosure, a "Path Insights" button 1465 may launch the secondary analytical and exploratory processes introduced as Path Insights Feature 255 in FIG. 2 and described in detail in FIG. 3.

Figure 15:
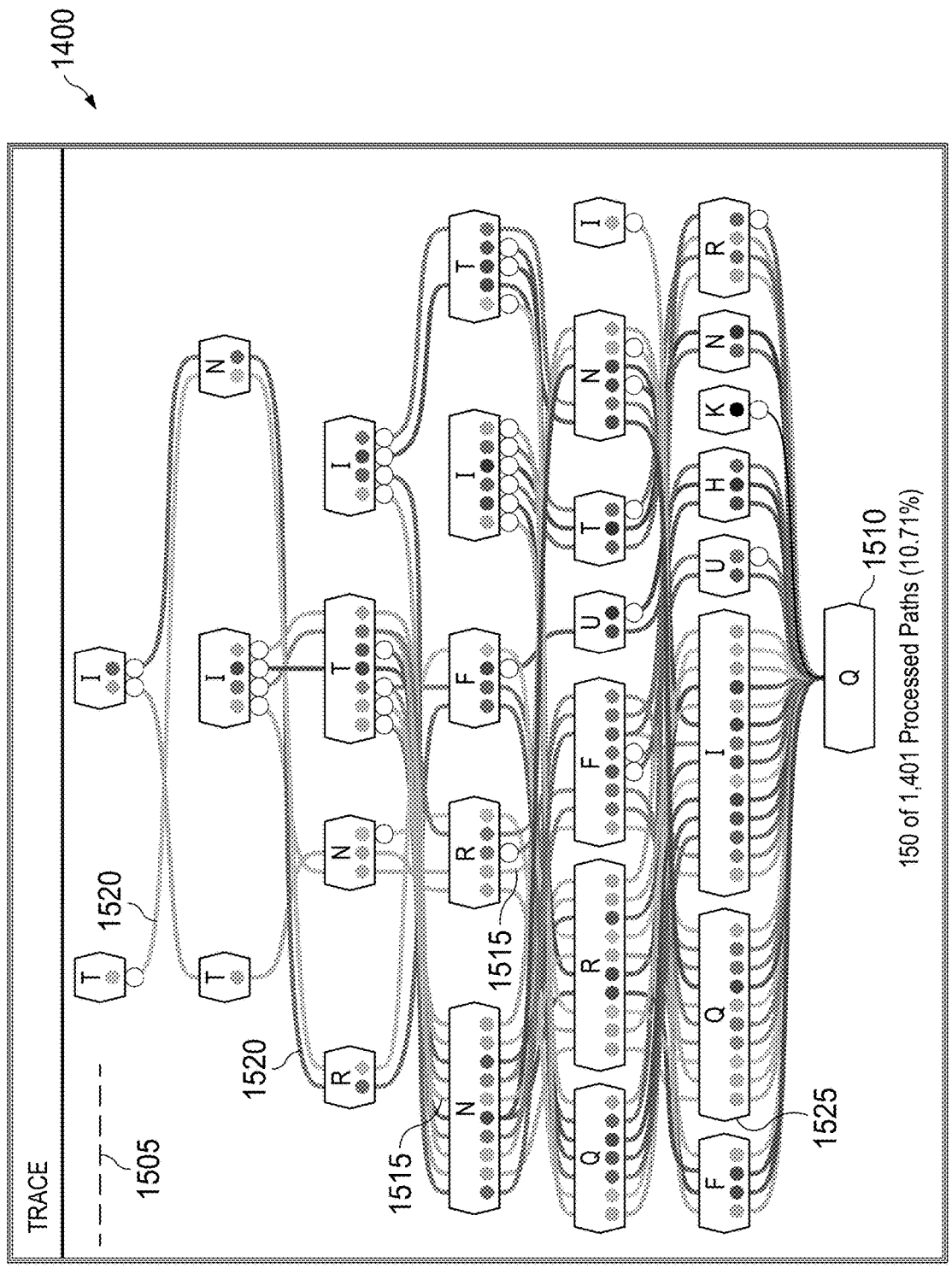
FIG. 15 is an example view of an exemplary dataset depicting path length and displaying relative path significance, in accordance with some embodiments of the present disclosure.

FIG. 15 is an additional example incoming sub-path view 1400, according to some embodiments of the present disclosure. As previously described, any interactive interface disclosed herein may display the number of distinct events (i.e., the length) of each sub-path on its journey to the selected outcome. FIG. 15 shows both a maximum incoming sub-path length 1505 of six (indicated by the six levels of events prior to the outcome 1510) as well as an alternate visual path emphasis mechanism capable with the presently discussed technology. According to this and other embodiments, a finite number of top color-emphasized sub-paths 1515 may be displayed with decreasing opacity effects, depending on the metrics previously described. Beyond this finite number, the remaining bottom color-deemphasized sub-paths 1520 may be shown in grayscale. Additionally, as with any view and any path representation described herein, the bottom color-deemphasized sub-paths 1520 may also be displayed with decreasing opacity effects or differing widths. The exemplary incoming sub-path view 1400 of FIG. 14 also shows how the currently described systems may return intermediate events that are identical to the outcome event. For example, in FIG. 14, the intermediate event "Q" 1525 is shown appearing before the "Q" outcome 1510. This may represent a journey path that reached an outcome event one or more times before ultimately terminating at the outcome event.

Figure 16:
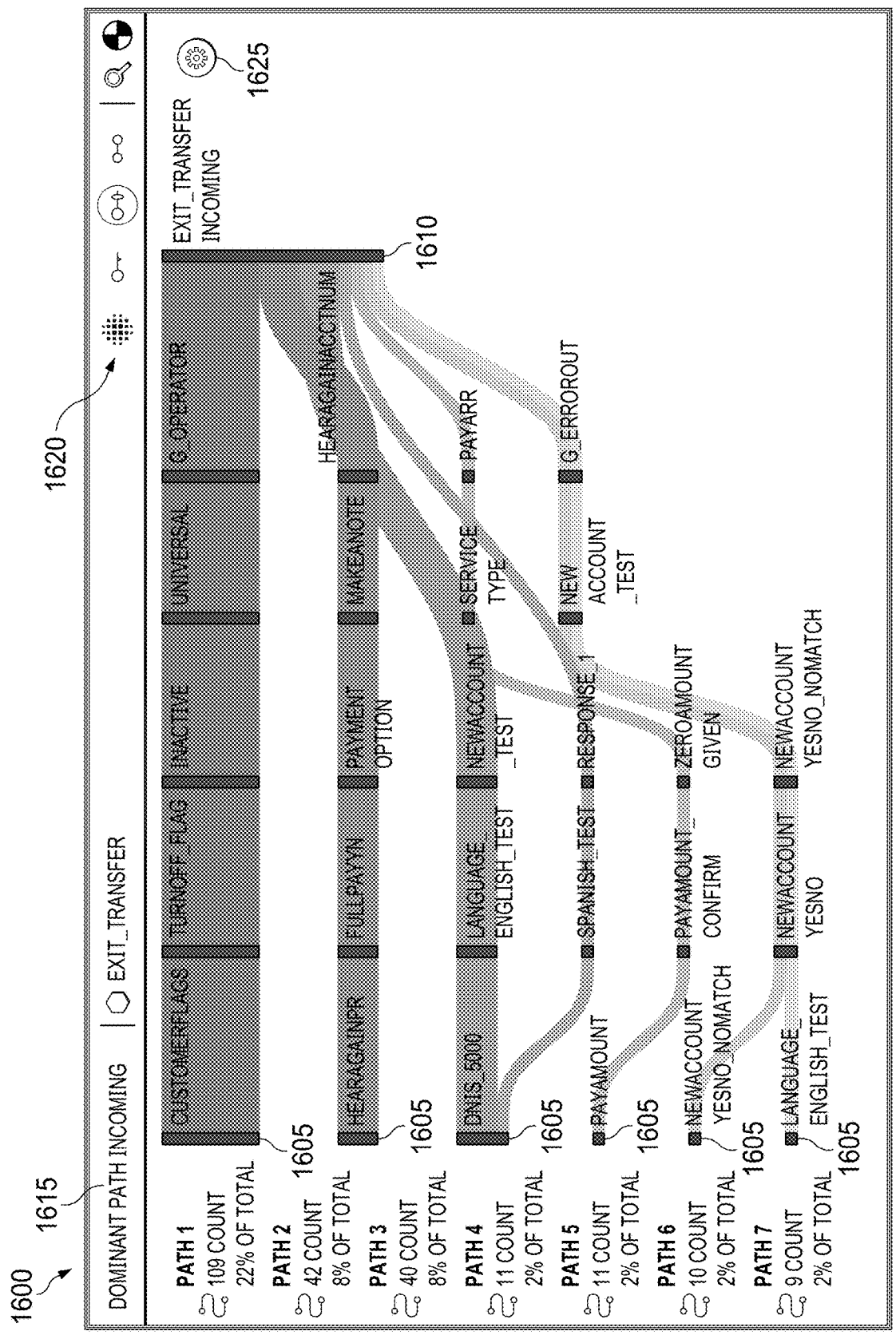
FIG. 16 is an example view, showing various horizontally-oriented paths where incoming sub-paths all originate from distinct events and all lead to the same outcome, in accordance with some embodiments of the present disclosure.

FIG. 16 is an example Dominant Path view 1600, showing various horizontally-oriented paths where incoming sub-paths originate from distinct starting events 1605 and lead to the same outcome event 1610. This embodiment shows an alternative layout map that is capable with the present systems and methods. Such an embodiment may depict either incoming or outgoing paths, depending on whether a user selects an outcome event or a starting event. The Dominant Path view 1600 in FIG. 16 corresponds to an incoming display, as shown by a mode display 1615 indicating the current view is of a "Dominant Path Incoming." In some embodiments, different modes may be available in a Path Visualization mode-selection menu 1620. In some embodiments, settings for the Dominant Path view 1600 can be accessed by selecting the dominant path settings menu 1625. In some embodiments and as shown, the paths rendered by the present technology may have widths that are proportional to the respective incoming or outgoing sub-path's volume. The width of the paths may also be proportional to the lift value, impact measure, or any other metric disclosed herein or appreciated by those having skill in the art. In addition to this weighting, the paths may also be color coded and/or labeled, in accordance with some embodiments of the present disclosure. In some embodiments, the systems and interface may provide a path legend and statistics panel 1630 for indicating metrics for each sub-path, such as counts, percentages of the total volume for each sub-path, or any other measure described herein.

Figure 17:
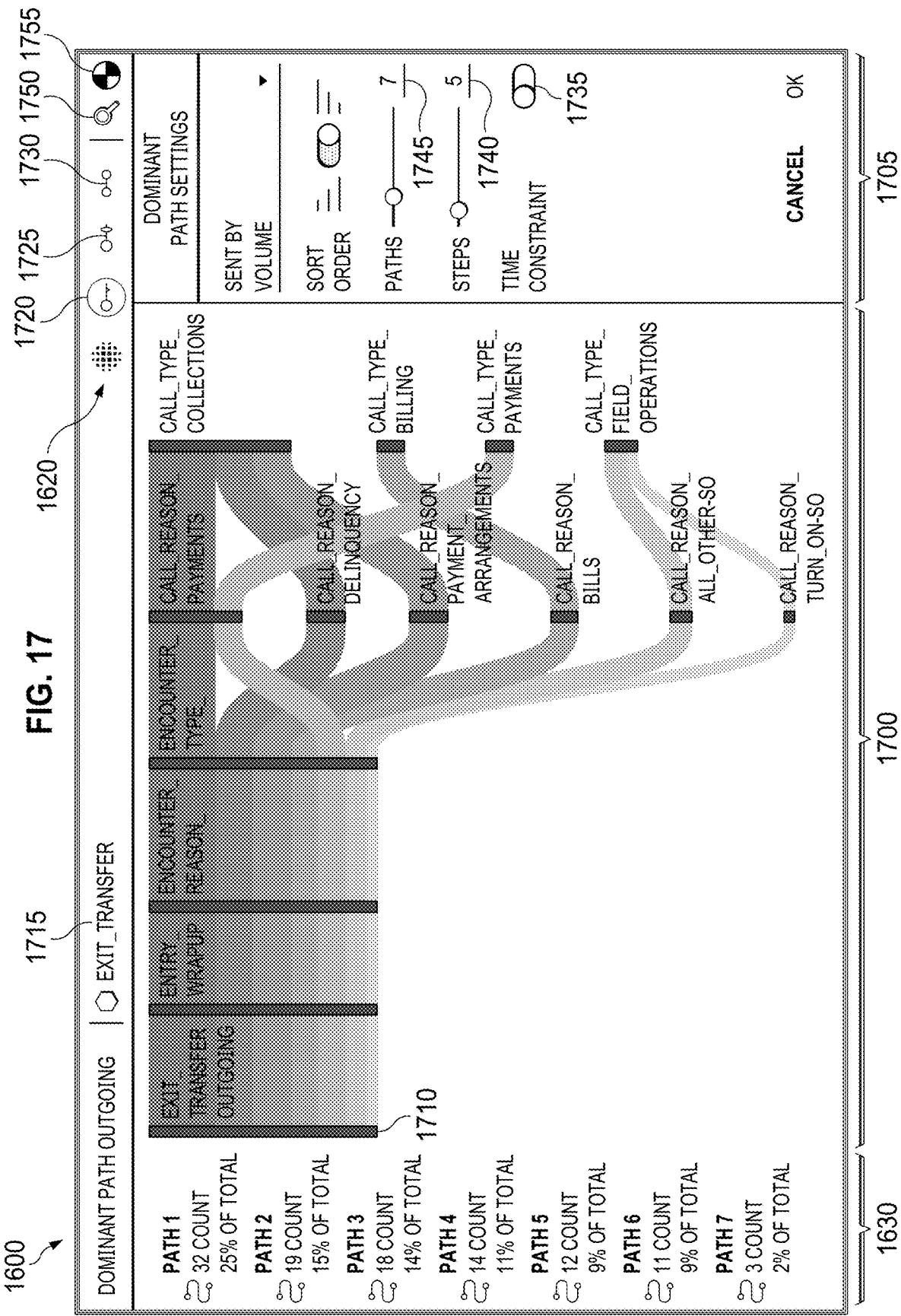
FIG. 17 is an example view wherein the sub-paths are outgoing from a common event, in accordance with some embodiments of the present disclosure.

FIG. 17 is an additional example Dominant Path view 1600 showing three main panels, according to some embodiments of the present disclosure. The figure shows how the systems and methods described herein may provide additional functionality when the interface includes a Dominant Path View. For example, some embodiments may include a path legend and statistics panel 1630 that may display all paths in the dominant path display panel 1700. Also, some embodiments may allow a user to select which metric or measure (e.g., lift, volume, etc.) the systems use to weigh the lines in the view, for example via a settings menu panel 1705. The settings menu panel 1705 may provide additional features, according to some embodiments, that control the visual representation of the journey information.

FIG. 17 is an example realization of a Dominant Path view embodiment where the system provides paths outgoing from a selected outgoing (starting) event 1710. In some embodiments, the name of the outgoing event 1710 (e.g., "exit transfer") may be provided in an outgoing event name field 1715. As described, outgoing mode 1720 is one of several operations that may be available in a Dominant Path view. In some embodiments, a user may select the mode from a Path Visualization mode-selection menu 1620. Additional configurations are possible, e.g., by selecting incoming mode button 1725 (mode described in FIG. 16) and point-to-point mode button 1730 (mode described in FIG. 18). The seven outgoing paths in FIG. 17 all share an outgoing event, all share three subsequent events, and terminate with four unique events.

Figure 33:
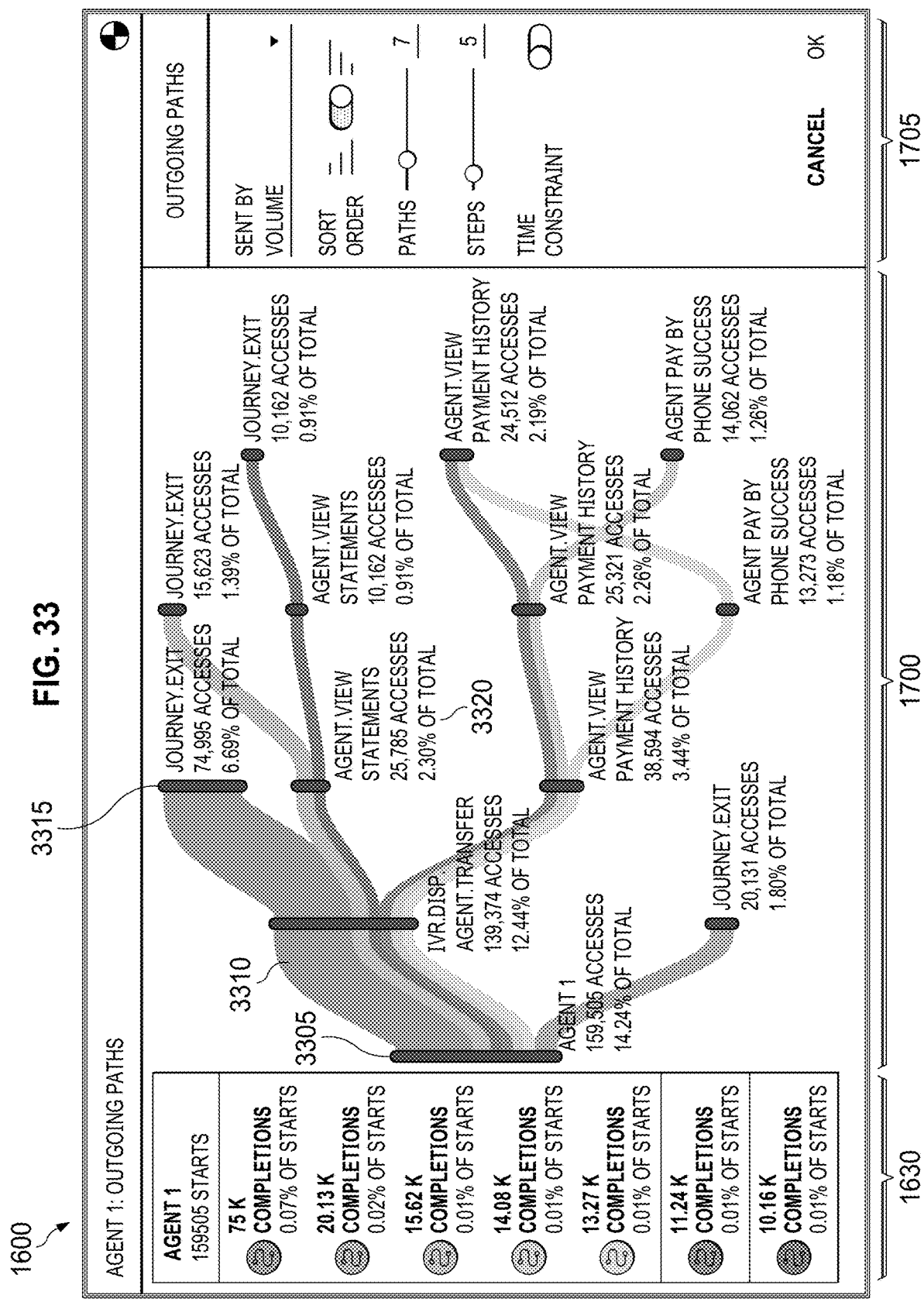
FIG. 33 is an example view wherein the sub-paths are outgoing from a common event, in accordance with some embodiments of the present disclosure.

Various options may be provided within the settings menu panel 1705 to arrange, sort, and filter according to some embodiments of the present disclosure. In some embodiments, sliding a time-based filtering toggle 1735 to an active position (to the right in the figure) may activate a "Time Constraint" filter option (discussed in greater detail in FIG. 20). In some embodiments, a user may specify a certain number of event steps to include within the dominant path display panel 1700 by adjusting a path step filter 1740. In some embodiments, the path step filter 1740 may be a unidirectional slider-selector, which limits the visualization map to a defined number of events. For example, in FIG. 17, the path step filter 1740 is set to "5," thereby returning each path's five event steps after the outgoing event 1710. In some embodiments, the number of paths displayed in the dominant path display panel 1700 may be controlled by a path filter 1745. In some embodiments, this filter may be another unidirectional slider-selector, which limits the visualization to the top n-number of paths, where n is the value in the slider. For example, in FIG. 17, the path filter 1745 is set to "7," thereby returning the top seven sub-paths having desired attributes. In some embodiments, a user may search for individual events using the event search icon 1750 and corresponding functionality. Any other filter option that has been described in the present disclosure or is appreciated by those having skill in the art may be included. In some embodiments, a user may close the settings panel, for example via a hide settings menu icon 1755. Additionally, although each view described herein, such as the Dominant Path view in FIG. 17, provides an exemplary interface that may be produced by the described systems and methods, the exemplary views are not inclusive of all views and interfaces possible with the present systems and methods. For example, FIG. 33 demonstrates an alternative embodiment of the Dominant Path interface shown in FIG. 17. The interface shown in FIG. 33 incorporates many of the elements of the outgoing event 1710 interface of FIG. 17, but the interface in FIG. 33 provides additional metrics at each intermediate event and different styling of each outgoing path.

Figure 18:
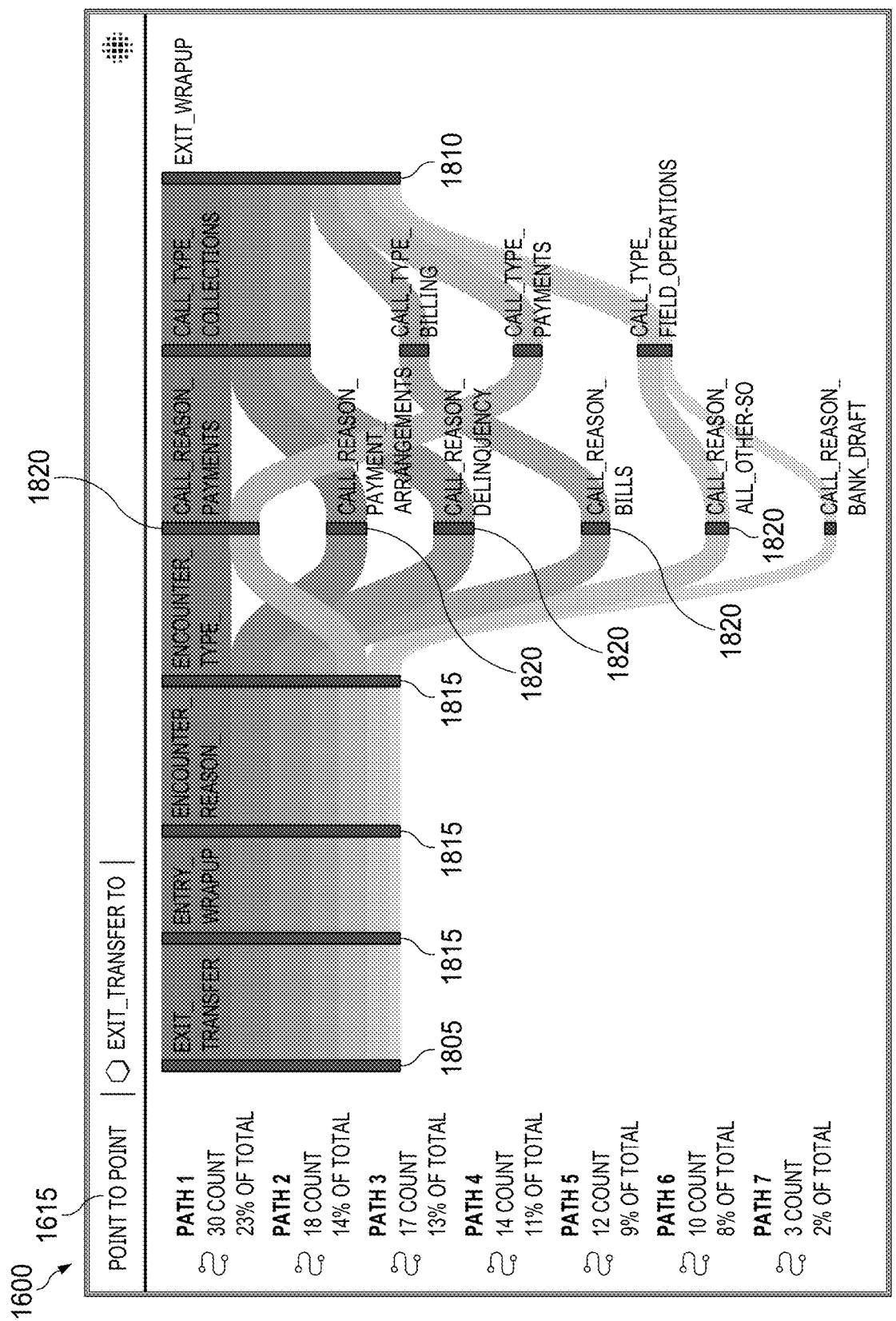
FIG. 18 is an example view showing a point-to-point display functionality, in accordance with some embodiments of the present disclosure.

FIG. 18 is an additional Dominant Path view 1600, showing the "point-to-point" display functionality described above, according to some embodiments of the present disclosure. In point-to-point mode, the system provides only those paths that originate from a common starting event 1805 and terminate with a common ending event 1810. As seen in the visualization map of FIG. 18, while some paths originate and terminate with common events, the paths may or may not have common intermediate events (i.e., events between the endpoints 1805, 1810). For example, the seven paths in the figure have both common intermediate events 1815 and distinct intermediate events 1820. The paths in the exemplary embodiment share the first three events after the starting event, and the paths have varying degrees of commonality amongst the subsequent two events. This arrangement is typical of an example point-to-point functionality. In some embodiments and as shown, a path legend and statistics panel 1630 may present summary statistics that indicate various metrics for the sub-paths in the display, as described herein.

Figure 19:
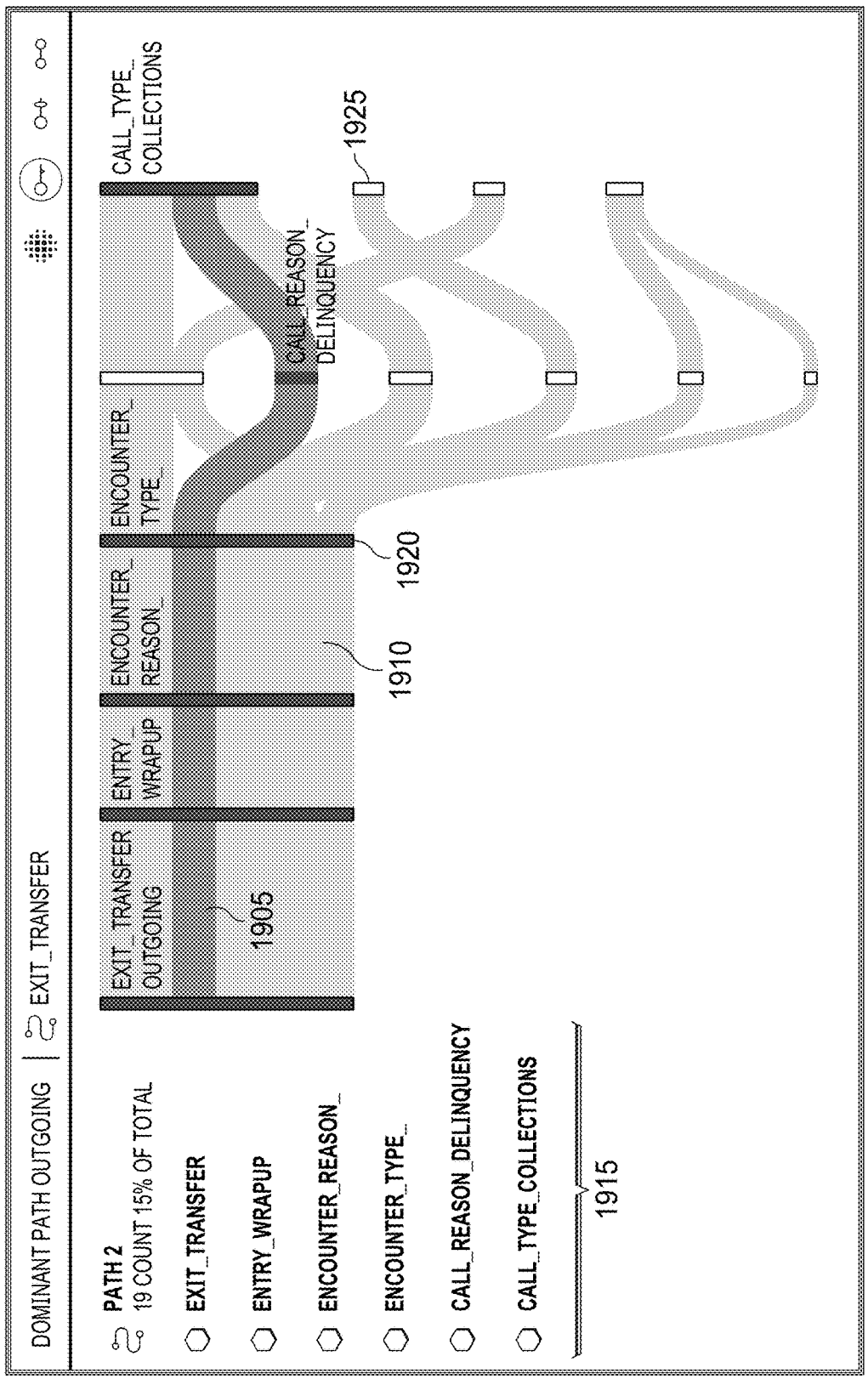
FIG. 19 is an example view wherein a single sub-path of interest is selected for analysis, in accordance with some embodiments of the present disclosure.

FIG. 19 is a further detailed view of an exemplary Dominant Path view 1600 representation, according to some embodiments of the present disclosure. In some embodiments, the systems allow selection of a single sub-path for further analysis, as shown in the figure by a single selected sub-path line of interest 1905. In some embodiments and as shown, once a user selects a sub-path line of interest 1905, the system highlights the selected sub-path in color and deemphasizes unselected paths 1910 in semi-transparent gray or other color depicting deemphasis. In some embodiments, the series of events that constitute the sub-path line of interest 1905 may be listed in the display, for example via a path-to-event sequence panel 1915. A path-to-event sequence panel 1915 may include all events within the sub-path line of interest 1905 and additional statistics including, for example and not limitation, the volume of paths within the sub-path line, the lift of the sub-path line over other sub-paths, the percentage of the total sub-paths, or any other statistic described herein or appreciated by those having skill in the art. In some embodiments and as shown, the Dominant Path view 1600 may indicate, within the visualization map of the view, events that define the sub-path line of interest 1905 with black bars 1920 and may indicate events that do not define the sub-path line of interest 1905 with white or other deemphasized bars 1925.

Figure 20:
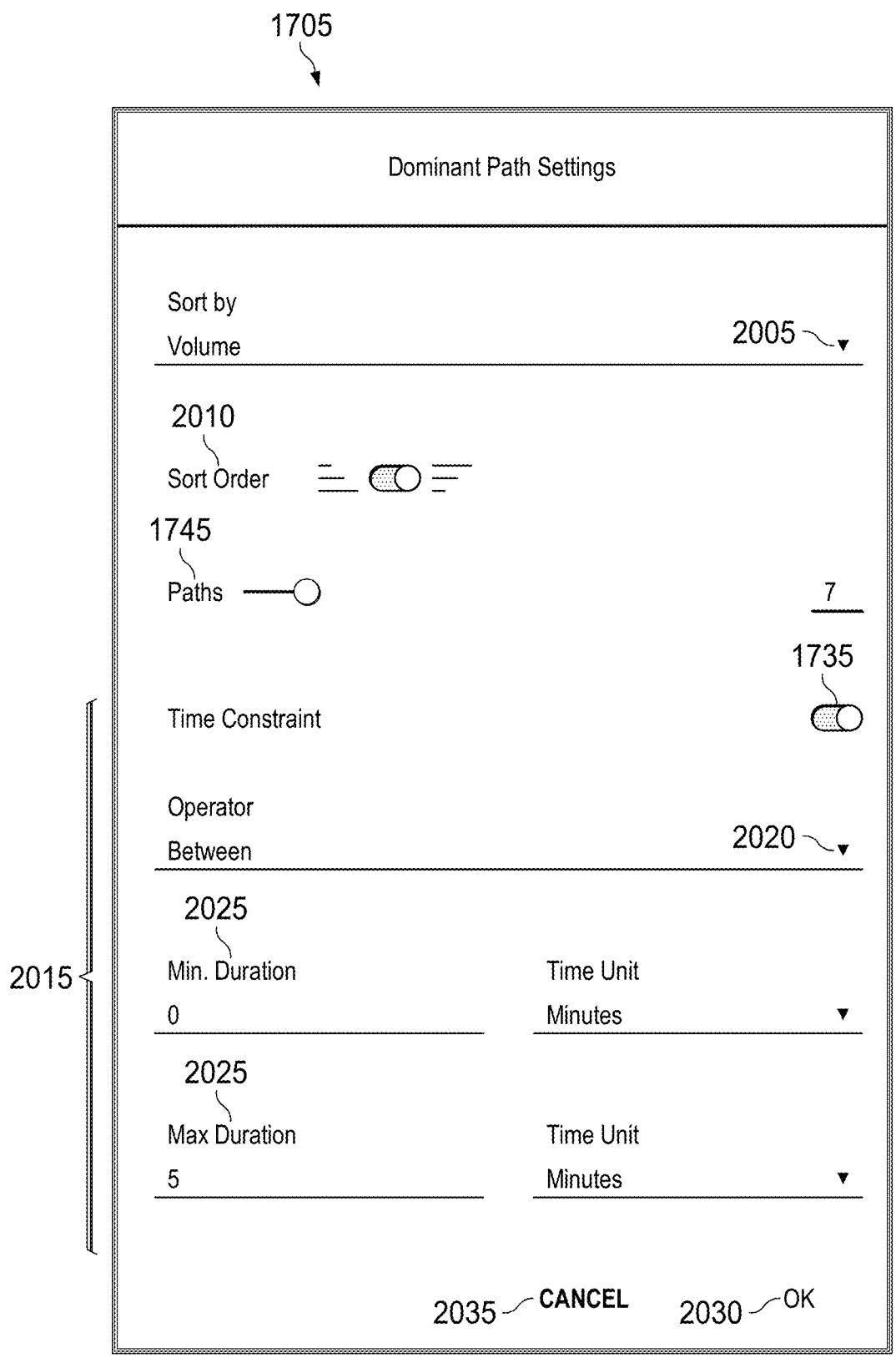
FIG. 20 is an example settings menu showing various filters and selection sort menus, in accordance with some embodiments of the present disclosure.

FIG. 20 is an exemplary Dominant Path settings menu panel 1705, as described in FIG. 17, showing various filters and selection options, according to some embodiments of the present disclosure. In some embodiments, the paths in the display may be sorted by any metric defined herein, for example via a sort-by metric 2005. The sort-by metric 2005 in FIG. 20 indicates the exemplary dataset is arranged by "Volume," in accordance with some embodiments. In some embodiments, an interface may include a sort order toggle 2010 to sort sub-paths by an ascending or descending order.

In some embodiments, and as discussed above for FIG. 17, the system may include a time-based filtering toggle 1735 to access time-constraint filters. In embodiments with a time-based filtering toggle 1735, a time-constraint submenu 2015 may be provided for filtering sub-paths based on total duration or time between events. For example, a user may wish to know if a customer took an unusually long time to navigate to a particular outcome event. A time-constraint sub-menu 2015 may comprise a logical operator pulldown menu 2020 that allows the selection of qualifiers such as "between," "greater than," "greater than or equal to," "less than," "less than or equal to," or "equal to." Time constraint duration fields 2025 may be provided to set the duration of time to be analyzed with the qualifiers. For example, if a logical operator pulldown menu 2020 is set to the qualifier "between," the system may populate a minimum and a maximum time constraint duration field 2025 for both ends of the range. The system may accept any time duration increments, such as seconds, minutes, hours, or even days. In some embodiments, the system may apply all filters in the sort-by metric 2005 upon selection of a confirm changes button 2030 or may cancel all filters upon selection of a cancel button 2035.

Figure 21:
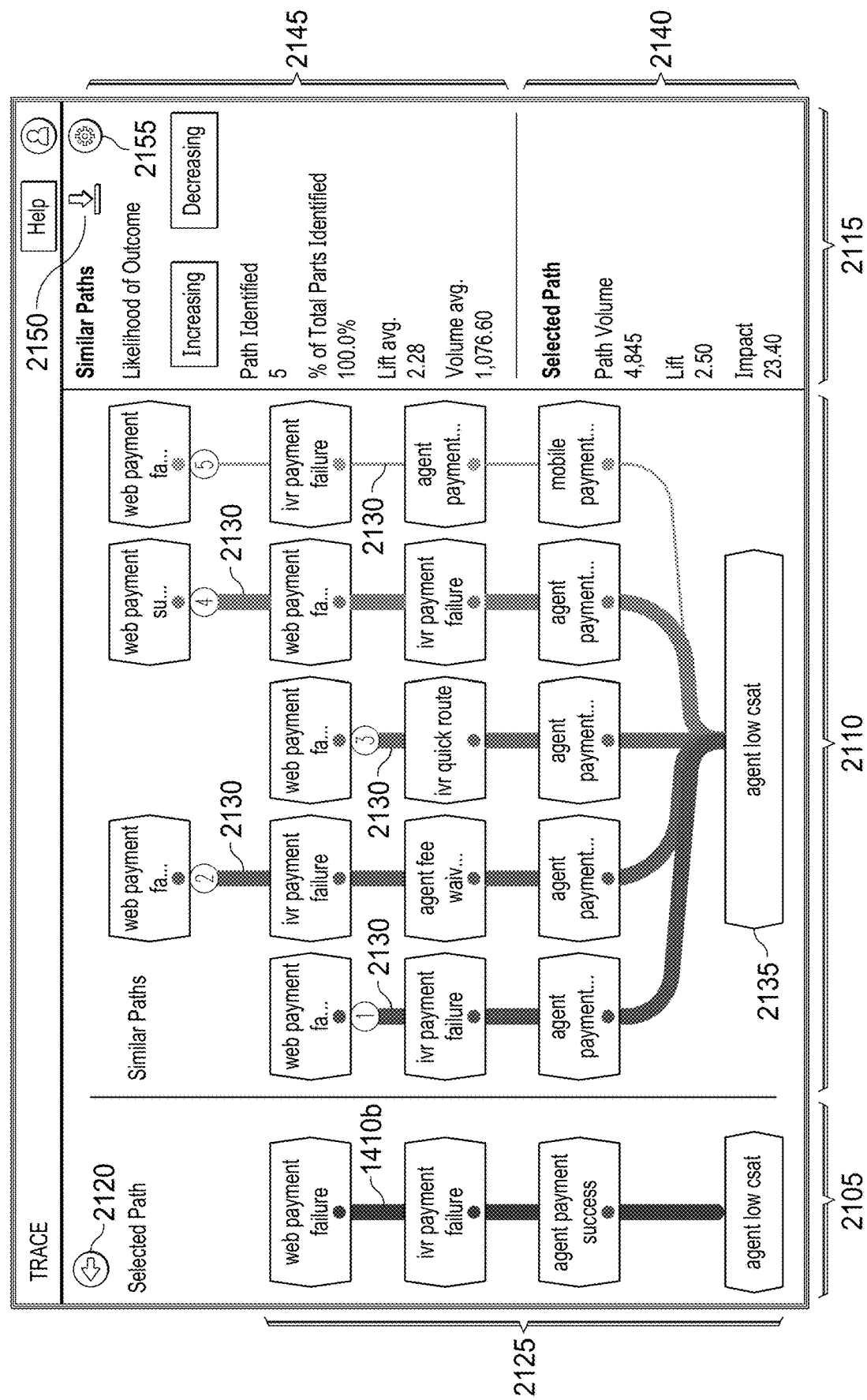
FIG. 21 is an example interactive view containing a Selected Path panel, a Similar Paths panel, and a Path Statistics panel, in accordance with some embodiments of the present disclosure.

FIG. 21 is an exemplary Similar Paths interactive screen 2100 containing a Selected Path panel 2105, a Similar Paths panel 2110, and a Path Statistics panel 2115, according to some embodiments of the present disclosure. In some embodiments, the system may display a Similar Paths interactive screen 2100 upon selection of a "Path Insights" button (shown in FIG. 14 as button 1465). The exemplary Similar Paths interactive screen 2100 in the figure is one of many realizations of the secondary analytical and exploratory processes introduced as Path Insights Feature 255 in FIG. 2. As will be appreciated, a Similar Paths interactive screen 2100 may provide detailed analysis of any sub-path selected in any of the various interactive interfaces discussed in the present disclosure. For example and not limitation, in FIG. 14, a user may select a sub-path 1410b from the incoming sub-path view 1400 for additional analysis. In some embodiments, a Similar Paths interactive screen 2100 may provide insight on the selected sub-path 1410b. This insight may include, for example, an analysis of similar, alternative paths that reach the same outcome as the selected sub-path 1410b. In some embodiments, a Similar Paths interactive screen 2100 may allow a user to return to any of the map interfaces by selecting a back button 2120.

In some embodiments, a separate Selected Path panel 2105 may display the selected sub-path 1410b. The Selected Path panel 2105 may display selected events leading to outcome 2125. In some embodiments, the JSARF may identify paths that are similar to the selected sub-path and display the paths, for example via a Similar Paths panel 2110; in the figure, the interface displays the exemplary similar paths 2130 adjacent to the selected sub-path 1410b, in accordance with some embodiments. It is conceived that a Similar Paths panel 2110 view may be like the incoming sub-path views in FIGS. 10, 11, and 14, wherein each journey line leads to an outcome 2135. However, in the exemplary Selected Path panel 2105 view of FIG. 21, the display shows the paths as non-overlapping lines (i.e., according to the Distinct Layout 915 logic configuration in FIG. 9.), which is in accordance with some embodiments. The Similar Paths panel 2110, and a description of how similar paths are calculated and displayed, is discussed in greater detail in FIG. 22.

In some embodiments and as shown, the interface may provide a Path Statistics panel 2115. In some embodiments, the interface, e.g., via the Path Statistics panel 2115, may display additional statistics and metrics for the similar paths 2130 and/or the selected sub-path 1410b. For example and not limitation, in the figure, the interface provides the statistics for the selected sub-path 1410b in a selected-path statistics sub-panel 2140, and the interface provides the statistics for the similar paths 2130 in a similar-path statistics sub-panel 2145. In some embodiments, the Similar Paths interactive screen 2100 may provide a download button 2150 for downloading all path information and statistics. The interface may provide additional settings, for example by pressing an additional-setting button 2155, which is in accordance with some embodiments.

Figure 22:
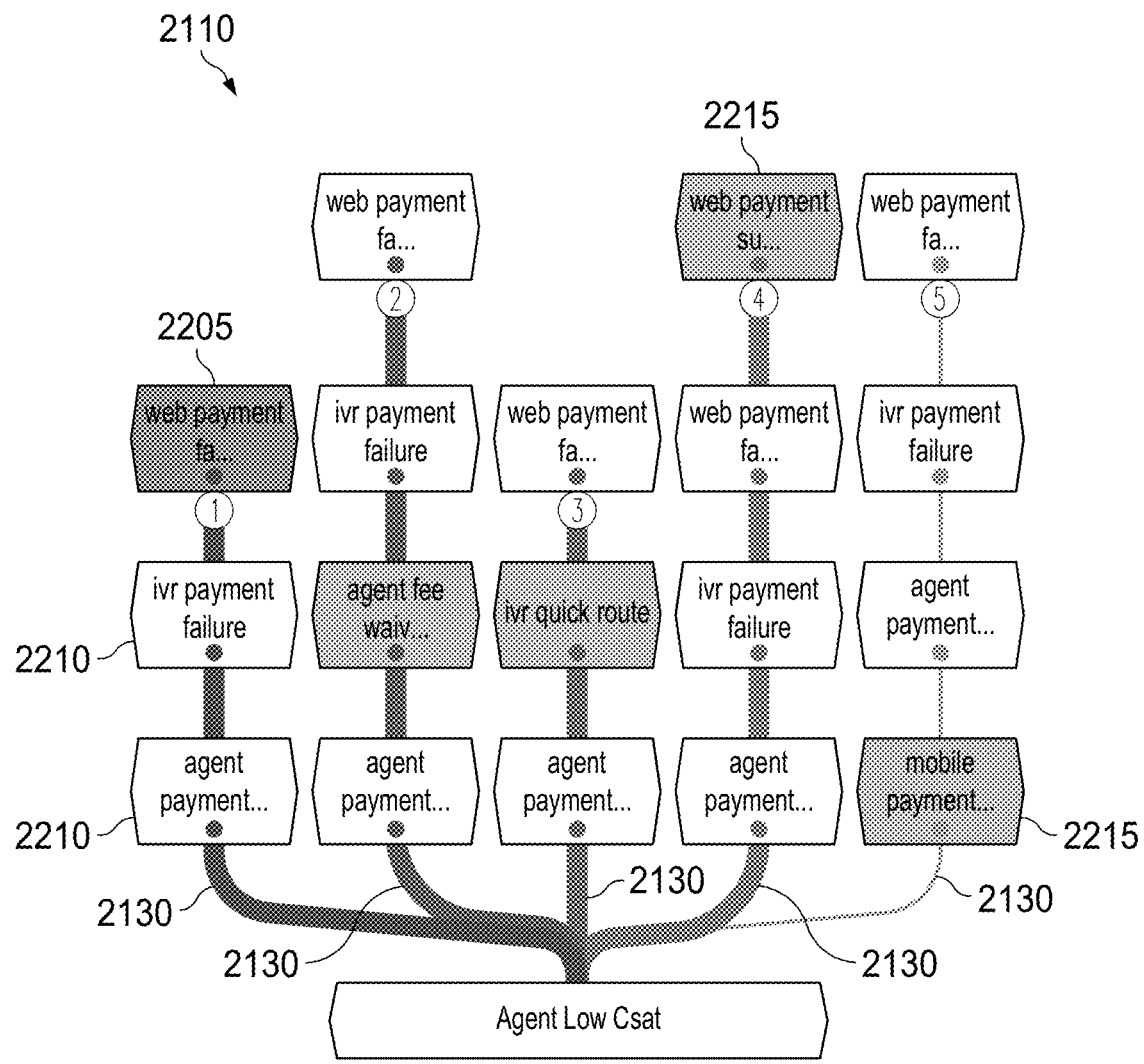
FIG. 22 is an example panel showing five paths similar to the selected sub-path and the event-changes necessary to obtain the similar paths, in accordance with some embodiments of the present disclosure.

FIG. 22 is a detailed view of a Similar Paths panel 2110 showing the first five paths similar to the selected sub-path 1410b (as shown in FIG. 21), and the event changes necessary to obtain them, according to some embodiments of the present disclosure. In one embodiment of the present disclosure, the JSARF may calculate the similarity between the selected path and all other paths by applying the information theoretic metric known as the Levenshtein distance. As will be understood by one of skill in the art, the Levenshtein distance is a metric that accounts for all the single-event edits in the paths that are necessary for one path to be transformed into another. These edits include adding, removing, or substituting events in a similar path to identify unique paths having the same outcome as the selected sub-path 1410b (as shown in FIG. 21). Additional computations serve this purpose. For example, in some embodiments the JSARF may use the cosine similarity calculation, which uses vector definitions of the selected and candidate paths and returns the mathematical degree to which they are similar or co-oriented, to calculate similar paths. As will be appreciated, other statistical methods may be used to identify similar paths, and the present systems are compatible with those methods.

In some embodiments, the edits to the similar paths 2130 may be denoted by different visual styles, as shown in FIG. 22. These visual styles may include highlighting the events in different colors or any other method described herein. Events that are removed from a candidate path (i.e., selected sub-path 1410b, not shown) to create a similar path 2130 may be displayed using any method for easy identification; for example and not limitation, removed event 2205 may be highlighted in red, which is in accordance with certain embodiments. Similarly, the events which the candidate path and similar paths 2130 share may be shown using a different highlighting method; for example and not limitation, by highlighting the shared events 2210 in white (which would include all white events on the interface. Additionally, both the events that were substituted in the candidate path and the events that were added to the candidate path may be highlighted using a third method; for example and not limitation, modified events 2215 may be highlighted in blue, signaling to the user of the JSARF the event is either new or substituted. Other highlighting methods are described herein or are known to one of skill in the art.

In some embodiments, the interface allows selection of any similar path in the Similar Paths panel 2110 for further analysis. In some embodiments, selecting a similar path may produce a summary panel of statistics providing the option to launch a secondary recommendation feature. The secondary recommendation feature may include the path insights features discussed in FIGS. 14 and 21. Selecting a path insight for a similar path may produce an additional interactive interface, discussed in greater detail in FIG. 24.

Figure 23:
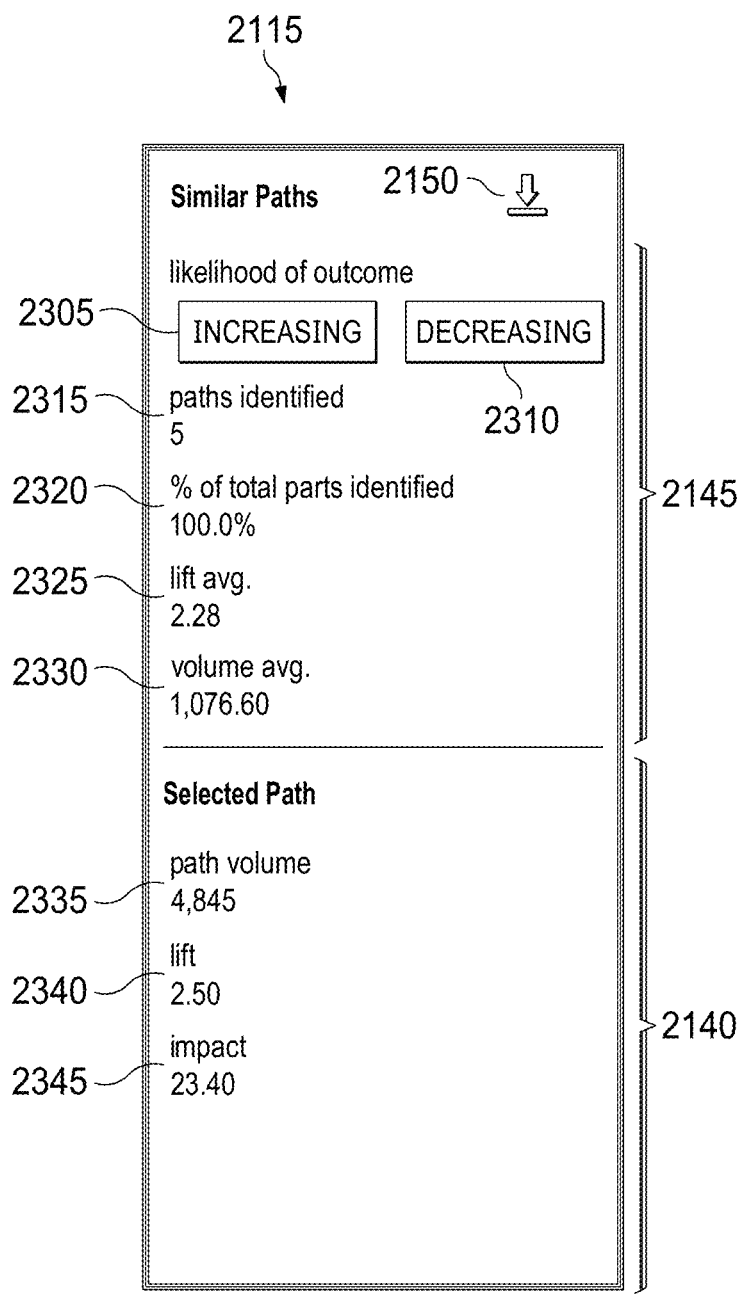
FIG. 23 is an example panel showing a plurality of filters and a multitude of both basic and advanced custom metrics and measures, in accordance with some embodiments of the present disclosure.

FIG. 23 is an exemplary Path Statistics panel 2115 detailing advanced filtering and a multitude of both basic and advanced custom metrics and measures available at a Similar Paths interactive screen, according to some embodiments of the present disclosure. From this panel, a user may download the similar path data via a download button 2150. In some embodiments, a download button 2150 may open a standard filesystem browser window to select the location and specify the name of the results file.

In some embodiments and as shown, a Statistics panel 2115 may be divided into two main categories: a selected-path statistics sub-panel 2140 and a similar-path statistics sub-panel 2145 (both previously discussed). The exemplary similar-path statistics sub-panel 2145 in the figure provides two buttons that affect what subset of similar paths will be returned by the JSARF, which is in accordance with some embodiments. Using the advanced measure of lift, as calculated by the JSARF, the system may return only those similar paths which serve to increase or decrease the likelihood of observing the outcome event over the selected sub-path. In some embodiments, this can be achieved by selecting an increasing likelihood button 2305 or a decreasing likelihood button 2310. Common cases in which a user may be interested in similar paths which decrease the likelihood of an outcome event include but are not limited to: (i) mitigating service termination or low CSAT (in the case of a customer-service journey dataset) and (ii) mitigating negative health outcomes such as continued illness, increased cost of treatment, medical misadventure, or death (in the case of a healthcare-based journey dataset). These filters buttons 2305, 2310 may limit the group of similar paths returned for the selected sub-path. Possible filter configurations are: (i) to select no filter button 2305, 2310, thereby showing all data and having metrics and measures for all similar paths, or (ii) to select one of the two and reveal the corresponding values for the metrics and measures for that set only.

In some embodiments, the interface, e.g., via the Path Statistics Panel 2115, may display additional information about the presented similar paths. In some embodiments, the interface displays these metrics in a similar-path statistics sub-panel 2145. For example and not limitation, FIG. 23 shows four metrics and measures that characterize the similar paths shown in FIGS. 21 and 22. The example interface displays the number of paths identified as being similar and matching the desired increasing/decreasing filters in the paths identified section 2315; the interface displays the ratio of this count to the total similar path count in the percent of total paths identified section 2320. The interface displays the average lift for the group of similar paths in a group average lift section 2325. The group average lift section 2325 indicates, for the entire set (no filter applied) or for a sub-group (with increasing/decreasing filters 2305, 2310 applied), how the average likelihood compares to the other journey paths in the entire dataset. Finally, the example interface displays the average number of path completions for each path group in a group average volume section 2330. The group average volume represents the average number of journeys in each of the similar paths. These four metrics are merely exemplary and are not limitations to what the interface and systems may provide.

The exemplary Statistics panel 2115 in the figure also shows a selected-path statistics sub-panel 2140, in accordance with some embodiments. The selected-path statistics sub-panel 2140 may present additional metrics and measures to characterize the selected sub-path (e.g., selected sub-path 1410b of FIG. 21). The prevalence of the selected path in the entirety of the dataset is shown by the path volume section 2335. Also shown is the lift of the selected path over all journey paths in the dataset, displayed in the selected path lift section 2340. Finally, the Impact (as previously discussed) is presented in a selected path impact section 2345.

Figure 24:
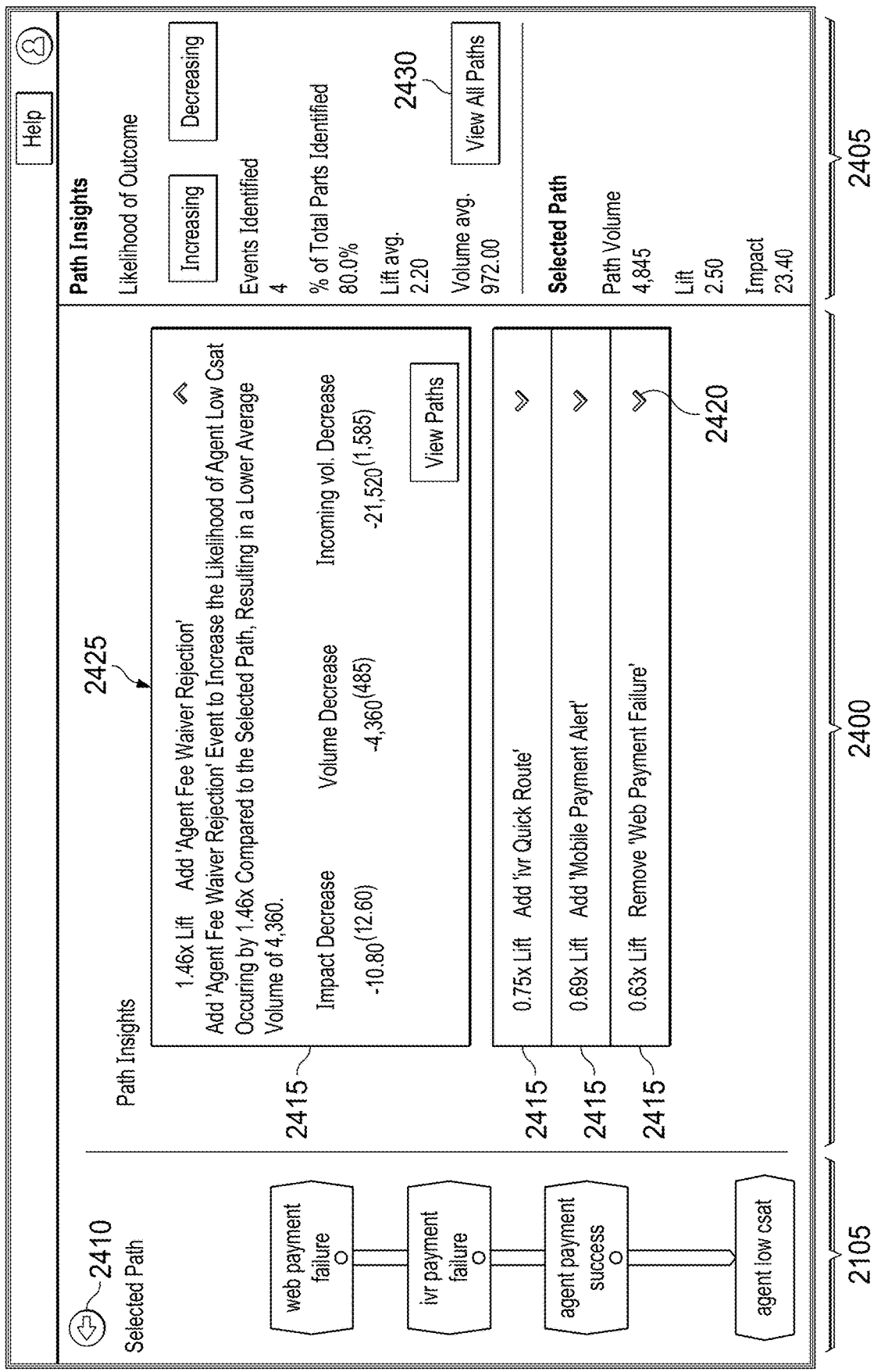
FIG. 24 is an example output of a Path Insights suite of functionality, in accordance with some embodiments of the present disclosure.

FIG. 24 is an example interactive screen containing a Selected Path panel 2105, a Path Insights panel 2400, and a Path Insights Statistics panel 2405, according to some embodiments of the present disclosure. In some embodiments, the system provides access to the present interactive screen subsequent to a user selecting a similar path and requesting path insights for the selected similar path, as previously described. An interactive interface such as the one depicted in the present figure facilitates a deeper understating of the relative importance of adding or removing specific events in the selected path. In some embodiments, a Selected Path panel 2105 may be displayed, wherein the panel contains the selected sub-path and shows the events within the path written in their entirety. A user may return to the Similar Paths interactive screen 2100 of FIG. 21, for example, by pressing the return to selected path view button 2410.

In some embodiments and as shown, a Path Insights panel 2400 may display recommendations 2415. These recommendations 2415 may include changing the events within a journey to achieve a particular goal (e.g., increasing or decreasing the likelihood of reaching an outcome event). The present embodiment shows four such recommendations 2415, and the figure is in accordance with some embodiments. The interface in the figure shows three recommendations collapsed into a summary view, which may be expanded by an expand recommendation button 2420. The interface shows an expanded recommendation 2415 at the top. In some embodiments, an expanded recommendation 2415 may include a recommendation card 2425. A recommendation card 2425 may indicate the impact of changing the path in the recommended way. For example and not limitation, the top, expanded recommendation 2415 in FIG. 24 suggests adding "agent fee waiver rejection" to a path to increase the likelihood of reaching the outcome "agent low csat." In some embodiments, the interface may allow a user to view all paths again in a visualization map by selecting a view all paths button 2430.

Figure 25:
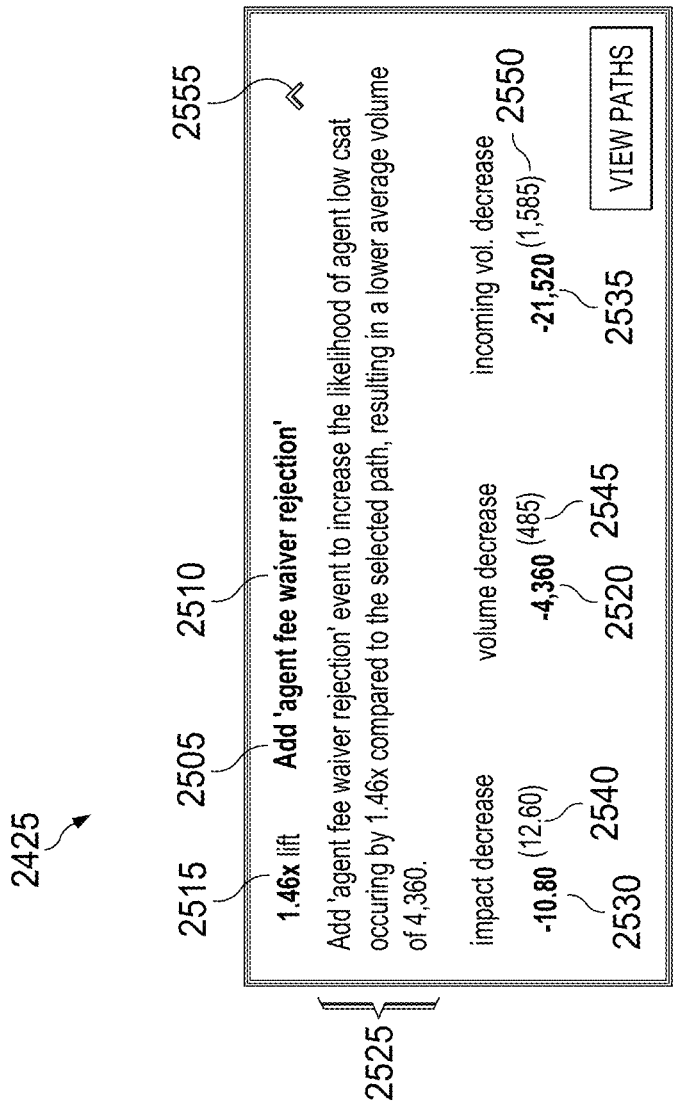
FIG. 25 is a detailed view of an example path recommendation card providing a suggested path-to-outcome change, in accordance with some embodiments of the present disclosure.

FIG. 25 is a detailed view of a recommendation card 2425 showing a suggested change in the path to the outcome, along with the expected changes in path properties, such as incoming sub-path volume and likelihood, according to some embodiments of the present disclosure. In some embodiments, a path recommendation card 2425 may include a suggested path edit 2505 that indicates whether to add, remove, or replace a suggested path event 2510. For example, in the present figure, the suggested path edit 2505 is to "add" the suggested path event 2510 "agent fee waiver rejection." In addition to recommending edits to events, some embodiments of the systems may provide the corresponding change in lift 2515 from making the suggested change. In some embodiments, the system may combine the corresponding change in lift 2515 with the average change in volume 2520 to create and display an intelligent path recommendation phrase 2525. This recommendation phrase 2525 may translate the numeric values and relations between the metrics and measures calculated by the present technology into a user-friendly, intelligent path recommendation sentence. In some embodiments and as shown along the bottom of the present recommendation card 2425, the system may provide other metrics and measures that may be of interest to a user. For example, the present embodiment shows changes in impact 2530, changes in volume 2520, and changes in incoming volume 2535. In some embodiments, the system may also display the resultant values by making the recommended change (e.g., an impact final value 2540, a path volume final value 2545, and an incoming sub-path volume final value 2550). In some embodiments, a recommendation card 2425 may be minimized by pressing a collapse recommendation button 2555.

Figure 26:
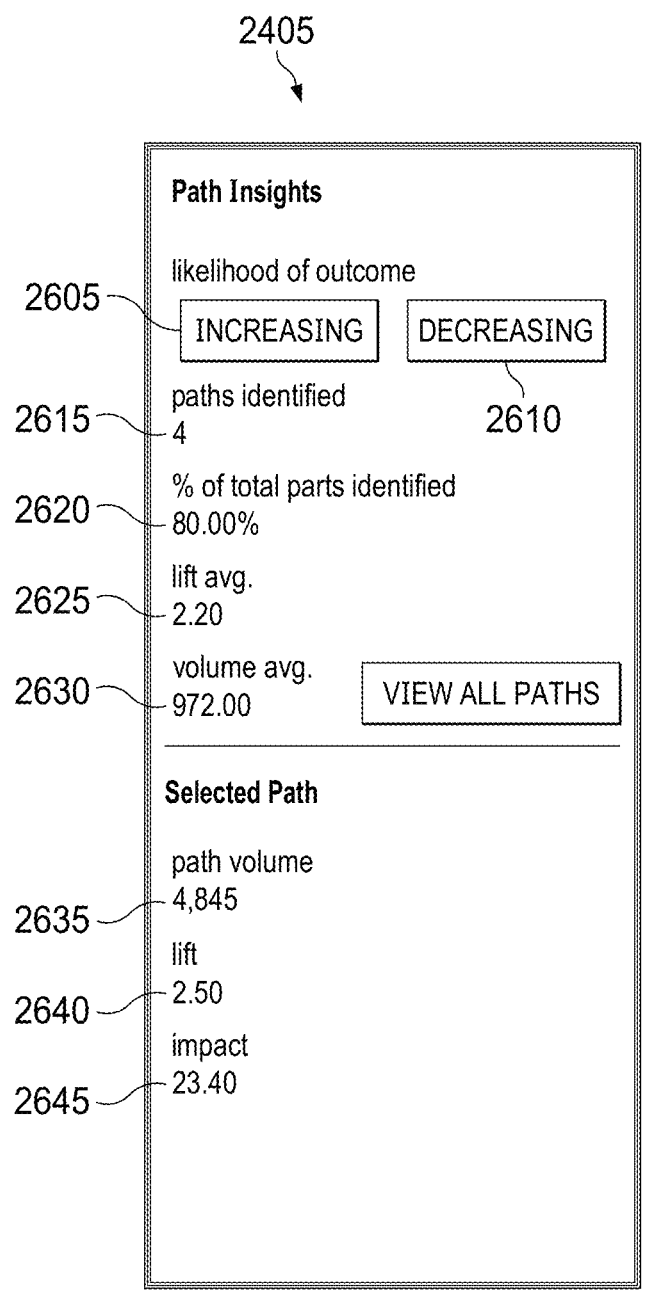
FIG. 26 is an example panel showing typical filters and a multitude of both basic and advanced custom metrics and measures, in accordance with some embodiments of the present disclosure.

FIG. 26 is an exemplary Path Insights Statistics panel 2405 detail of the embodiment in FIG. 24, showing typical filters and a multitude of both basic and advanced custom metrics and measures, according to some embodiments of the present disclosure. In some embodiments, the functionality of the likelihood-filtering may be similar to the Path Statistics panel 2115 shown in FIGS. 21 and 23. In some embodiments, the interface may provide filters to increase 2605 and/or to decrease 2610 likelihood of achieving an event. In some embodiments the interface may also provide the metrics of the similar paths and selected sub-path, as described above. The exemplary Path Insights Statistics panel 2405 in the figure, which is in accordance with some embodiments, displays for the similar paths the number of events identified 2615, the percentage of the total that the identified events represent 2620, the average lift of the group 2625, and the average volume of the group 2630. Other metrics and measures are conceived and are discussed throughout the present disclosure. Also shown in the exemplary Path Insights Statistics panel 2405 is metrics and measures for the selected path. These metrics and measures include the selected path's volume 2635, the selected path's lift 2640, and the selected path's impact 2645.

Figure 27:
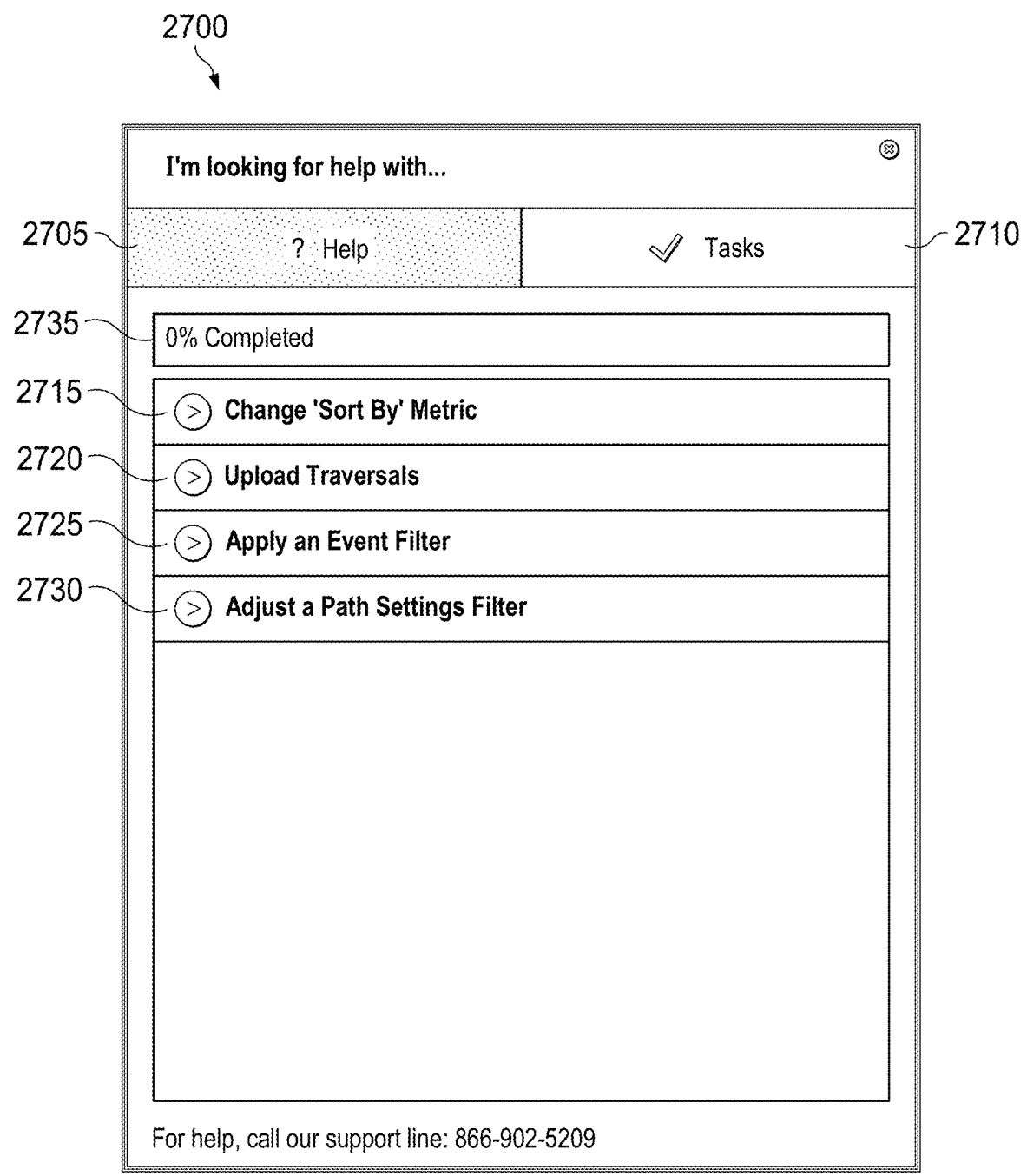
FIG. 27 is a detailed view of an exemplary menu, in accordance with some embodiments of the present disclosure.

FIG. 27 is a detailed view of a Task Helper menu 2700 showing the topics available for tutorials, according to some embodiments of the present disclosure. In some embodiments, the system may provide assistance for using the JSARF in the form of searchable help documents and tutorials. The Task Helper menu 2700 is one exemplary method of providing this assistance. From the top two buttons, help button 2705 and tasks button 2710, the graying out of the help button 2705 indicates that, in the current figure, task tutorials are being viewed, in accordance with some embodiments of the present disclosure. In this exemplary case, four topic tutorials are shown. In some embodiments, the task tutorials may cover standard and advanced topics including, but not limited to, changing the metric or measure by which the data is sorted 2715, uploading input files 2720, applying event filters 2725, and adjusting path settings filters 2730. In some embodiments, the system leads the user through the steps of the tutorial for the given topic, and the system displays the percent completed in the progress bar 2735.

Figure 28:
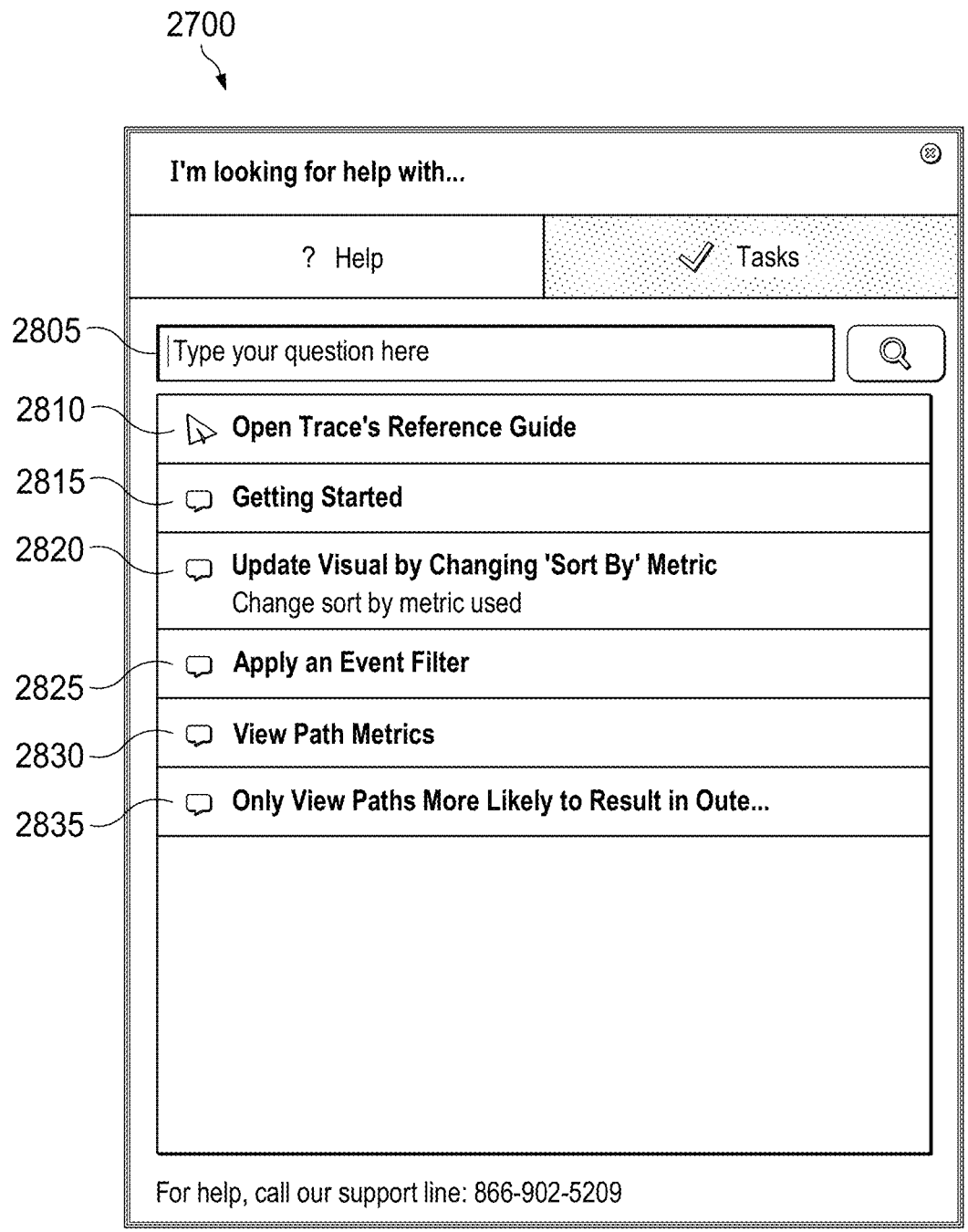
FIG. 28 is a detailed view of an exemplary menu showing topics for user support, in accordance with some embodiments of the present disclosure.

FIG. 28 is a detailed view of Task Helper menu 2700 wherein the help menu is being viewed, in accordance with some embodiments of the present disclosure. In the present figure, the interface indicates the help button 2705 of the embodiment shown in FIG. 27 has been selected, and the interface shows the additional topics available for user support. In the present view, the menu is complete with links to additional references and resources, according to some embodiments of the present disclosure. The exemplary interface contains a search field 2805 to aid the user in locating topics of interest based on keyword searching. The exemplary interface contains a reference guide link 2810 to open a reference guide, which may contain a document covering topics including hints and tips for the systems, common use cases, exporting datasets, a conceptual review of the relevant probabilities used in the systems, a guide to assist in the interpretation of the results generated, and additional frequently asked questions. The exemplary interface contains a first-steps link 2815, which may include a cursory set of instructions for initial use of the systems. The exemplary interface contains a sorting tutorial link 2820, which may open a tutorial covering the topic of updating the visualizations by changing the metric which sorts the outputs displayed. The exemplary interface contains an apply event filter link 2825, which may open a tutorial discussing the various filters in the present disclosure. The exemplary interface contains a view path metrics link 2830, which may provide a tutorial discussing the metrics and measures returned by the systems disclosed herein. Finally, the exemplary interface contains a more-or-less-likely path tutorial link 2835, which may discuss the visual or textual outputs in the presently disclosed systems. Although the Task Helper menu 2700 in the figure shows many possible links and tutorials, the figure is not inclusive and other links and tutorials are possible.

Figure 29:
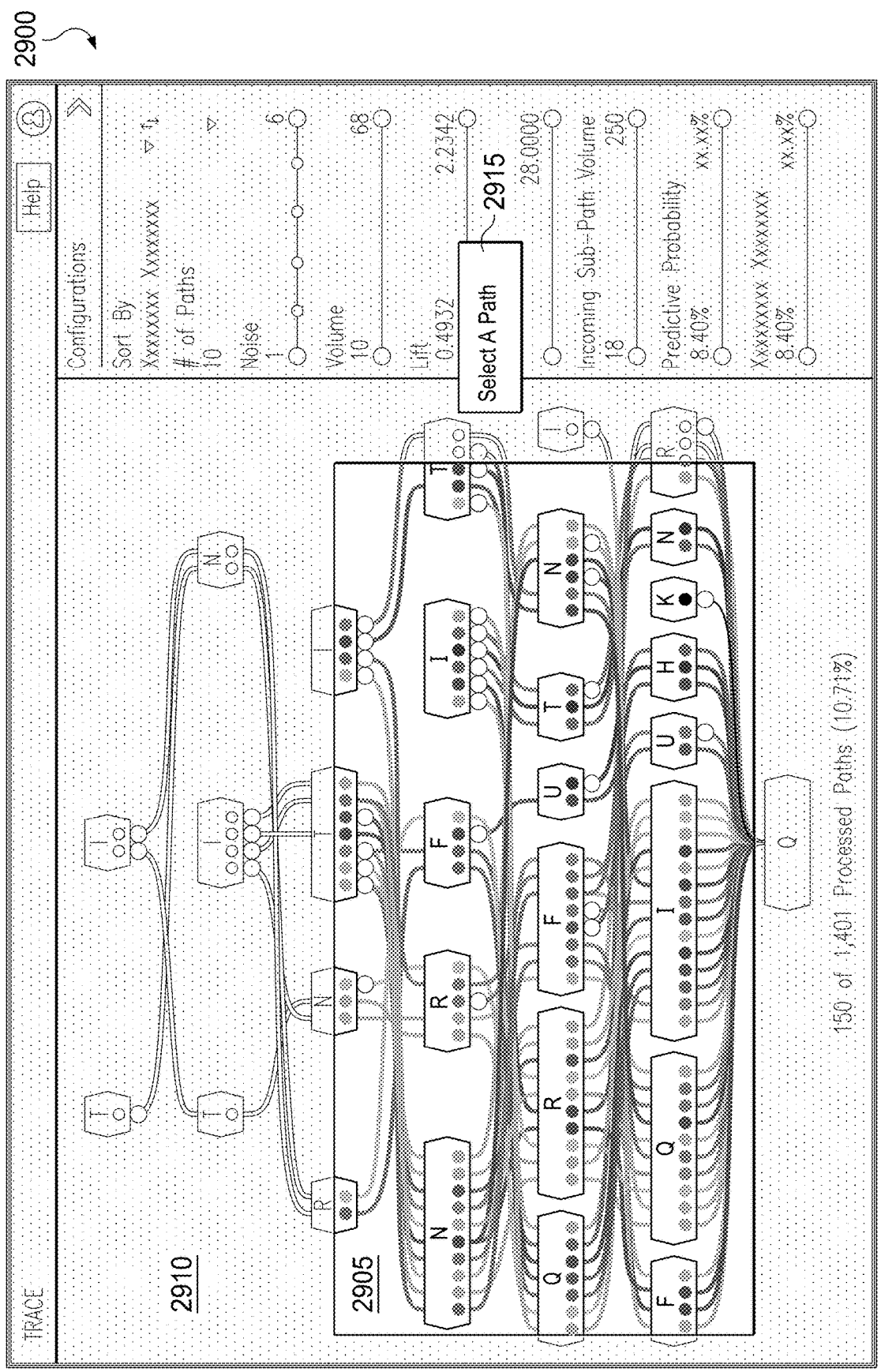
FIG. 29 is an exemplary output from a tutorial, in accordance with some embodiments of the present disclosure.

FIG. 29 is an exemplary tutorial 2900 selected from the Task Helper menu 2700, according to some embodiments of the present disclosure, which walks the user through the process of understanding the effects of path modification by first demonstrating how to select a path from the interactive all-paths view. In some embodiments, the tutorials 2900 proceed sequentially through common and advanced tasks using the techniques of (i) displaying an emphasized region 2905 and a deemphasized region 2910 in the GUI and (ii) generating instructional windows 2915.

Figure 30:
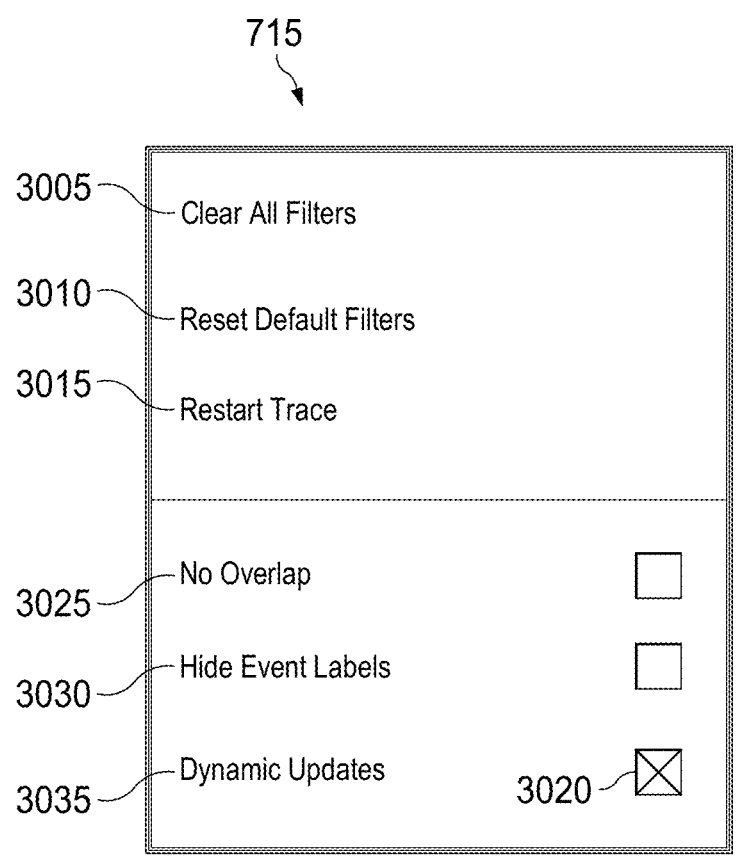
FIG. 30 is a detailed view of an exemplary off-menu panel that may be available in any interactive workspace described herein, in accordance with some embodiments of the present disclosure.

FIG. 30 is a detailed view of an off-screen menu 715 available through an interactive workspace within the systems, according to some embodiments of the present disclosure. The off-screen menu 715 was introduced in the discussion for FIGS. 7 and 13. In some embodiments, an off-screen menu 715 contains top-level, one-way controls and options such as removing filters 3005, returning to default filtering settings 3010, and restarting the application 3015. In some embodiments, an off-screen menu 715 controls, through toggle box controls 3020 or other controls, visualization options, such as prohibiting path overlaps 3025, concealing event labels 3030, or enabling dynamic updates 3035 to set filters.

Figure 31:
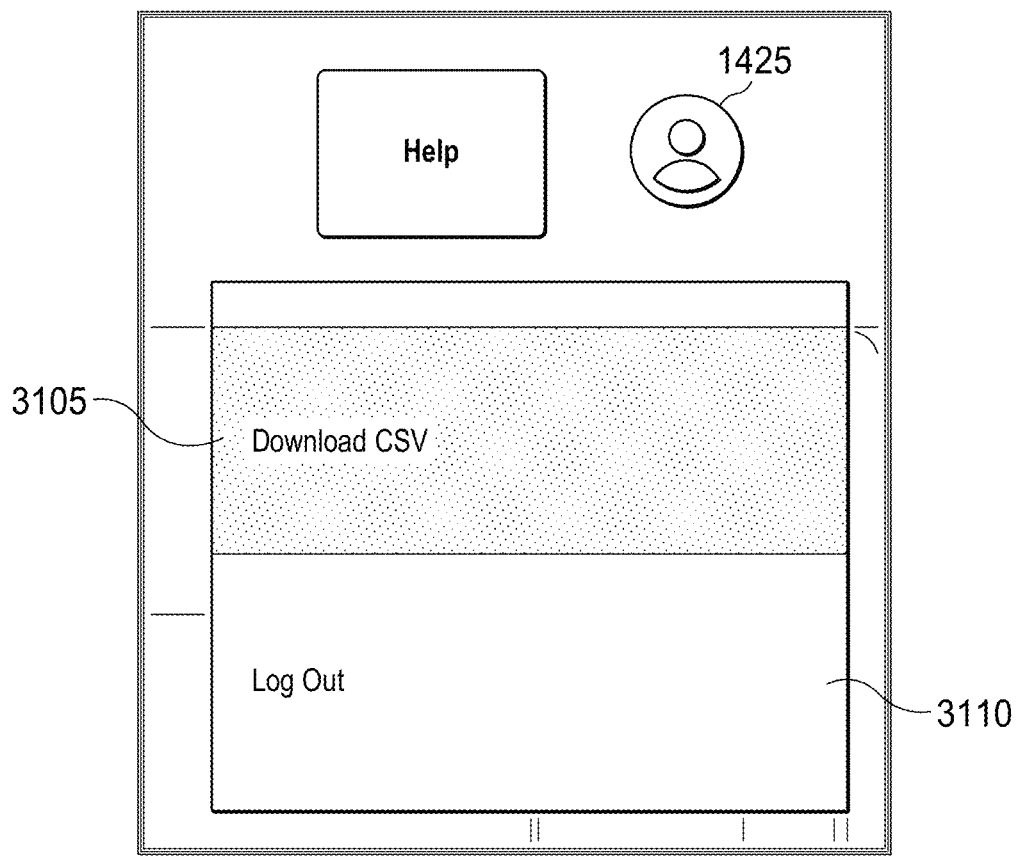
FIG. 31 is detailed view of a user icon function, in accordance with some embodiments of the present disclosure.

FIG. 31 is a detailed view of an exemplary menu generated by pressing a user account access icon 1425, according to some embodiments of the present disclosure. The user account access icon 1425 was introduced in the discussion for FIG. 14. From this menu, the user may download the current results at a download button 3105 or logout of the current session at a Log Out button 3110.

Figure 32:
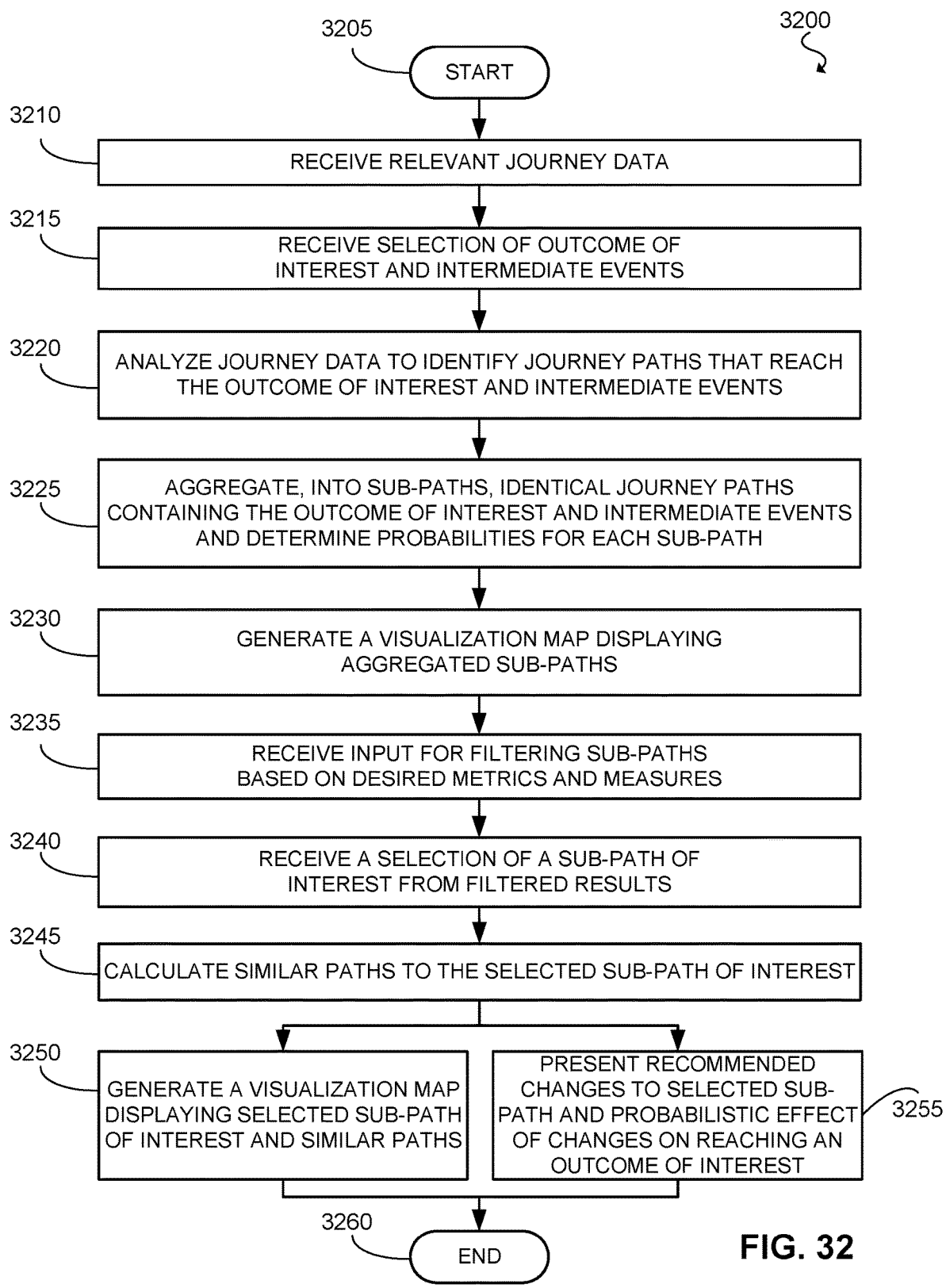
FIG. 32 is an example flow chart illustrating aspects of system functionality, in accordance with some embodiments of the present disclosure.

FIG. 32 is an example flow chart illustrating method 3200 that can be performed by systems of the present disclosure (e.g., a JSARF), according to some embodiments. Method 3200 is merely illustrative of certain functionalities of the disclosed systems and is not intended to be inclusive of all functionalities described herein. Nonetheless, the flow chart is illustrative of the present technology's capabilities. As shown in FIG. 32, method 3200 may begin 3205 when the JSARF receives relevant journey data 3210 from a variety of sources. As described above, the input data may include journey data having a plurality of journey events. An input dataset may be furnished to the present systems and methods through an application protocol interface ("API") or manually uploaded from a local data source (e.g., a local filesystem or database instance) or a remote data source (e.g., a data lake, database, or similar source).

As shown, the JSARF may receive 3215 a selection of an outcome of interest and/or intermediate events to include in an analysis. For example and not limitation, the discussion relating to FIG. 6 describes an exemplary method of receiving a selection of an outcome of interest, and the discussion relating to FIG. 8 describes an exemplary method of receiving a selection of intermediate events (or those occurring prior to an outcome). Method 3200 may then include analyzing 3220 the journey data within the entire provided dataset to identify all journey paths that include the selected events.

As shown in FIG. 32, the method may further include aggregating 3225, into respective representative sub-paths, all identical journey paths that contain the selected outcome of interest and intermediate events. For illustration, the system may search the dataset for all paths having intermediate events "A" and "B" and the outcome event "D." So, in the foregoing example, the JSARF may locate 3220 journey paths having (1) the events "A," "B," "C," and "D" and (2) the events "A," "B," "Z," and "D." The JSARF may then combine 3225 the paths in category (1) into a first sub-path and the paths in category (2) into a second sub-path. Although this operation is not essential to a functioning JSARF, the combination effect at this operation may produce more digestible outputs, such as maps indicating sub-path importance (as described below).

Method 3200 may also determine the base probabilities for each respective representative sub-path 3225 within the dataset. For example and not limitation, the JSARF may perform the base calculations found in calculations panel 210 of FIG. 2—including determining the base probabilities such as volume, volume within the entire dataset, path length, and any other metric described herein—on the entire journey dataset. The present disclosure describes the various methods for determining the base probabilities for each respective representative sub-path of the dataset.

Method 3200 may further include generating 3230 a visualization map displaying the aggregated respective representative sub-paths. In some embodiments, the JSARF may display the journey paths as journey lines and may indicate the events that define the lines with icons identifying the events. In some embodiments, and as described above for the incoming sub-path views in FIGS. 10, 11, 14, and 15, the JSARF can display the journey paths with vertical bars leading sequentially though events to an outcome. In some embodiments, and as described above for the Dominant Path view 1600 in FIGS. 16-19, the JSARF can display the journey paths with horizontal bars. In some embodiments, the JSARF, may generate 3230 visualization maps in which more important representative sub-paths are indicated by any of the methods designed herein. For example and not limitation, in embodiments where the JSARF combines identical journey paths into respective representative sub-paths (i.e., at 3225), the visualization map may weigh journey lines according to volume, lift, or any other measure defined herein. The weighting may be achieved via changes to line sizes or colors, as previously described.

Continuing, method 3200 may further include receiving 3235 input for filtering representative sub-paths based on desired metrics and measures. For example, the JSARF may include any of the filters described herein that may limit the results displayed the visualization map. For example and not limitation, the JSARF may provide filters that limit the visualization map to include respective representative sub-paths having (i) a selected statistical lift, (ii) a selected volume of journey paths (i.e., the number of journey paths aggregated into the one representative sub-path), (iii) a selected increase or decrease on the impact measure, (iv) a selected incoming volume, (v) a selected path length, or any other metric or measure described herein. At this point, method 3200 may further include generating an additional visualization map corresponding to the input filters, similar to that described at 3230.

As shown in FIG. 32, method 3200 may further include receiving 3240 a user's selection of a particular representative sub-path of interest from the filtered results returned by the system. For example and not limitation, a user may be interested in deeper analysis of a more-important, or dominant, path returned as part of the aggregated respective representative sub-paths. Upon receiving a selection of a particular representative sub-path of interest, the JSARF may launch the secondary recommendation features described herein. For example, the selection of a particular representative sub-path may launch the Path Insights Feature 255 of FIGS. 2 and 3. Upon receiving a selection of particular representative sub-path, the JSARF may produce an additional interactive interface, such as the interface described in FIG. 24.

Method 3200 may further include calculating 3245 similar paths to the particular representative sub-path. The JSARF may use any of the statistical methods described herein, including but not limited to the Levenshtein distance metric and the cosine similarity calculation. As will be appreciated, identifying paths similar to the selected particular representative sub-path can provide a user with additional insight into how the particular representative sub-path may be altered to achieve a desired result, for example increasing or decreasing the likelihood of reaching the selected outcome event. Thus, in some embodiments, the disclosed systems and methods will parse the input journey dataset to define journey paths that (1) contain more, less, or different events and (2) reach the same outcome. Subsequently, the disclosed system may display the information gained from these calculations to the user so that the user may make choices regarding the journeys in a given customer-based environment.

In some embodiments, the disclosed system may display the gained information in various formats. For example, method 3200 may include generating 3250 a visualization map displaying the particular representative sub-path and similar paths. The visualization map may also include the advanced measures and metrics described herein, for example in the discussion for FIGS. 12-21. The advanced measures and metrics may describe both the particular representative sub-path and the similar paths. Then, method 3200 may include presenting 3255 recommended changes to the particular representative sub-path and the probabilistic effect of changes on reaching an outcome of interest, as is described in relating to FIGS. 24-26. For example, the recommendations may be in the form of a recommendation card 2425 (not shown in FIG. 32) that indicates the impact of changing the path in the recommended way. In other words, the recommendation card 2425 may include a corresponding effect analysis of changing the particular representative sub-path to the recommended path. The recommendation card may indicate what action should be taken (e.g., add, remove, replace) upon a given event to achieve a desired outcome (e.g., increase or decrease lift). In some embodiments, operations 3250 and 3255 may be displayed in a single interface.

FIG. 33 is an example realization of a Dominant Path view embodiment where the system provides paths outgoing form a selected outgoing event 3305, in accordance with some embodiments of the present disclosure. As described above, the Dominant Path view of FIG. 33 is an alternative embodiment of the Dominant Path view of FIG. 17. This alternative embodiment demonstrates how each view or interface described herein is not the sole representation presently described systems and methods are capable of presenting. Similar to the representation in FIG. 17, the present view incorporates a path legend and statistics panel 1630, a dominant path display panel 1700, and a settings menu panel 1705. However, the outgoing paths 3310 are presented with a different, more stylized design than the paths in FIG. 17. Additionally, each intermediate event (for example intermediate event 3315) in the present view not only indicates name the individual event (e.g., "journey.exit," as shown in example intermediate event 3315) but also includes additional intermediate event metrics 3320. For example, in the exemplary view in FIG. 33, each intermediate event 3315 not only provides the name of the event, but the intermediate event 3315 also indicates, within the intermediate event metrics 3320, the number of visits (or accesses) to that event and the percent of total visits within the dataset that number of visits represents. As will be appreciated, the intermediate event metrics 3320 may include any other metric described herein and are not limited to number of visits and percent of total.

What is claimed is:

1. A system comprising:
one or more processors; and
a memory, coupled to the one or more processors, storing code for representing and recommending journey paths, wherein execution of the code by the one or more processors causes the one or processors to perform operations comprising:
receiving, from a plurality of different customer channels having different file formats, data representative of a plurality of journey paths for a plurality of different users, each journey path representative of a journey having one or more journey events, including at least a starting event and an outcome, and data for each respective journey path comprising sequential-event information;
outputting, for display in a graphical-user-interface associated with the computing device, a plurality of events including the one or more journey events;
receiving an indication of a selection of the one or more journey events and a desired outcome for analysis, the one or more journey events and the desired outcome being selected in the graphical-user-interface via one or more selectors that enable a portion of the one or more journey events to be analyzed;
analyzing, for each journey path in the plurality of journey paths, the sequential-event information to determine a probability and number of times a journey event is reached;
identifying for analysis, from the plurality of journey paths, a subset of journey paths having the desired outcome, the subset of journey paths being associated with more than one user of the plurality of different users;
aggregating each journey path of the subset that have a common starting event, a common outcome, and at least one common intermediate event into a single representative sub-path, thereby creating a plurality of representative sub-paths;
generating a visualization map comprising the representative sub-paths, wherein the visualization map displays, for each of the representative sub-paths, the respective journey path's starting event, outcome, and any common intermediate event between the starting event and the common outcome; and
outputting, for display in a graphical-user-interface, the visualization map; and
causing generation and display of functional controls on the display including a Path Visualization mode-selection menu and a Dominant Path settings menu, wherein:
the Path Visualization mode-selection module menu provides interactive functionality to allow a user of the computing device to interact with the computing device to select alternative path visualizations of journey paths;
the interactive functionality includes functionality to generate one or more dominant and secondary journey path displays by at least allocating a first visual field area to a dominant journey path and one or more second visual field areas to secondary journey paths in a periphery of the dominant journey path; and
the Dominant Path settings menu provides interactive functionality to allow the user to design the display of the dominant journey path.

2. The system of claim 1 wherein execution of the code by the one or more processors causes the one or processors to perform further operations comprising:
receiving a selection, at the computing device and from the one or more journey events, of an intermediate journey event, in addition to the desired outcome, to include in the analysis.

3. The system of claim 1,
wherein each single representative sub-path of the plurality of representative sub-paths in the visualization map is displayed as a journey line connecting a starting event to an outcome, and
wherein each journey line also indicates any intermediate event in addition to the starting event and the outcome.

4. The system of claim 1,
wherein each of the representative sub-paths in the visualization map is displayed as a journey line connecting a starting event to an outcome event, and
wherein each journey line also indicates any intermediate event in addition to the starting event and the outcome.

5. The system of claim 4, wherein each journey line is weighted to indicate the volume of journey paths represented by the representative sub-paths.

6. The system of claim 5, wherein the weighting is displayed by presenting a high-volume journey line as a wide line and presenting a low-volume journey line as a thin line.

7. The system of claim 6, wherein each journey line comprises a color, and wherein the weighting is displayed by presenting a high-volume journey line in an opaquer color and presenting a low-volume journey line in a less opaque color.

8. The system of claim 1 wherein execution of the code by the one or more processors causes the one or processors to perform further operations comprising:
receiving input for filtering, at the computing device, each single representative sub-path of the plurality of representative sub-paths to include in the analysis only those journey paths having at least one of:
a selected statistical lift;
a selected volume of journey paths;
a selected increase or decrease on the impact measure; or a selected incoming volume.

9. The system of claim 1, wherein the graphical-user-interface is configured to receive a selection, at the computing device, of a journey line in the visualization map for analysis, wherein execution of the code by the one or more processors causes the one or processors to perform further operations comprising:

receiving a selection, at the computing device, of a selected journey line from the visualization map;

calculating, by the computing device, a plurality of similar paths to the selected journey line, wherein the plurality of similar paths is calculated by a statistical metric;

aggregating, by the computing device, the plurality of similar paths for analysis;

outputting, by the computing device, and for display in the graphical-user-interface, the plurality of similar paths.

10. The system of claim 9 wherein execution of the code by the one or more processors causes the one or processors to perform further operations comprising:

receiving input for filtering, at the computing device, the plurality of similar paths to only those similar paths with at least one of:
 a higher probability of reaching the desire outcome than the selected journey line; or
 a lower probability of reaching the desired outcome than the selected journey line; and displaying, by the graphical-user-interface, a path recommendation.

11. The system of claim 10, wherein the path recommendation comprises:

one recommended path having a higher or lower probability of reaching the desired outcome than the selected journey line; and a corresponding effect analysis, wherein the corresponding effect analysis includes at least one of:
 the change in statistical lift between the one recommended path and the selected journey line;
 impact change between the one recommended path and the selected journey line;
 a volume change between the one recommended path and the selected journey line; or
 incoming sub-path volume change between the one recommended path and the selected journey line.

12. The system of claim 9, wherein the statistical metric is at least one of a Levenshtein distance metric or a cosine similarity calculation.

13. The of claim 1, wherein the one or more selectors include a check box or a toggle.

14. A system comprising:
one or more processors; and
a memory, coupled to the one or more processors, storing code for representing journey paths, wherein execution of the code by the one or more processors causes the one or processors to perform operations comprising:

receiving, from a plurality of different customer channels having different file formats, data representative of a plurality of journey paths for a plurality of different users, each journey path representative of a journey having one or more journey events, and data for each respective journey path comprising sequential-event information;

outputting, for display in a graphical-user-interface associated with the computing device, a plurality of events including the one or more journey events;

receiving an indication of a selection of one or more events of interest from among the one or more journey events, the selection being made via one or more selectors in the graphical-user-interface that enables the selection;

aggregating journey paths from the plurality of journey paths that contain (i) the selected one or more events of interest and (ii) identical sequential-event information to respective representative sub-paths comprising data for more than one use of the plurality of different users, thereby creating a plurality of representative sub-paths;

determining, for each respective representative sub-path of the plurality of representative sub-paths, a probability and number of times each respective representative sub-path reaches the one or more events of interest;

generating a visualization map comprising the plurality of respective representative sub-paths, wherein the visualization map displays at least two events defining each respective representative sub-path;

receiving input for filtering the plurality of respective representative sub-paths to include in the visualization map only those respective representative sub-paths having at least one of:
 a selected statistical lift;
 a selected volume of journey paths;
 a selected increase or decrease on the impact measure; or
 a selected incoming volume; and outputting, for display in the graphical-user-interface, the visualization map; and causing generation and display functional controls including a Path Visualization mode-selection menu and a Dominant Path settings menu, wherein:
 the Path Visualization mode-selection module menu provides interactive functionality to allow a user of the computing device to interact with the computing device to select alternative path visualizations of journey paths;
 the interactive functionality includes functionality to generate one or more dominant and secondary journey path displays by at least allocating a first visual field area to a dominant journey path and one or more second visual field areas to secondary journey paths in a periphery of the dominant journey path; and
 the Dominant Path settings menu provides interactive functionality to allow the user to design the display of the dominant journey path.

15. The system of claim 14, wherein the computing device is further configured to receive, via a user input from the graphical-user-interface, a selection of a particular representative sub-path in the visualization map for analysis, the wherein execution of the code by the one or more processors causes the one or processors to perform further operations comprising:

receiving a selection, at the computing device, of a particular representative sub-path within the visualization map;

calculating, by the computing device, and using a statistical metric, a plurality of similar paths to the particular representative sub-path;

aggregating, by the computing device, the plurality of similar paths for analysis;

outputting, by the computing device, and for display in the graphical-user-interface, the plurality of similar paths;

receiving input for filtering, at the computing device, the plurality of similar paths to only those similar paths with at least one of:

a higher probability of reaching the selected one or more events of interest than the particular representative sub-path; or a lower probability of reaching the selected one or more events of interest than the particular representative sub-path; and displaying, by the graphical-user-interface, a path recommendation.

16. The system of claim 15, wherein the path recommendation comprises:

one recommended path having a higher or lower probability of reaching the selected one or more events of interest than the particular representative sub-path; and a corresponding effect analysis, wherein the corresponding effect analysis includes at least one of:

the change in statistical lift between the recommended path and the particular representative sub-path;

an impact change between the recommended path and the particular representative sub-path;

a volume change between the recommended path and the particular representative sub-path; or an incoming sub-path volume change between the recommended path and the particular representative sub-path.

17. The system of claim 14, wherein the at least two events defining each respective representative sub-path displayed in the visualization map includes every journey event reached in the respective representative sub-path.

18. The system of claim 14, wherein the at least two events defining each respective representative sub-path comprise only journey events determined to be relevant for visualization, wherein execution of the code by the one or more processors causes the one or processors to perform further operations comprising:

determining, by the computing device, which journey events within each respective representative sub-path are relevant to include in the visualization map.

19. The system of claim 14, wherein the selected one or more events of interest comprise at least one of:

a journey outcome event; or a journey starting event.

20. The system of claim 14, wherein each respective representative sub-path of the plurality of respective representative sub-paths displayed in the visualization map, and displayed by the graphical-user-interface, is weighted to show a number of journey paths aggregated to include in the respective representative sub-path.

21. The system of claim 14, further comprising sorting the one or more journey events in the plurality of journey paths by importance within the plurality of journey paths.

* * * * *